United States Patent [19]
Shibuya et al.

[11] Patent Number: 5,481,729
[45] Date of Patent: Jan. 2, 1996

[54] INTERRUPT CONTROLLER THAT REDUCES THE NUMBER OF SCANS NEEDED TO IDENTIFY PRIORITY

[75] Inventors: Tadashi Shibuya; Yukihiro Nishiguchi; Tomikazu Suzuki; Yasufumi Takamine, all of Kanagawa, Japan

[73] Assignee: NEC Corporation, Tokyo, Japan

[21] Appl. No.: 110,495

[22] Filed: Aug. 23, 1993

Related U.S. Application Data

[63] Continuation of Ser. No. 789,168, Nov. 4, 1991, abandoned.

[30] Foreign Application Priority Data

| Nov. 2, 1990 | [JP] | Japan | 2-297475 |
| Dec. 18, 1990 | [JP] | Japan | 2-411472 |
| Dec. 18, 1990 | [JP] | Japan | 2-411473 |
| Jan. 9, 1991 | [JP] | Japan | 3-012911 |

[51] Int. Cl.$^6$ ............................................. G06F 9/46
[52] U.S. Cl. ...................... 395/737; 395/733; 395/727
[58] Field of Search .................... 395/375, 275, 395/775

[56] References Cited

U.S. PATENT DOCUMENTS

| 4,091,447 | 5/1978 | Dillon et al. | 395/725 |
| 4,172,284 | 10/1979 | Heinrich | 395/725 |
| 4,271,468 | 6/1981 | Christensen et al. | 395/275 |
| 4,470,110 | 9/1984 | Chiarottino | 395/200 |
| 4,633,394 | 12/1986 | Georgiou | 395/650 |
| 4,689,739 | 8/1987 | Federico et al. | 395/725 |
| 4,734,882 | 3/1988 | Romagosa | 395/725 |
| 4,761,732 | 8/1988 | Eldamiati et al. | 395/725 |
| 5,126,944 | 6/1992 | Sakama et al. | 395/375 |
| 5,163,152 | 11/1992 | Okomoto | 395/725 |
| 5,283,904 | 2/1994 | Carson et al. | 395/725 |
| 5,367,676 | 11/1994 | Katori | 395/725 |

Primary Examiner—Jack B. Harvey
Assistant Examiner—David A. Wiley
Attorney, Agent, or Firm—Whitham, Curtis, Whitham & McGinn

[57] ABSTRACT

An interrupt controller is so configured that if the priority level is divided into $2^n$ or less levels, the priority levels are scanned in the order of $2^n \rightarrow 2^{n-1} \rightarrow \ldots 2^0$, and the priority levels having the same order of priority are scanned on the basis of the default values at only one timing. Therefore, even if interrupt requests having the same priority levels compete with each other, an interrupt request signal having the highest priority level can be detected from the competing interrupt requests with only (n+1) timings.

6 Claims, 37 Drawing Sheets

INTERRUPT CONTROLLER THAT REDUCES THE NUMBER OF SCANS NEEDED TO IDENTIFY PRIORITY

This is a Continuation of Application Ser. No. 07/789,168 filed Nov. 4, 1991, now abandoned.

BACKGROUND OF THE INVENTION

1. Field of the Invention

The present invention relates to an interrupt controller, and more specifically to an interrupt controller for use in a microcomputer, capable of designating the order of preference or the priority level to interrupt requests.

2. Description of Related Art

A microcomputer includes therein an interrupt controller for processing various interrupt requests. A typical conventional interrupt controller includes a scan counter which sequentially scans a given number of priority levels for realizing such an interrupt priority level control that when an interrupt processing having a low priority level is under execution, another interrupt processing having a high priority level can be executed by interrupt, but, when an interrupt processing having a high priority level is under execution, another interrupt processing having a low priority level cannot be executed.

However, in the conventional interrupt controller, since the priority levels are sequentially scanned by the scan counter, the larger the number of priority levels is, the longer the time for one cycle of the scanning operation becomes. In recent advanced microcomputers, the number of interrupt request signals is large, and the number of priority levels also becomes large in order to realize an elaborate control. As a result, a maximum time from the moment an interrupt signal is generated to the moment the interrupt signal is acknowledged becomes long. This is not suitable to microcomputers adapted for a real time control.

SUMMARY OF THE INVENTION

Accordingly, it is an object of the present invention to provide an interrupt controller which has overcome the above mentioned defect of the conventional one.

Another object of the present invention is to provide an interrupt controller capable of controlling various priority levels of interrupt requests at a high speed even if the number of priority levels is increased.

The above and other objects of the present invention are achieved in accordance with the present invention by an interrupt controller comprising a plurality of n-bit priority bit registers for designating $2^n$ priority levels to a plurality of interrupt request signals (where n is an integer not less than 2), a stage counter for sequentially and repeatedly generating (n+1) timing signals used for scanning the priority levels of the interrupt request signals, a priority-level-under-execution register for storing the content of the priority bit register of the interrupt request signal corresponding to an interrupt processing being currently under execution, interrupt request signal controlling means for comparing the content of the priority-level-under-execution register with contents of priority bit registers of the interrupt request signals being generated including the priority bit register of the interrupt request signal corresponding to the interrupt processing being currently under execution, in synchronism with the "n" timing signals in the order of the highest place bit to the lowest place bit, the interrupt request signal controlling means operating to detect an interrupt request signal having the highest priority bit from the interrupt request signals being generated, the interrupt request signal controlling means also operating in such a manner that when a plurality of interrupt request signals having the highest priority bit are detected, the interrupt request signal controlling means selects one interrupt request signal in accordance with a predetermined order in synchronism with a timing signal following the "n" timing signals, and means for generating an interrupt processing request signal when the interrupt request signal controlling means detects an interrupt request signal having the highest priority level.

The above and other objects, features and advantages of the present invention will be apparent from the following description of preferred embodiments of the invention with reference to the accompanying drawings.

DESCRIPTION OF THE PREFERRED EMBODIMENTS

Figure 1:
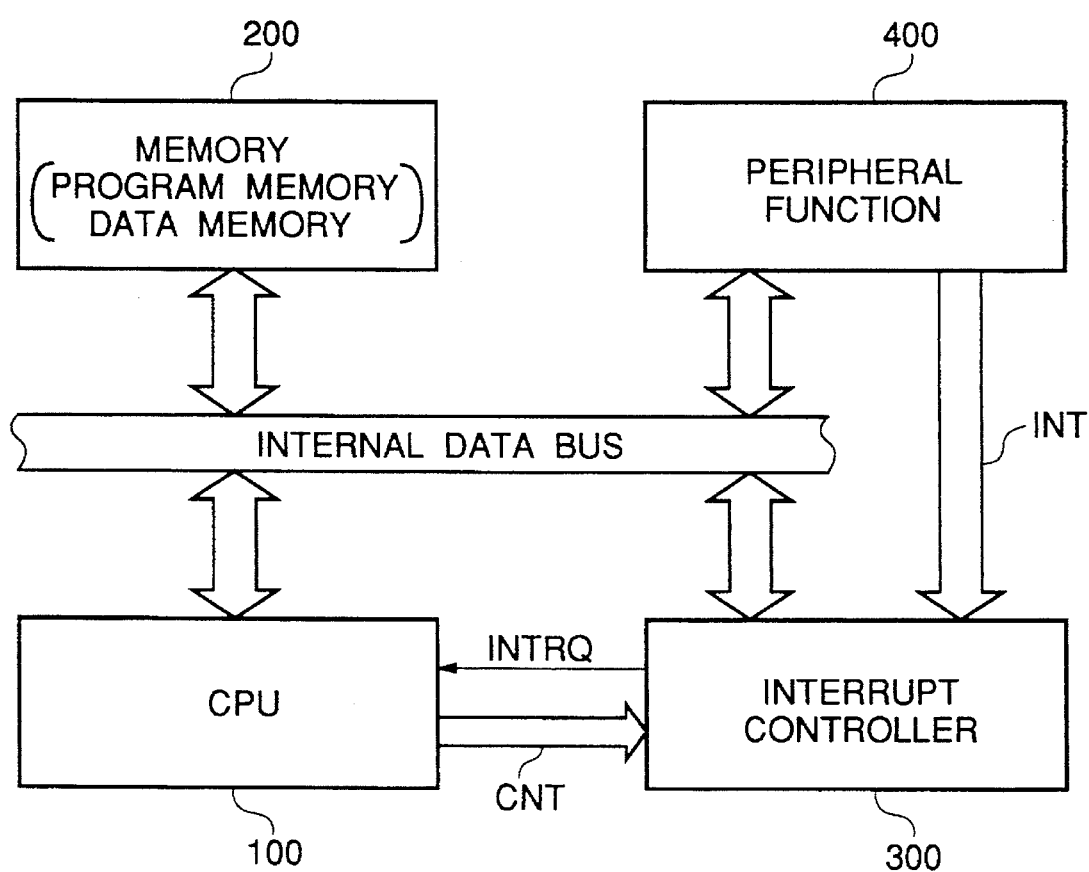
FIG. 1 is a block diagram of a typical usual microcomputer.

Referring to FIG. 1, there is shown block diagram of a typical microcomputer. The shown microcomputer includes a CPU (central processing unit) 100, a memory block 200, an interrupt controller 300, and a peripheral function block 400, which are coupled to each other by an internal data bus and other signal lines and buses. An instruction is read out from a program memory within the memory block 200, and executed by the CPU 100. On the other hand, the peripheral function block 400 is controlled to access to the CPU 100 through the internal data bus so as to write to the CPU and to read data from CPU. However, the peripheral function block 400 operates independently upon the CPU 100.

The peripheral function block 400 includes various functions such as a timer, a serial interface, etc. When the peripheral function block 400 detects a special condition, for example, when the timer reaches some value, or when reception of serial data has been completed, the peripheral function block 400 generates an interrupt request signal INT so as to inform the CPU 100 of generation of the special condition.

The interrupt request signal INT is supplied to the interrupt controller 300. The interrupt controller 300 discriminates whether or not the received interrupt request is permitted to be sent to the CPU 100 (interrupt enable), whether or not another interrupt request exists, and the order of preference (priority level) of the received interrupt request. If a required condition is sastified, the interrupt controller 300 transfers the interrupt request to the CPU 100, namely, outputs an interrupt processing request signal INTRQ to the CPU 100.

If the CPU 100 receives the interrupt processing request signal INTRQ, the CPU outputs, to the interrupt controller 300, various control signals CNT including a signal indicating that the interrupt request is acknowledged. In addition, the CPU having acknowledged the interrupt request, interrupts a processing under execution, and starts to execute a processing corresponding to the interrupt request signal INT, namely to a peripheral function unit generating the interrupt request signal INT.

Here, the order of preference of the interrupt request signal INT will be described. In the case that there are a plurality of interrupt request signals INT, these interrupt request signals are divided into an interrupt request signal INT that requests to urgently execute an interrupt processing (this is called a "interrupt request" hereinafter) and another interrupt request INT which is allowed to be processed late (this is called a "usual interrupt request" hereinafter). If the urgent interrupt request is generated when a processing for the usual interrupt request is being executed, a processing for the urgent interrupt request is required to be executed in preference of the processing for the usual interrupt request being processed, by interrupting or discontinuing the processing for the usual interrupt request being processed.

Therefore, it is necessary to give a different priority level to each of the interrupt requests INT. in this case, the control has to be performed to the effect that a processing for an interrupt request given with a high priority level is executed by interrupting or discontinuing the execution of a processing for an interrupt request given with a low priority level if the processing for the interrupt request having the low priority level is under execution. The above mentioned priority level control is executed in the interrupt controller 300.

Figure 2:
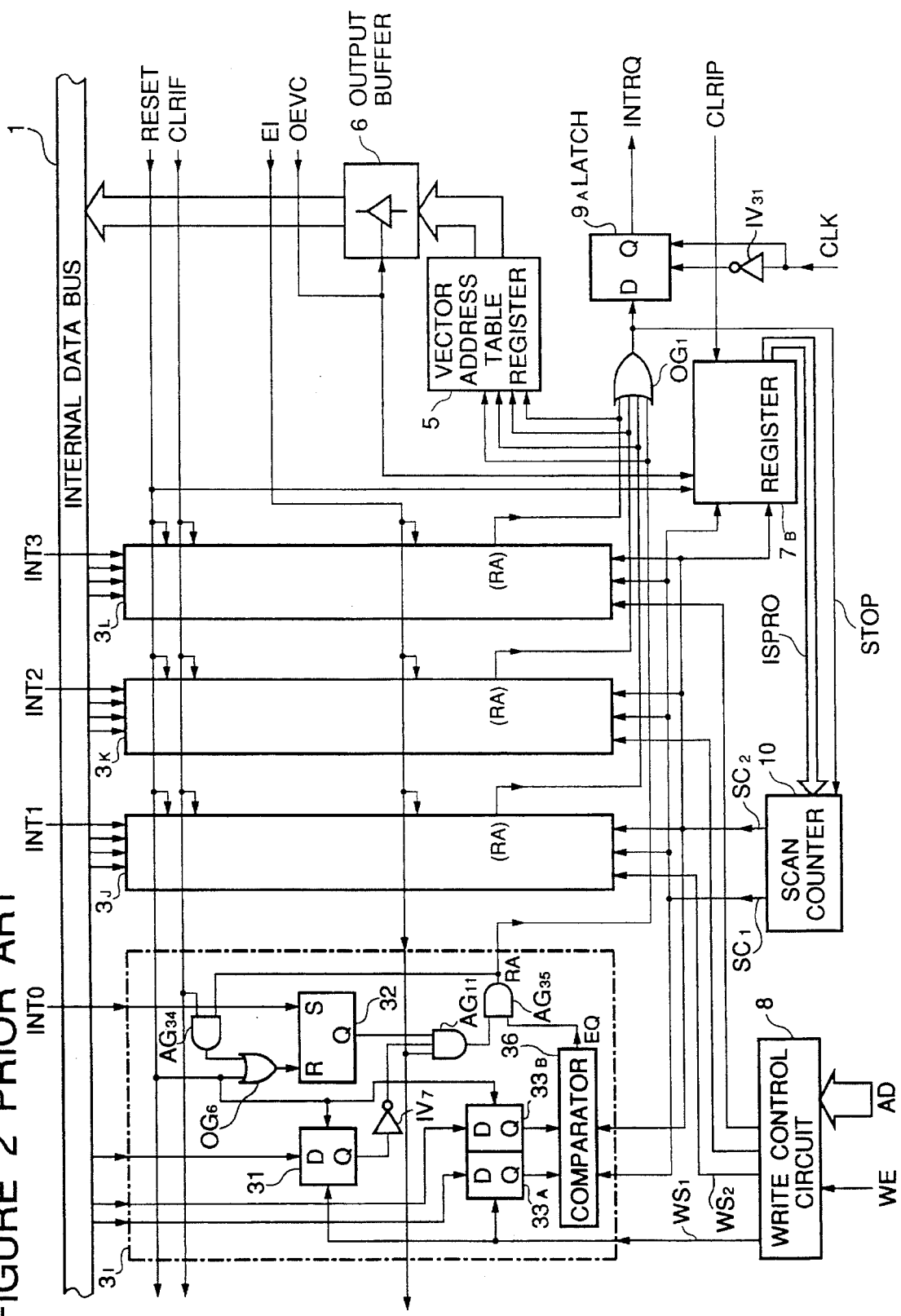
FIG. 2 is a block diagram of a typical conventional example of the interrupt controller incorporated in the microcomputer shown in FIG. 1.

Referring to FIG. 2, there is shown a block diagram of a typical conventional example of the interrupt controller 300. In the shown example, the priority level is divided into four levels.

In FIG. 2 INT0, INT1, INT2 and INT3 designate different interrupt request signals supplied from the peripheral function block 400, respectively. The interrupt request signals INT0, INT1, INT2 and INT3 are supplied to interrupt request signal controllers 3I 3J, 3K and 3L, respectively. Since the interrupt request signal controllers 3I, 3J 3K and 3L have the same construction, only the interrupt request signal controller 3I will be described in the following.

When an interrupt request is generated and the interrupt request signal INT0 is brought "1", an interrupt request flag register 32 is set to "1". The CPU 100 designates an address of the interrupt request signal controller 3I by an internal address bus AD, and outputs data to the internal data bus 1 and generates a write signal WE. In response to these signals, a write signal controller 8 brings its output WS1 into "1", so that corresponding data items outputted from the CPU 100 are written from the internal data bus 1 to a mask bit register 31 and priority bit registers 33A and 33B, respectively.

When a content of the mask bit register 31 is "1", an output of an AND gate AC11 is fixed to "0" by an inverter IV7. On the other hand, when the content of the mask bit register 31 is "0", the output of the AND gate AG11 is determined by an interrupt enable signal EI and a content of the interrupt request flag register 32. When the interrupt enable signal EI is "1", the interrupt processing is enabled or permitted.

The priority bit registers 33A and 33B constitute bits which designate a priority level of the interrupt request signal INT0. The priority bits of two bits can designate four priority levels of "0", "1", "2" and "3", "0" shows the highest priority level, and "3" indicates the lowest priority level. The priority bit register 33A corresponds to a high place bit, and the priority bit register 33B corresponds to a low place bit.

A comparator 36 ceaselessly compares an output of a scan counter 10 with the content of the priority bit register 33A and 33B. If coincidence is obtained, the comparator 36 brings its output EQ to "1". Therefore, when the content of the mask bit register 31 is "0" and the interrupt enable signal EI is "1", if the interrupt request signal INT0 is brought into "1" and if the output EQ of the comparator 36 is brought into "1", an output RA of an AND gate AG35 is brought into "1", and therefore, an output of an OR gate OG1 is brought to "1".

CLK designates a timing clock, and is supplied to a latch circuit 9A directly and through an inverter IV31. The latch circuit 9A latches the output of the OR gate OG1 in time to "1" of the timing clock CLK, and outputs its content in time to "0" of the timing clock CLK.

The scan counter 10 scans the priority levels. Specifically, the scan counter 10 sequentially and cyclicly generates a pair of scan signals SC1 and SC2 so that the priority levels are sequentially and cyclicly scanned in the order of "0"→"1"→"2"→"3"→"0"→... in an ordinary case. However, if the content of the scan counter 10 is consistent with an output ISPRO of a priority-level-under-execution register 7B, the scan counter 10 is cleared and restarts its counting operation from "0". When the content of the priority-level-under-execution register 7B is "2", the scan counter 10 sequentially and cyclicly scans in the order of "0"→"1"→"2"→"0"→.... On the other hand, if the output of the OR gate OG1 is "1", the scan counter 10 stops its counting operation and therefore holds its count content.

The priority-level-under-execution register 7B holds the priority level of an interrupt request corresponding to an interrupt processing which is being executed by the CPU 100. When an OEVC signal (which is one of the control signals CNT generated by the CPU 100) is "1", the priority-level-under-execution register 7B reads the outputs SC1 and SC2 of the scan counter 10. At this time, the content of the priority-level-under-execution register 7B which has been stored in the priority-level-under-execution register 7B is held in the priority-level-under-execution register 7B, but a higher one of the priority level stored in the priority-level-under-execution register 7B and the priority level newly read out by the priority-level-under-execution register 7B is outputted as the output ISPRO of the priority-level-under-execution register 7B.

If the OEVC signal is outputted, when the output of the AND gate AG35 of the interrupt request signal controllers 3I to 3L is brought to "1", a corresponding interrupt vector address is read out from a vector address table 5 through an output buffer 6 to the internal data bus 1. The CPU 100 discriminates the kind of the interrupt request signal on the basis of the interrupt vector address.

When a CLRIF signal, which is one of the control signals CNT of the CPU 100, is brought into "1", an output of an AND circuit AG 34 is brought into "1", and therefore, the interrupt request flag register 32 is reset to "0". Incidentally, a reset signal RESET is used for initialize the interrupt controller 300. When the reset signal RESET is brought into "1", the interrupt request flag register 32 is brought into "0", and the mask bit register 3I is brought into "1". The priority bit registers 33A and 33B are brought to "1, 1", and the priority-level-under-execution register 7B is initialized into a condition in which no interrupt processing is executed.

Now, an operation will be explained with reference to the timing chart of FIG. 3, assuming that the mask bit register 31 of the four interrupt request signal controllers 3I, 3J, 3K and 3L (corresponding to the interrupt request signals INT0, INT1, INT2 and INT3, respectively) are set to "0", "0", "0" and "0", respectively, and that the priority bit registers 33A and 33B of the four interrupt request signal controllers 3I, 3J, 3K and 3L are set to "1, 0" (priority level "2"), "1, 0" (priority level "2"), "0, 0" (priority level "0"), and "0, 1" (priority level "1"), respectively.

Figure 3:
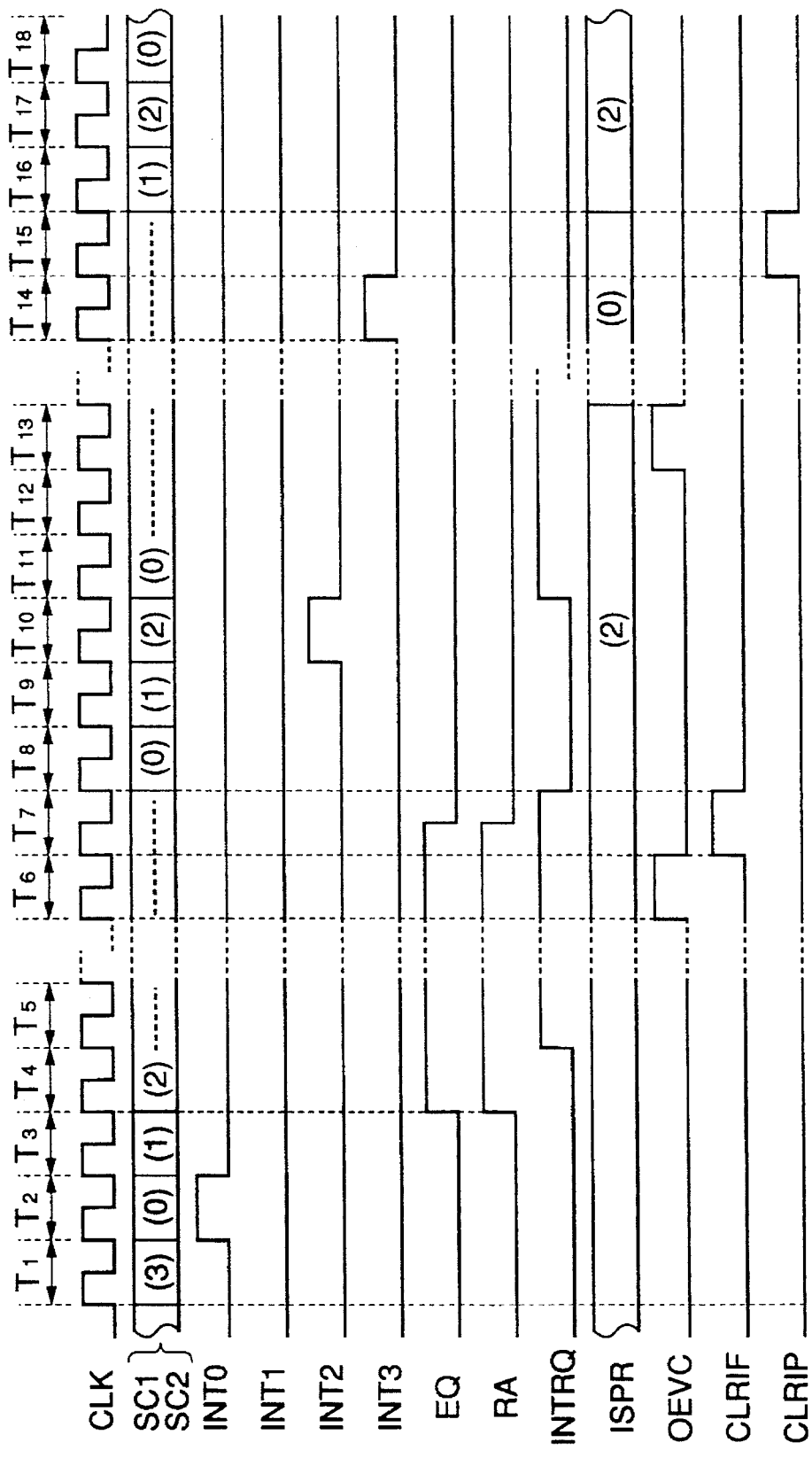
FIG. 3 is a timing chart illustrating an operation of the interrupt controller shown in FIG. 2.

In FIG. 3, if the interrupt request signal INT0 is generated at a timing of the clock T2, since the outputs SC1 and SC2 of the scan counter 10 show the priority level "2" at the timing T4, the comparator 36 generates the coincidence signal EO of "1", and the output RA of the AND gate AG 35 is brought to "1". As a result, the output of the OR gate OG1 is brought to "1", and therefore, the content of the scan counter 10 is stopped at the level "2". At the timing T5, the interrupt processing request signal INTRQ is brought to "1". Namely, the interrupt request INT0 is acknowledged, and the interrupt processing is requested to the CPU 100. In compliance with the interrupt processing request signal INTRQ, the CPU 100 brings the OEVC signal into "1" at the timing T6. At the timing T7, the output ISPRO of the priority-level-under-execution register 7B indicates the priority level "2".

Here, if the CPU 100 brings the CLRIF signal into "1", the content of the interrupt request flag register 32 is cleared. Accordingly, the outputs of the AND gates AG11 and AG35 are brought into "0" and the output of the OR gate OG1 is also brought into "0". As a result, since at the timing T8 the content of the scan counter 10 is consistent with the output ISPRO of the priority-level-under-execution register 7B, the scan counter is cleared, and restarts the scan operation from the priority level "0".

At the timing T10, if the interrupt request signal INT2 is generated, since at the timing T11 the outputs SC1 and SC2 of the scan counter 10 are consistent with the content of the priority bit registers 33A and 33B in the interrupt request signal controller 3K, the interrupt processing request signal INTRQ is bought into"1", and therefore, the interrupt request INT2 of the priority level"0" is acknowledged. As a result, the content of the scan counter 10 is fixed to "0" after the timing T11.

Thereafter, even if the interrupt request signal INT3 is generated at the timing T14, since the content of the scan counter 10 is "0", the comparator 36 in the interrupt request signal controller 3L generates no coincidence signal EQ, and therefore, there is not acknowledged the interrupt request signal INT3 (priority level "3") having a priority level lower than that of the interrupt request signal INT2 (priority level "3") the processing for which is currently under execution.

When the interrupt processing is completed, the CPU 100 generates the CLRIP signal. If the CPU 100 brings the CLRIP into "1" at the timing T15, the priority-level-under-execution register 7B resets at the timing T16 the priority level "0" being currently outputted to the scan counter 10, and outputs the priority level "2" just before the priority level "2". As a result, the scan counter 10 sequentially scans in the order of "0"→"1"→"2"→"0"→..., again.

As seen from the above, the conventional interrupt controller is such that the scan counter 10 sequentially scans the priority levels for the interrupt priority level control, so that when an interrupt processing having a low priority level is under execution, another interrupt processing having a high priority level can be executed by interrupt. However, when an interrupt processing having a high priority level is under execution, another interrupt processing having a low priority level cannot be executed.

However, in the conventional interrupt controller, since the priority levels are sequentially scanned, the larger the number of priority levels is, the longer the time for one cycle of the scanning operation becomes. In recent advanced microcomputers, the number of interrupt request signals is large, and the number of priority levels also becomes as large as 8 to 16 in order to realize an elaborate control. If the priority level is divided into eight levels, eight timing clocks are required until one cycle of the scanning operation is completed. In this case, a time from the moment the interrupt signal is generated to the moment the interrupt signal is acknowledged, requires 16 timing clocks at maximum. This time will be called a "response time" hereinafter. Accordingly, the above mentioned conventional interrupt controller becomes unsuitable to microcomputers adapted for a real time control, since the response time is long.

Embodiment 1

Figure 4:
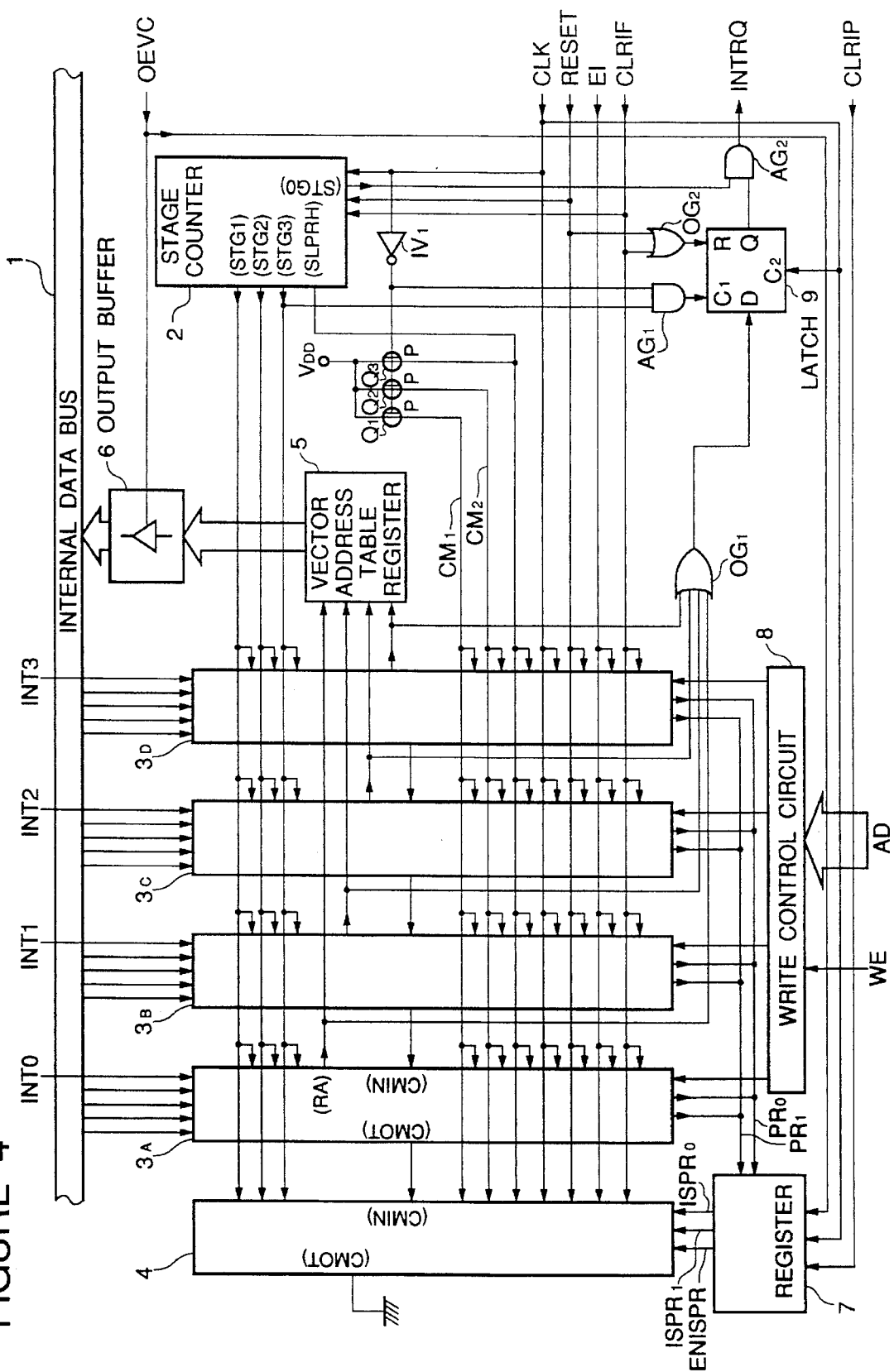
FIG. 4 is a block diagram of a first embodiment of the interrupt controller in accordance with the present invention.

Referring to FIG. 4, there is shown a block diagram of a first embodiment of the interrupt controller in accordance with the present invention. In FIG. 4, elements similar to those shown in FIGS. 1 to 3 are given the same Reference Numerals, and explanation thereof will be omitted. Namely, only portions different from the conventional interrupt controller will be explained.

In FIG. 4, for a timing control, a stage counter 2 generates a timing signal STG1, STG2, STG3, and STG0 for scanning the priority level of an interrupt request.

A priority-level-under-execution register 7 reads the priority level outputted from interrupt request signal controller 3A to 3D, at a timing of "1" of the OEVC signal, and outputs a pair of output signals ISPR1 and ISPR0 in synchronism with a timing clock CLK appearing next to the OEVC signal. The pair of output signals ISPR1 and ISPR0 are obtained by encoding the highest priority level of priority levels stored in the priority-level-under-execution register 7. In addition, when no interrupt request signal is acknowledged, the priority-level-under-execution register 7 brings an ENISPR signal into "0". On the other hand, a priority level is stored in the priority-level-under-execution register 7, the ENISPR signal is brought into "1". In addition, the priority-level-under-execution register 7 operates to respond to a CLRIP signal so as to clear a current priority level and to output a priority level just before the current priority level. Here, the ISPR1 signal has a weight of "2", and the ISPR0 signal has a weight of "1".

A latch circuit 9 latches the output of the OR gate OG1 when the timing signal STG3 is "1" and the timing clock CLK is "0" to output the latched data in response to the next timing clock, so that the output of the latch circuit 9 is outputted through an AND gate AG2 as the interrupt processing request signal INTRQ at the timing of "1" of the timing signal STG0. The latch circuit 9 is reset by a reset signal RSET and a CLRIF signal.

Three P-channel MOS transistors Q1 to Q3 are rendered conductive when an output of an inverter IV1 becomes "0", namely when the timing clock CLK is "1", so that a SLPRH signal, a CM1 signal and a CM2 signal are brought to a voltage supply voltage $V_{DD}$, namely to "1", respectively. A signal line of each of the SLPRH signal, the CM1 signal and the CM2 signal is connected to a capacitor (not shown), which is precharged to "1" during each period in which the clock is "1". The SLPRH signal is a vector interrupt request signal, and the CM1 signal and the CM2 signal are interrupt priority level discrimination signals.

An output signal CMOT of the interrupt request signal controller 3D is supplied as an input signal CMIN to the interrupt request signal controller 3C, and an output signal CMOT of the interrupt request signal controller 3C is supplied as an input signal CMIN to the interrupt request signal controller 3B. Similarly, an output signal CMOT of the interrupt request signal controller 3B is supplied as an input signal CMIN to the interrupt request signal controller 3A, and an output signal CMOT of the interrupt request signal controller 3A is supplied as an input signal CMIN to the acknowledged interrupt request controller 4.

Figure 5:
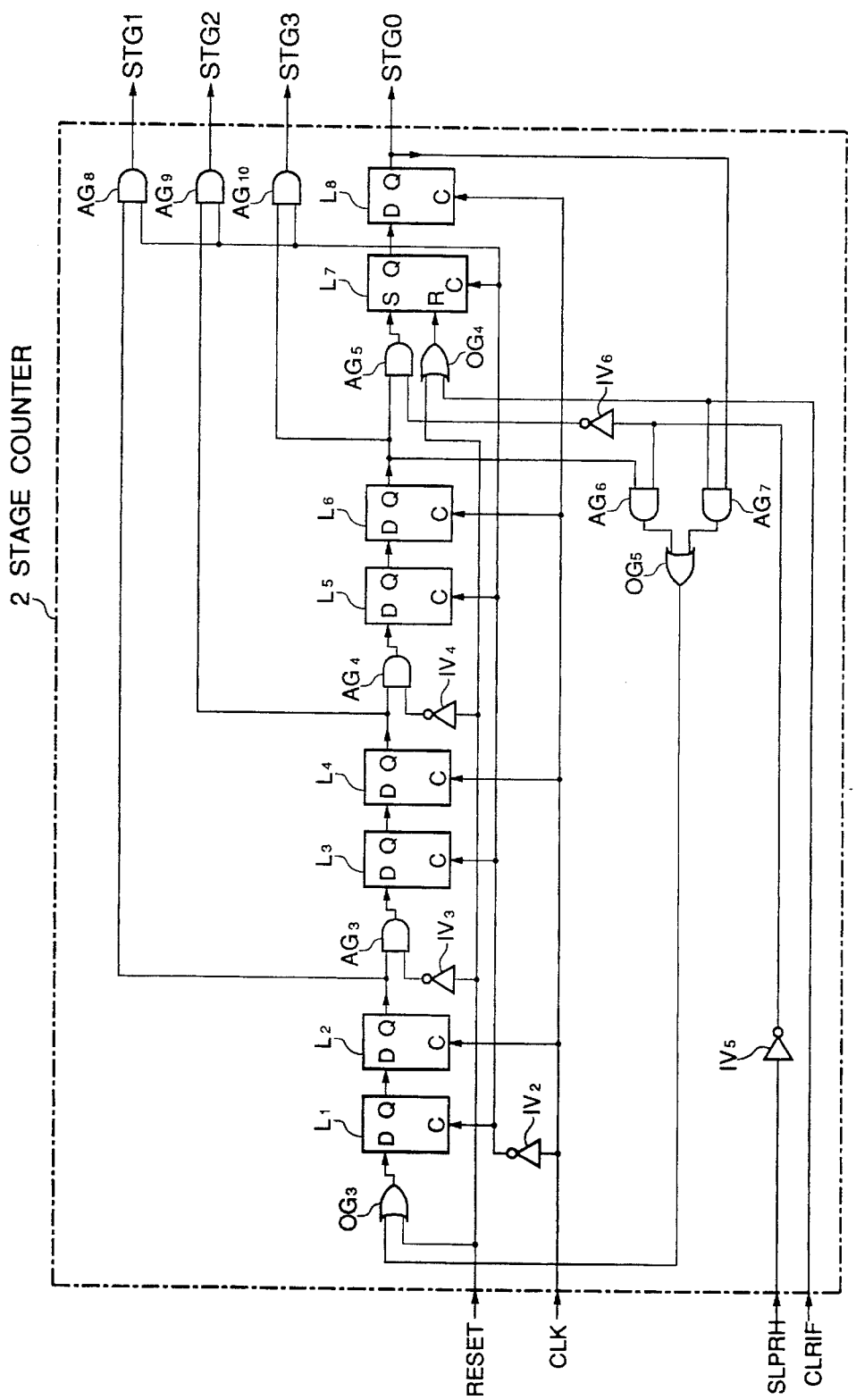
FIG. 5 is a logic circuit diagram of the stage counter used in the interrupt controller shown in FIG. 4.

Referring to FIG. 5, there is shown a logic circuit diagram of the stage counter 2.

In an initial condition, if the reset signal RESET is brought into "1", a latch circuit L1 is initialized to "1" at the timing of "0" of the timing clock CLK, and similarly, latch circuits L3 and L5 are initialized to "0" and a RS type latch L7 is initialized to "0". Accordingly, at the timing of "1" of a next timing clock CLK, a latch circuit L2 is brought to "1", and latch circuits L4 and L6 are brought to "0".

If the next timing clock CLK becomes "0", the timing signal STG1 is outputted from an AND gate AG8. If the reset signal RESET is brought into "0", the output "1" of the latch circuit L2 is latched into the latch circuit L3 through an AND gate AG3 when the timing clock CLK is "0".

Similarly, when the timing clock CLK is "1", the output of the latch circuit L3 is latched into the latch circuit L4, so that the latch circuit L4 is brought to "1", which is latched into the latch circuit L5 through an AND gate AG4 when the timing clock CLK is "0".

Here, assuming that the CLRIF signal is "0" and the SLPRH signal is "0", an output of an inverter IV5 is "1", and an output of an inverter IV6 is "0", so that the latch circuit L7 is maintained at "0". Therefore, the outputs of the AND gates AG6 and AG7 are "0", and the output of the OR gate OG5 is "0", so that when the timing clock CLK becomes "0", the output "0" of the OR gate OG5 is latched into the latch circuit L1 through the OR gate OG3.

Next, if the timing clock CLK is brought to "1", the latch circuit L2 is brought to "0", and the latch circuit L4 is brought to "1". When the timing clock CLK becomes "0", the timing signal STG2 is brought into "1".

Then, when a next timing clock CLK is "0", the latch circuit L5 is brought to "1", and if the timing clock CLK is next brought to "1", the latch circuit L5 is brought to "0", and the latch circuit L6 is brought to "1". When the timing clock CLK becomes "0", the timing signal STG3 is brought into "1".

When the SLPRH signal is "0", the latch circuit L7 is in no way brought to "1", and "1" and "0" are sequentially and cyclicly transferred through the latch circuits L1 and L2, the latch circuits L3 and L4 and the latch circuits L5 and L6, so that the timing signals STG1, STG2 and STG3 are sequentially generated.

On the other hand, when the SLPRH signal is "1" the output of the inverter IV6 is brought to "1". Therefore, if the output of the latch circuit L6 is "1" the latch circuit L7 is set to "1" when the timing clock CLK is "0".

Then, when the timing clock CLK becomes "1", a latch circuit L8 is brought into "1", so that the timing signal STG0 is outputted.

When the SLPRH signal is "1", since the output of the AND circuit AG6 becomes "0", the output of the OR gate OG5 is brought into "0". Therefore, the timing signal STG1 is not generated until the CLRIF signal is brought to "1".

Thereafter, when the CLRIF signal is brought to "0", the output of the AND gate AG7 becomes "1". Accordingly, when the timing clock CLK becomes "0", the latch circuit L1 is brought to "0". On the other hand, if the CLRIF signal is brought to "1", since the output of the OR gate OG4 is brought into "1", the latch circuit L7 is reset. Accordingly, the timing signal STG1 is generated following the timing signal STG0.

Figure 6:
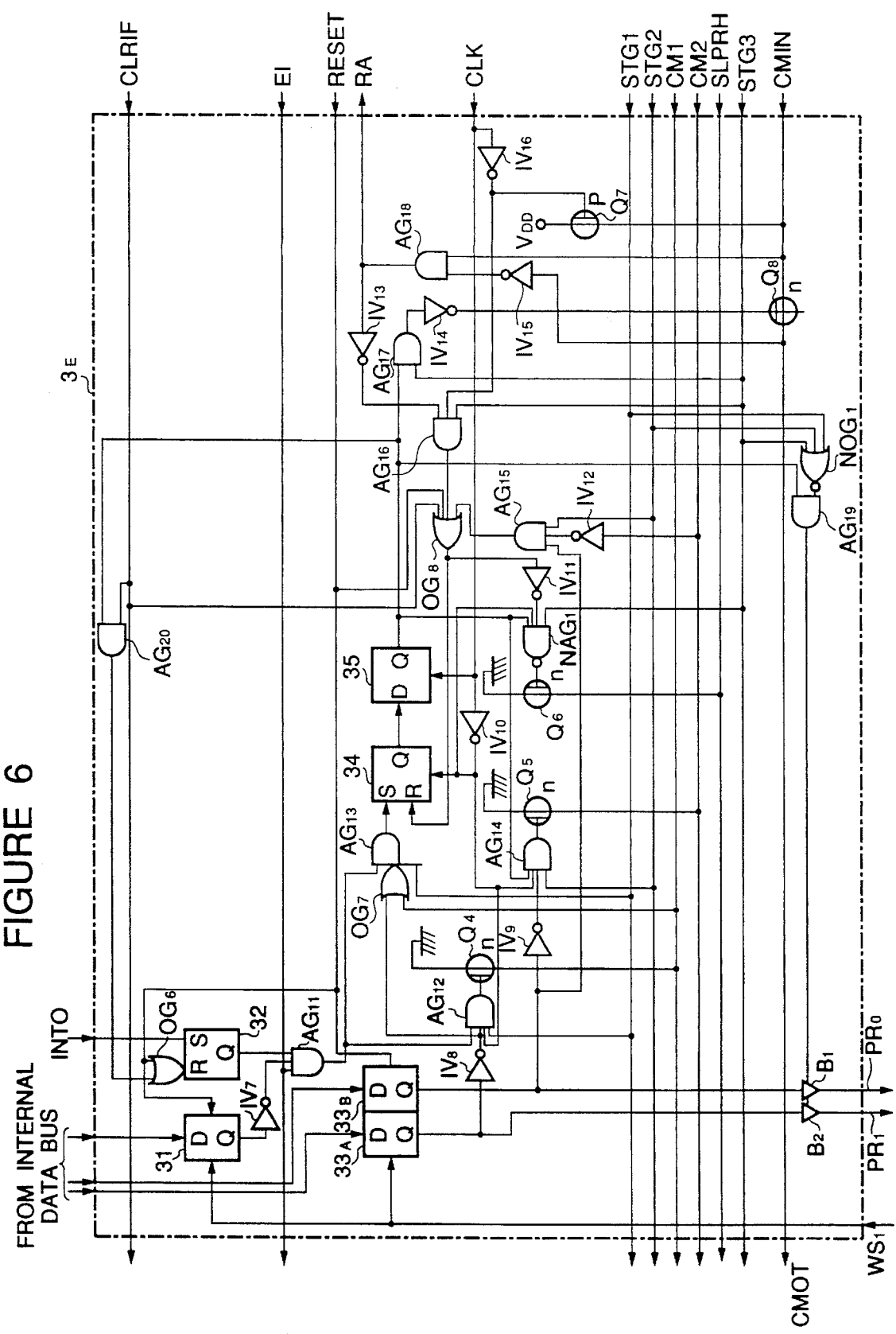
FIG. 6 ia logic circuit diagram of the interrupt request signal controller used in the interrupt controller shown in FIG. 4.

Referring to FIG. 6, there is shown a logic circuit diagram of the interrupt request signal controller 3A. Since the interrupt request signal controllers 3A to 3D have the same construction, only the interrupt request signal controller 3A is shown.

When the interrupt request signal INT0 is inputted, if the content of the mask bit register 31 is "0" and the interrupt enable signal EI is "1", the output of the AND gate AG11 is brought into "1".

The priority bit register 33A has a weight of "2", and the priority bit register 33B has a weight of "1". When the priority bit register 33A is "0", the output of the inverter IV8 is "1".

When the timing signal STG1 is brought into "1", the output of the AND gate AG12 is brought into "1" at the timing of "0" of the timing clock CLK, so that an N-channel transistor Q4 us turned on so as to bring the CM1 signal into "0".

As mentioned above, the CM1 signal has been brought into "1" by the precharging when the timing clock CLK is "1". However, when the output of the AND gate AG12 becomes "1", the CM1 signal is brought into "1". Simultaneously, a RS type latch 34 is latched to "1" through an OR gate OG7 and an AND gate AG13.

Next, when the timing clock CLK is brought into "1", a latch circuit 35 is brought into "1". When the timing signal STG3 is brought into "1", an output of an AND gate AG17 is brought into "1". As a result, an output of an inverter IV14 is brought into "0", and therefore, a N-channel MOS transistor Q8 is not rendered conductive. Therefore, the input signal CMIN, which has been precharged by a P-channel MOS transistor Q7 turned on when a preceding timing clock CLK was "0", is "1". On the other hand, when the output signal CMOT grounded through the acknowledged interrupt request controller 4 is "0", an output of an inverter IN15 is brought into "1". Accordingly, an output of an AND gate AG18 is brought into "1", and therefore, the RA signal is outputted.

When the priority bit register 33B is "0" and the latch circuit 35 is "1", if the timing signal STG2 becomes "1", an output of an AND gate AG14 is brought into "1" at the timing of "0" of the timing clock CLK. Therefore, an N-channel MOS transistor Q5 is turned on, so as to bring the CM2 signal into "0". As mentioned above, the CM2 signal has been brought into "1" by the precharging when the timing clock CLK is "1". However, when the output of the AND gate AG14 becomes "1", the CM2 signal is brought into "0".

An output of an AND gate AG15 is brought into "1" when the priority bit register 33B is "1", the CM2 signal is "0" and the timing signal STG2 is "1". An output of an AND gate AG16 is brought into "1" at the timing of "0" of the timing clock CLK when the RA signal is "0", "0" and the timing signal STG3 is "1". When the output of the AND gate AG15 is "1", or when the reset signal RESET is "1", or when the CLRIF signal is "1", or when the output of the AND gate AG16, an output of an OR gate OG8 is brought into "1". Thereafter, when a next timing clock CLK becomes "0", the RS latch circuit 34 is reset to "0".

When the output of the OR gate OG8 is "0", an output of an inverter IV11 is brought into "1". When the output of the latch circuit 35 is "1" and the timing signal STG3 is "1", an outut of an NAND circuit NAG1 is outputted into "0", so that an N-channel MOS transistor Q6 is turned off. Therefore, the SLPRH signal is brought to "1". When the output of the latch circuit 35 is "1" and when the timing signals STG1, STG2 and STG3 are "0", namely when the timing signal STG0 is "1", the output of the AND gate AG19 is brought into "1", so that the outputs of the priority bit registers 33A and 33B are read out through output buffers B1 and B2 as the signals PR1 and PR0.

Figure 7:
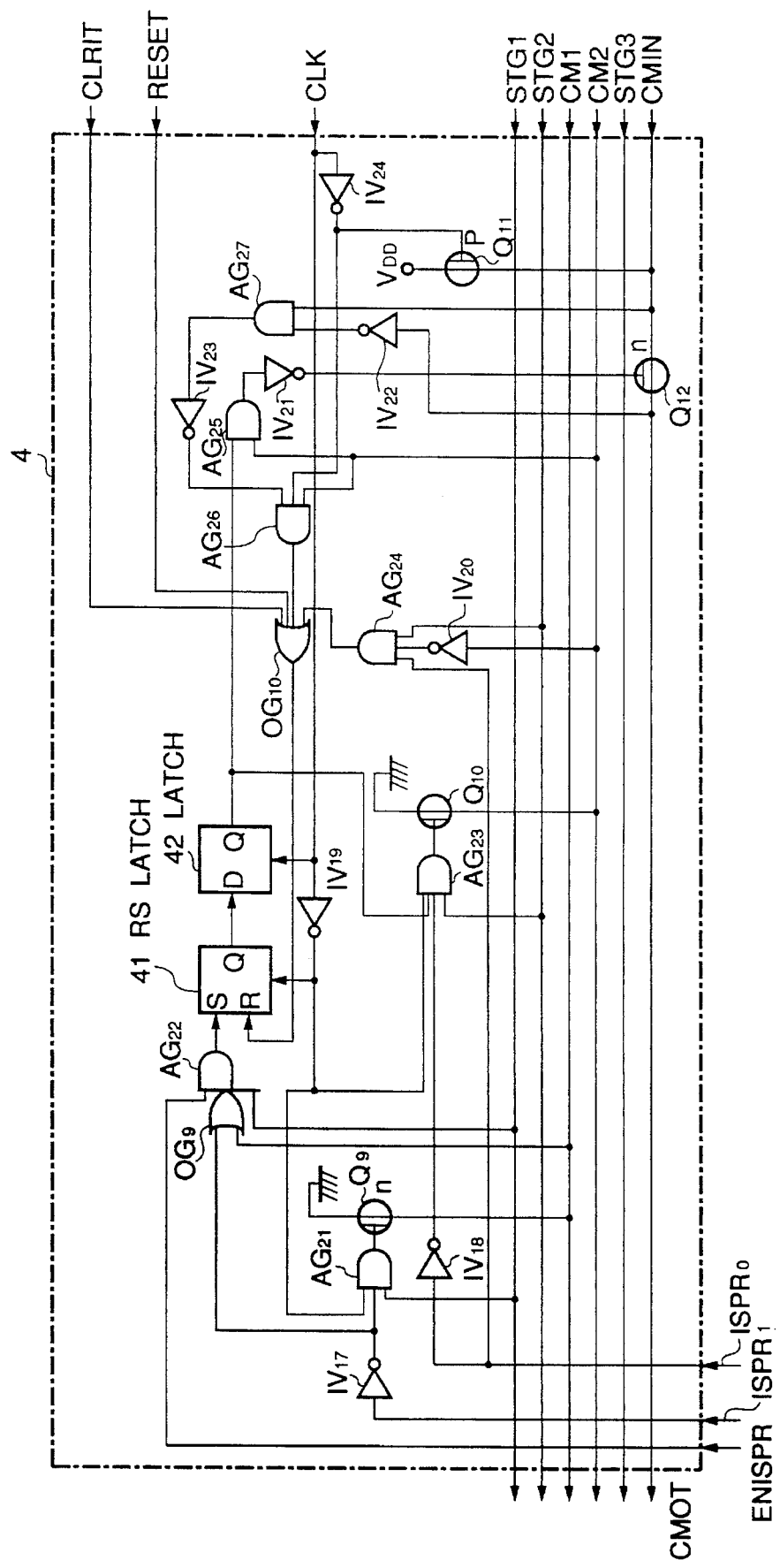
FIG. 7 is a logic circuit diagram of the acknowledged interrupt request signal controller used in the interrupt controller shown in FIG. 4.

Referring to FIG. 7, there is shown a logic circuit diagram of the acknowledged interrupt request signal controller 4. In FIG. 7, elements corresponding to those shown in FIG. 6 operate in a similar manner, and therefore, explanation will be omitted.

The circuit shown in FIG. 7 is different from the circuit shown in FIG. 6 in the following points: The output of the AND circuit AG11 shown in FIG. 6 is the ENISPR signal, and the outputs of the priority bit registers 33A and 33B are replaced by the INPR1 and ISPR0 signals. In addition, the AND circuits AG20, AG19, AG17, AG18 and AG16, the NAND circuit NAG1, the N-channel MOS transistors Q6 and Q8, the P-channel MOS transistor Q7, the inverters IV11, IV14, IV15, IV16, IV13, and the NOR gate NOG1 are omitted. The RA signal is omitted. Therefore, in the other points the circuit shown in FIG. 7 is the same as the circuit shown in FIG. 6. Accordingly, a RS latch 41 and a latch 42 correspond to the RS latch 34 and latch 45, respectively. AND gates AG12 AG22, AG23, AG24, AG25, AG26 and AG27 correspond to the AND gates AG12, AG13, AG14, AG15, AG17, AG16 and AG18. An OR gate OG10 corresponds to the OR gate OG8, and inverters IV17, IV18, IV19, IV20, IV21, IV22, IV23 and IV24 correspond the inverters IV8, IV9, IV10, IV12, IV14, IV15, IV13 and IV16, respectively. N-channel MOS transistors Q9, Q10 an Q11 and a P-channel transistors Q12 correspond to the N-channel MOS transistors Q4, Q5 and Q8 and the P-channel transistors Q7, respectively.

Figure 8:
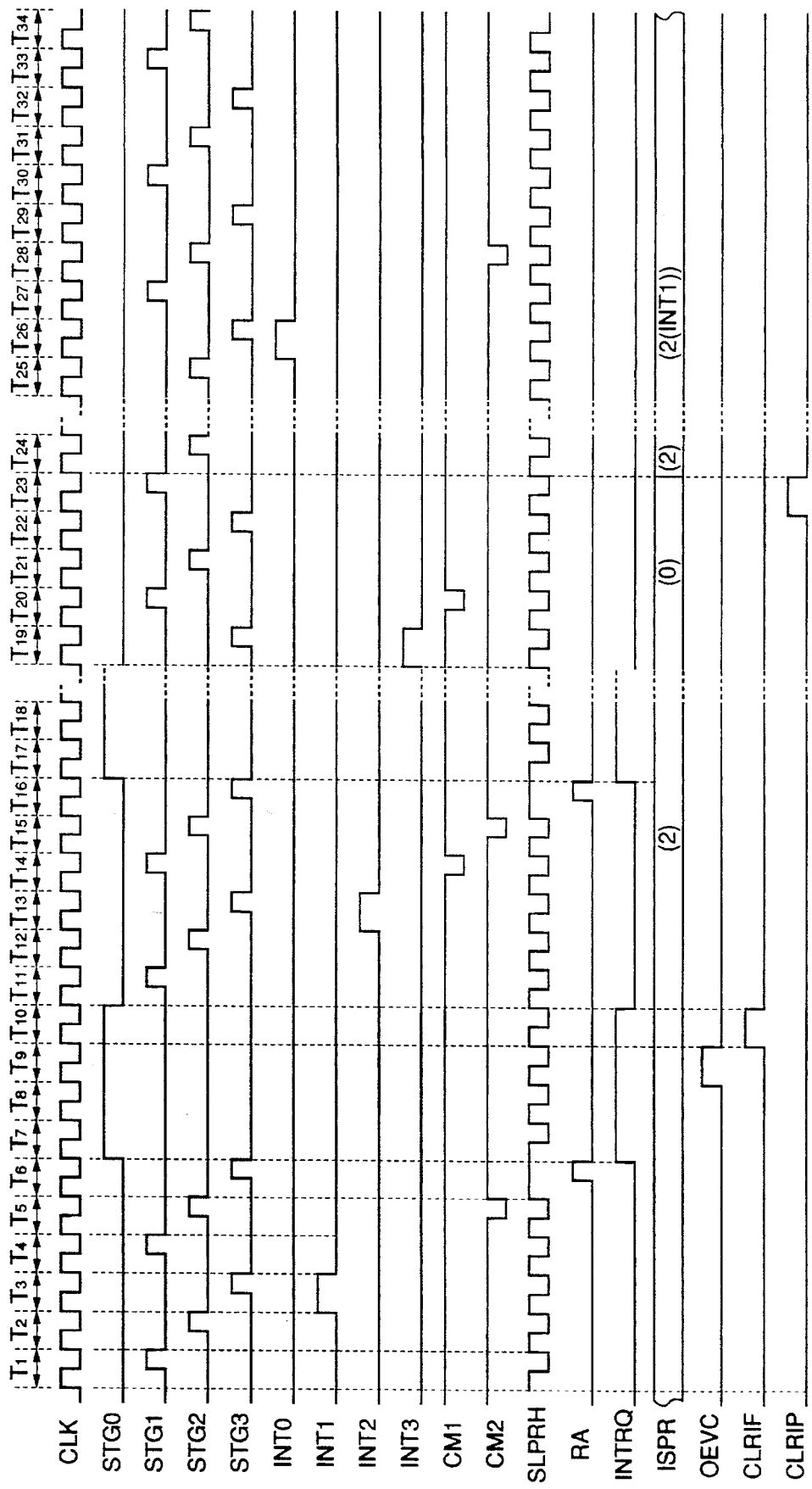
FIG. 8 is a timing chart for illustrating the operation of the interrupt controller shown in FIG. 4.

Now, operation of the first embodiment of the interrupt controller will be explained with reference to FIG. 8 showing the timing chart for illustrating the operation of the interrupt controller.

Here, similarly to the operation of the conventional example, assume that the mask bit register 31 of the four interrupt request signal controller 3A, 3B, 3C and 3D (corresponding to the interrupt request signals INT0, INT1, INT2 and INT3, respectively) are set to "0", "0", "0" and "0", respectively, and that the priority bit registers 33A and 33B of the four interrupt request signal controllers 3A, 3B 3C and 3D are set to "1, 0" (priority level "2"), "1, 0" (priority level "2"), "0, 0" (priority level "0"), and "0, 1"

(priority level "1"), respectively. In addition, the EI signals is "1".

The timing signals STG1, STG2 STG3, are sequentially outputted by alternately repeating "1" and "0". At the timing T3, the interrupt request signal INT1 is brought into "1", the content of the interrupt request flag register 32 is brought into "1". At this time, since no interrupt request signal has yet been acknowledge and the output signal ENISPR of the priority-level-under-execution register 7 is "0", the output of the AND gate AG21 of the acknowledged interrupt request controller 4 is maintained at "0". Similarly, the output of the AND gate AG12 in the interrupt request signal controllers 3A, 3C and 3D are maintained at "0", "0" and "0", respectively. Therefore, the CM1 signal is maintained at "1".

As a result, in the timing T4, the RS latch 34 is brought to "1" when the timing clock CLK is "0".

Ar the timing T6, the output of the latch circuit 35 is brought into "1", and when the timing signal STG3 is brought into "1", the output of and AND gate AG17 is brought to "1", so that the input signal CMIN precharged to "1" in a just preceding timing clock CLK is isolated by the turned-off MOS transistor Q8. Since the outputs of the inverters IV21 and IV14 of the acknowledge interrupt request controller 4 and the interrupt request signal controller 3A are "1", the input of the inverters IV22 and IV15 are grounded, and therefore, the output of the inverters IV22 and IV15 are brought into "1". On the other hand, the input signal CMIN is precharted to "1". Therefore, the output of the AND gate AG18 is brought into "1". Namely, the RA signal is brought to "1". Since the priority bit register 33B is "1", the output of the AND gate AG14 becomes "0", and therefore, the CM2 signal becomes "1". Since the CM2 signal is "1" and the output of the inverter IV12 is "0", the output of the AND gate AG15 is "0", and therefore, the RS latch circuit 34 is not reset. Since the RA signal corresponding to the interrupt request signal INT1 is "1", when the timing clock CLK becomes "0", the latch circuit 9 is brought into "1". In addition, when the timing signal STG3 becomes "1", the output of the NAND gate NAG1 is brought into "0", and therefore, the SLPRH signal is maintained at "1".

As a result, at the timing T7, the timing signal STG0 is generated. Since the timing signal STG0 is "1" and the output of the latch circuit 9 becomes "1", the interrupt processing request signal INTRQ becomes "1", so that an interrupt processing is required to the CPU 100.

If the OEVC signal is outputted from the CPU 100 at the timing T9, a vector address corresponding to the interrupt request signal INT1 is read out through the output buffer 6 to the internal data bus 1, and the content of the priority bit registers 33A and 33B corresponding to the interrupt request signal INT1 is read and latched by the priority-level-under-execution register 7.

At the timing T10, the output of the priority-level-under-execution register 7 is brought to the priority level "2", so that the output signal ISPR1 is brought to "1" and the output signal ISPR0 is brought to "0", and the signal ENISPR is brought to "1". In addition, the CLRIF signal is outputted from the CPU 100. When the timing clock becomes "0", the RS latch circuit L7 becomes "0", and the latch circuit L8 becomes "0".

At the next timing T11, the timing signal STG1 is generated.

If the interrupt request signal INT2 is generated at the timing T13, the output of the AND gate AG12 in the interrupt request signal controller 3C is brought to "1" at the timing T14. When the timing clock CLK becomes "0", the RS latch circuit 34 becomes "1". Since the output of the AND gate 21 is "0" and the output of the AND gate AG22 is "0", the RS latch circuit 41 is maintained at "0". Thereafter, similarly to the interrupt request signal INT1, the timing signals STG2, STG3 and STG0 are generated at the timings T15, T16 and T17. The interrupt processing request signal INTRQ is brought into "1" at a timing (T17) next to the timing T16.

Then, if the OEVC signal is brought into "1" by the CPU 100, the priority-level-under-execution register 7 latches the priority level "0". In addition, in response to the CLRIF signal, the stage counter sequentially outputs the timing signals from the timing signal STG1.

If the interrupt request signal INT3 is generated at the timing T19, an operation of checking the priority level of the interrupt request signal INT3 starts at the timing T20.

Since the output signals ISPR1 and ISPR0 of the priority-level-under-execution register 7 are "0" and "0", respectively, the ouput of the AND gate AG21 is brought into "1", and the CM1 signal is brought to "0". As a result, since the output of the AND gate AG13 on the interrupt request signal controller 3D is maintained at "0", the output of the RS latch 34 is maintained at "0". Therefore, the RA signal is maintained at "0" even at the timing T22. In addition, the interrupt processing request signal INTRQ is not generated at the timing T23. Accordingly, the interrupt request signal INT3 having the priority level "1" cannot interrupt the interrupt processing of the interrupt request signal INT1 having the priority level "0".

At the timing 23, if the CLRIP signal is generated, the content of the priority-level-under-execution register 7 is returned to the just preceding priority level "2".

At the timing T26, if the interrupt request signal INT0 is generated, since the output signals ISPR1 and ISPR0 of the priority-level-under-execution register 7 are "1" and "0" at the timing T27, respectively, the output of the AND gate AG21 becomes "0" and the CM1 signal becomes "1". The output of the AND gate AG22 becomes "1" so that the RS latch circuit 41 is set. When the timing clock CLK becomes "1", the output of the latch circuit 42 is brought to "1". Since the ISPRQ is "0", the output of the AND gate AG23 is maintained at "0", the CM2 signal is maintained at "1".

Accordingly, the output of the AND gate 24 is maintained at "0", the output of the OR gate OG10 is also maintained at "0", and therefore, the RS latch circuit 41 is not reset.

Since the priority level (level 2) of the interrupt request signal INT0 is the same as that of the preceding one, the content of the priority bit registers 33A and 33B is also the same, and the interrupt request signal controller 3A operates similarly, so that the output of the latch circuit 35 becomes "1".

At the timing of "1" of the timing signal STG3, the output of the AND gate AG25 of the acknowledged interrupt request controller 4 and the output of the AND gate AG17 of the interrupt request signal controller 3A are brought into "1", respectively, and therefore, outputs of the inverters IV21 and IV14 are brought into "0", so that the MOS transistors Q12 and Q8 are turned off. Accordingly, only the grounded output signal CMOT of the acknowledged interrupt request controller 4 is "0", and the input signal CMIN of the acknowledged interrupt request controller 4 and the input signal CMIN and the output signal CMOT of the interrupt request signal controller 3A are maintained "1", since the signal CMIN has been precharged when the timing clock CLK was "1".

Therefore, the output of the inverter IV22 of the acknowledged interrupt request controller 4 becomes "1", and the output of the AND gate AG27 is brought into "1", so that the output of the inverter IV23 is brought into "0" and the output of the AND gate AG26 is also brought to "0". Accordingly, the output of the OR gate OG10 is also brought to "0". In the interrupt request signal controller 3A, on the other hand, the output of the inverter IV15 becomes "0", and the output of the AND gate AG18 also becomes "0", so that the RA signal is maintained at "0". Simultaneously, the output of the inverter IV13 is brought into "1", and the output of the AND gate AG16 is brought into "1", so that the output of the OR gate OG8 is brought into "1", and the RS latch circuit 34 is reset. Namely, the interrupt request signal INT0 is not acknowledged, and therefore, the interrupt processing request signal INTRQ is not outputted.

Thereafter, although not shown in the timing chart, when no interrupt request has not been acknowledged, if the interrupt request signals having the priority level "0" and the contents "0" and "0" of the priority bit registers 33A and 33B are generated, namely, when two interrupt requests having the same priority level are generated, the output of the AND gate AG17 of the interrupt request signal controllers 3A and 3B is brought into "1" at the timing of "1" of the timing signal STG3, and therefore, the output of the inverter IV14 is brought into "0", so that the MOS transistor Q8 is turned off in both of the interrupt request signal controllers 3A and 3B.

As mentioned above, since no interrupt request is not acknowledged at this timing, the output of the latch 42 of the acknowledged interrupt request controller 4 is "0", and therefore, the output of the AND gate AG25 is "0" and the output of the inverter IV21 is also "0". Accordingly, the MOS transistor Q21 is in a turned-on condition. Thus, the output signal CMOT of the interrupt request signal controller 3A is grounded and therefore is brought into "0". On the other hand, the input signal CMIN of the interrupt request signal controller 3A and the output CMOT and the input signal CMIN of the interrupt request signal controller 3A are "1". Therefore, only the output of the inverter IV15 of the interrupt request signal controller 3A is brought into "1", and accordingly, the output of the AND gate AG18, namely, the RA signal corresponding to the interrupt request signal INT0 is brought into "1". However, the output of the inverter IV15 of the interrupt request signal controller 3B is brought into "0", and accordingly, the output of the AND gate AG18, namely, the RA signal corresponding to the interrupt request signal INT1 is brought into "0". Thus, when the interrupt request signals INT0 and INT1 having the same priority level are generated, the interrupt request signals INT0 has priority over the interrupt request signal INT1.

As mentioned above, when an interrupt processing having a high priority level is requested in the course of the execution of an interrupt processing having a low priority level, the priority level is scanned from a higher priority bit to a lower priority bit in the order of weight. Therefore, the interrupt controller can respond to the interrupt request at a speed higher than that of the conventional interrupt controller. In addition, when an interrupt request having the same priority level as that of the interrupt processing being currently executed is generated, and when two or more interrupt requests having the same priority level are simultaneously generated, an interrupt request having a high default (high in the order of preference set by a circuit) is acknowledged, but an interrupt request having a low default is not acknowledged.

Therefore, the interrupt controller as mentioned above can flexibly comply with various interrupt requests at a high speed.

EMBODIMENT 2

Figure 9:
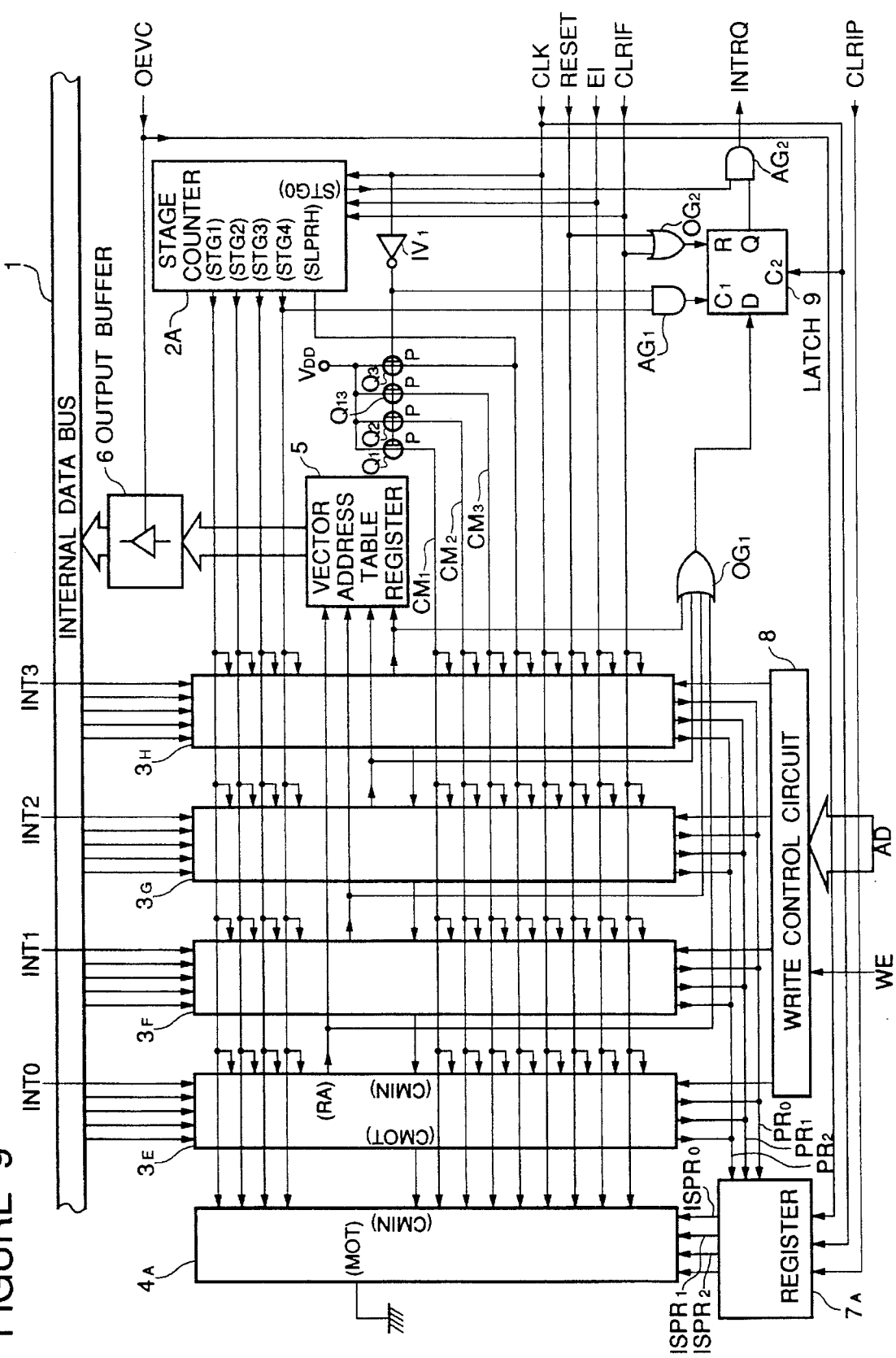
FIG. 9 is a blcok diagram of a second embodiment of the interrupt controller in accordance with the present invention.

Referring to FIG. 9, there is shown a block diagram of a second embodiment of the interrupt controller in accordance with the present invention.

Figure 11:
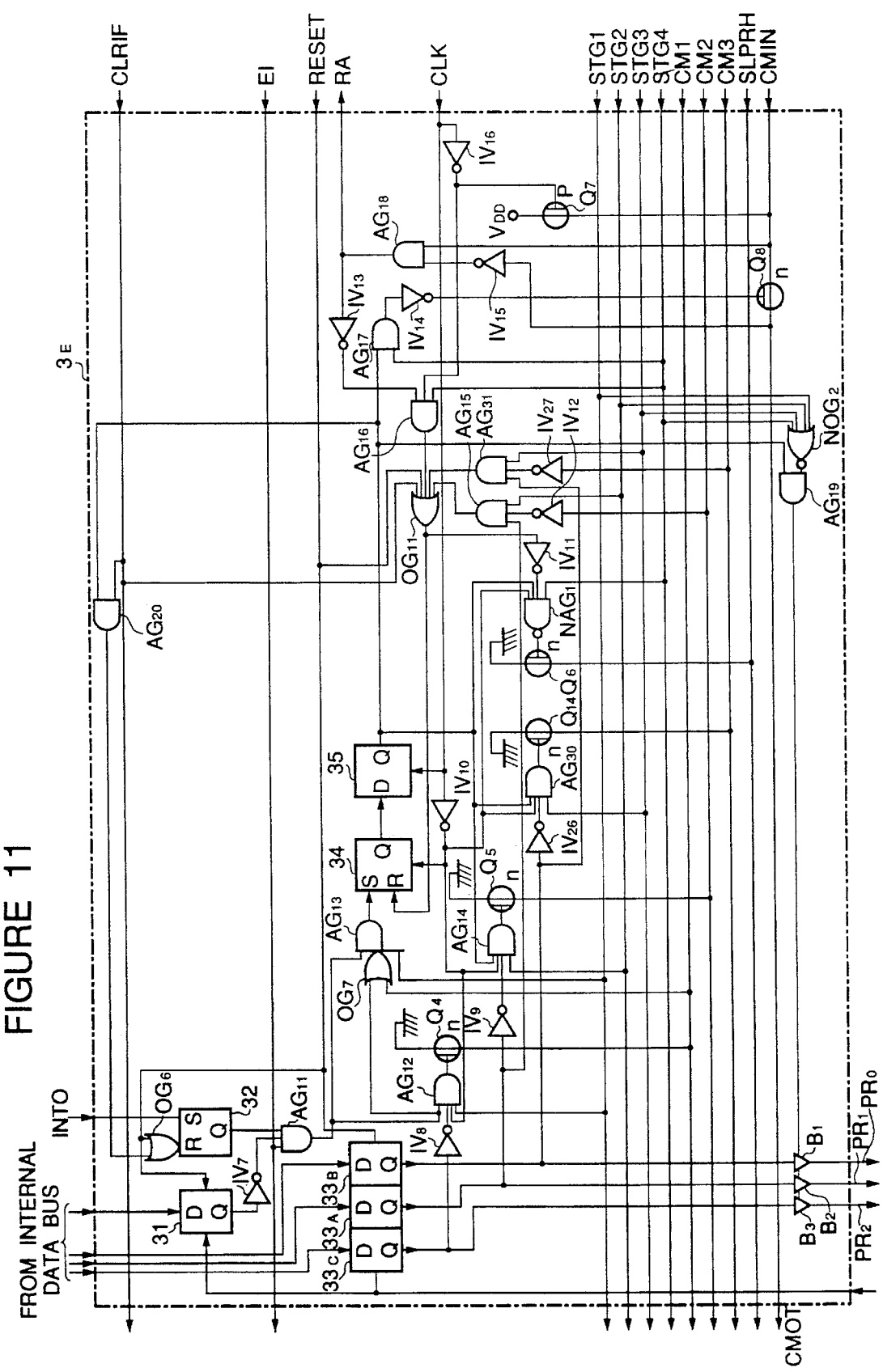
FIG. 11 is a logic circuit diagram of the interrupt request signal controller used in the interrupt controller shown in FIG. 9.
Figure 12:
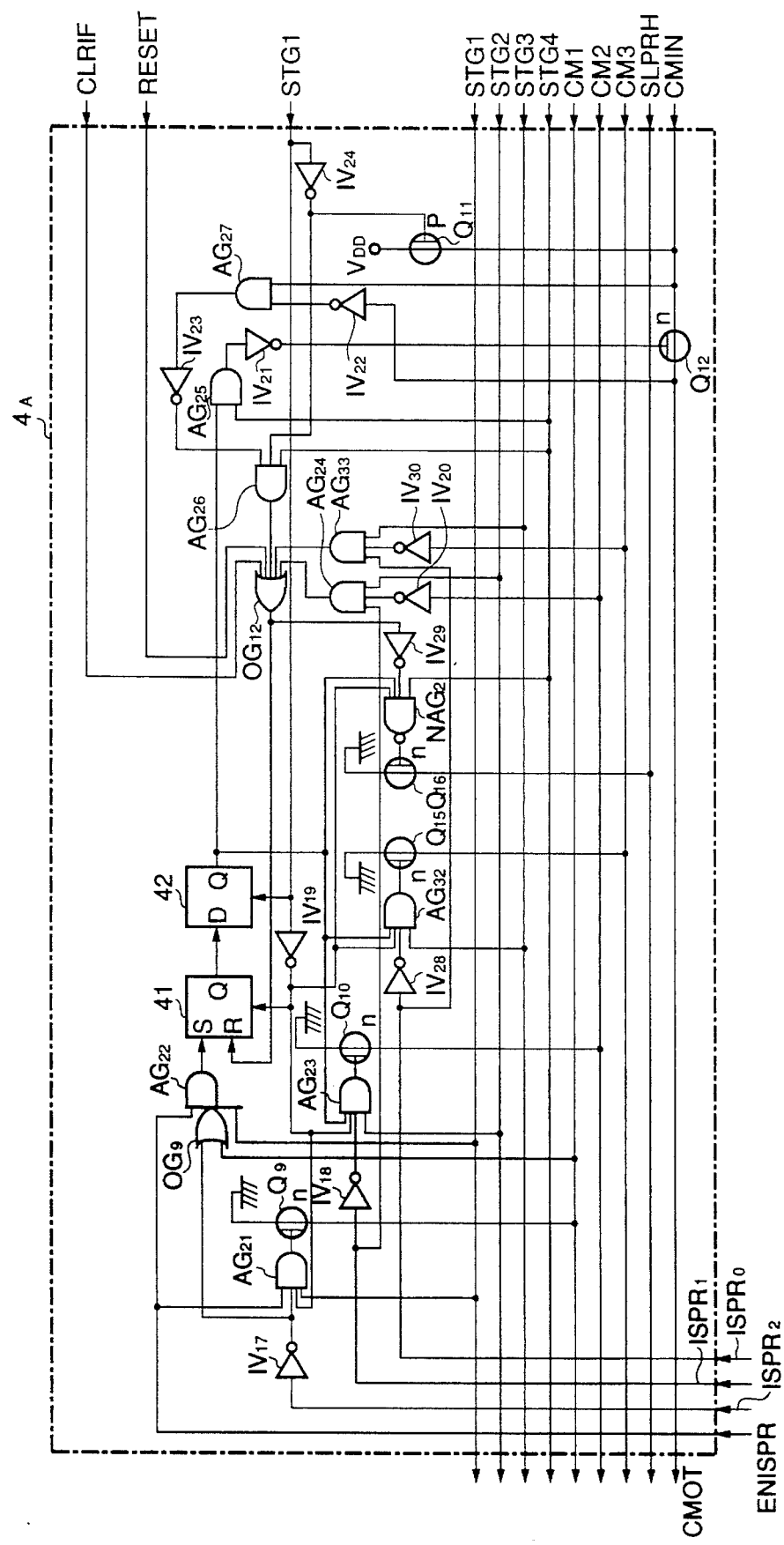
FIG. 12 is a logic circuit diagram of the acknowledged interrupt request signal controller used in the interrupt controller shown in FIG. 9.

The second embodiment is different from the first embodiment in that the priority level is divided into 8 levels. Because of this modification, the second embodiment includes a stage counter 2A modified as shown in FIG. 10, and interrupt request signal controllers 3E to 3J modified as shown in FIG. 11, and an acknowledged interrupt request controller 4A modified as shown in FIG. 12.

In FIG. 9, elements similar to those shown in FIG. 4 are given the same Reference Numerals, and explanation thereof will be omitted. The second embodiment shown in FIG. 9 is different in construction from the first embodiment shown in FIG. 4, in that the stage counter 2A generates a timing signal STG4, and a CM3 signal is supplied in common to the interrupt request signal controller 3E to 3H.

A signal line of the CM3 signal is connected to a P-channel MOS transistor Q13, similarly to the signal lines for the CM1 signal and the CM2 signal. The interrupt request signal controllers 3E to 3H generates a PR2 signal, which is supplied to the priority-level-under-execution register 7. The priority-level-under-execution register 7 generates a ISPR2 signal to the acknowledged interrupt request controller 4A. Here, the PR2 signal has a weight "4" of the priority bit, and the ISPR2 signal has a weight "4" of the priority level under execution.

Figure 10:
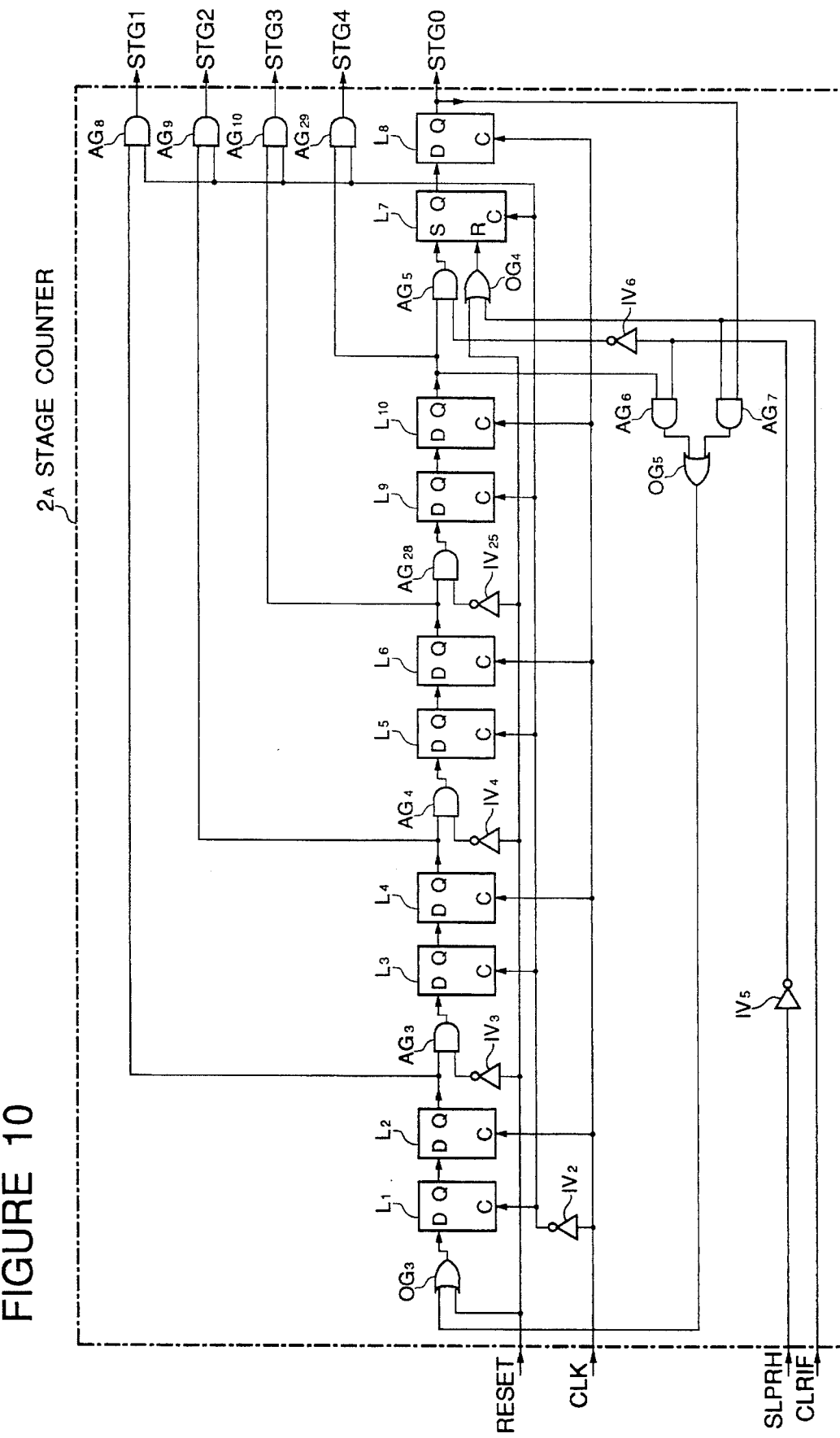
FIG. 10 is a logic circuit diagram of the stage counter used in the interrupt controller shown in FIG. 9.

In FIG. 10, elements similar to those shown in FIG. 5 are given the same Reference Numerals, and explanation thereof will be omitted. The stage counter 2A shown in FIG. 10 is different in construction from the stage counter 2 shown in FIG. 5, in that AND gates AG28 and AG29, an inverter IV25 and latch circuits L9 and L10 are added, and a timing signal STG4 is added as one output signal. The stage counter 2A operates similarly to the stage counter 2 shown in FIG. 2, but since the timing signal STG4 is generated next to the timing signal STG3, the scan signal is generated in a manner of STG1→STG2→STG3→STG4→STG1 . . . .

FIG. 11 shows only the interrupt request signal controller 3E, since the interrupt request signal controllers 3E to 3H are the same in construction. In FIG. 11, elements similar to those shown in FIG. 6 are given the same Reference Numerals, and explanation thereof will be omitted. The interrupt request signal controller 3E shown in FIG. 11 is different in construction from the interrupt request signal controller 3A shown in FIG. 6, in the following points: In interrupt request signal controller 3E shown in FIG. 11, there are added the CM3 signal, the timing signal STG4, inverters IV26 and IV27, AND gates AG30 and AG31, a N-channel MOS transistors Q41, an output butter B3, and a priority bit register 33C. In addition, the OR gate OG11 is modified to a 5-input type, and the NOR gate NOG2 is modified to a 4-input type.

The NOR gate NOG2 is connected to receive added the timing signal STG4. The inverters IV8 and IV9 are connected to receive the outputs of the priority bit registers 33C and 33A in place of the outputs of the priority bit registers 33A and 33B. The priority bit register 33C has a weight of "4", and therefore, the priority bit registers 33A to 33C can express 8 priority levels of "0" to "7". Accordingly, the priority level is scanned in such an order that the weight of "4" is scanned by the timing signal STG1, the weight of "2" is scanned by the timing signal STG2, and the weight of "1" is scanned by the timing signal STG3.

The circuit shown in FIG. 11 operates similarly to the circuit shown in FIG. 6, except that one bit is added in the priority bit. When the timing signal STG4 is generated, if the RS latch circuit 34 is reset to "0", the SLPRH signal is brought to "1", and therefore, the next timing signal STG0 is generated, so that the interrupt request is acknowledged.

In FIG. 12, elements similar to those shown in FIG. 8 are given the same Reference Numerals, and explanation thereof will be omitted. The acknowledged interrupt request controller shown in FIG. 12 is different in construction from the acknowledged interrupt request controller shown in FIG. 8, in that the CM3 signal and the timing signal STG4 are added, and inverters IV28, IV29 and IV30, AND gates AG32 and AG33, N-channel MOS transistors Q15 and Q16, and a NAND gate NAG2 are added. The ISPR2 signal is supplied to the inverter IV17, and the ISPR1 signal is supplied to the inverter IV18. The ISPRQ signal is inputted to the inverter IV28. The acknowledged interrupt request controller shown in FIG. 12 scans the priority levels from the weight of "4", similarly to the interrupt request signal controller shown in FIG. 11.

As mentioned above, the second embodiment is such that the eight priority levels are controlled with the three timings in the order of the weight "4"→ the weight "2"→ the weight "1". In this controlling operation, the output signal CMOT of the acknowledged interrupt request controller 4A is grounded at the timing of the timing signal STG4, similarly to the first embodiment, and the output signal CMOT and the input signal CMIN of the interrupt request signal controllers 3E to 3H are connected in the manner mentioned hereinbefore. With this connection, when two or more interrupt requests having the same priority level are generated, the priority level control based on the default values can be realized with one timing.

As seen from the above, if the priority level is divided into 16 ($2^4$) levels, the priority levels can be scanned with 5 timings. Accordingly, if the priority level is divided into $2^n$ levels, the priority level discrimination and control for interrupt requests can be completed with (n+1) timings.

EMBODIMENT 3

Figure 13:
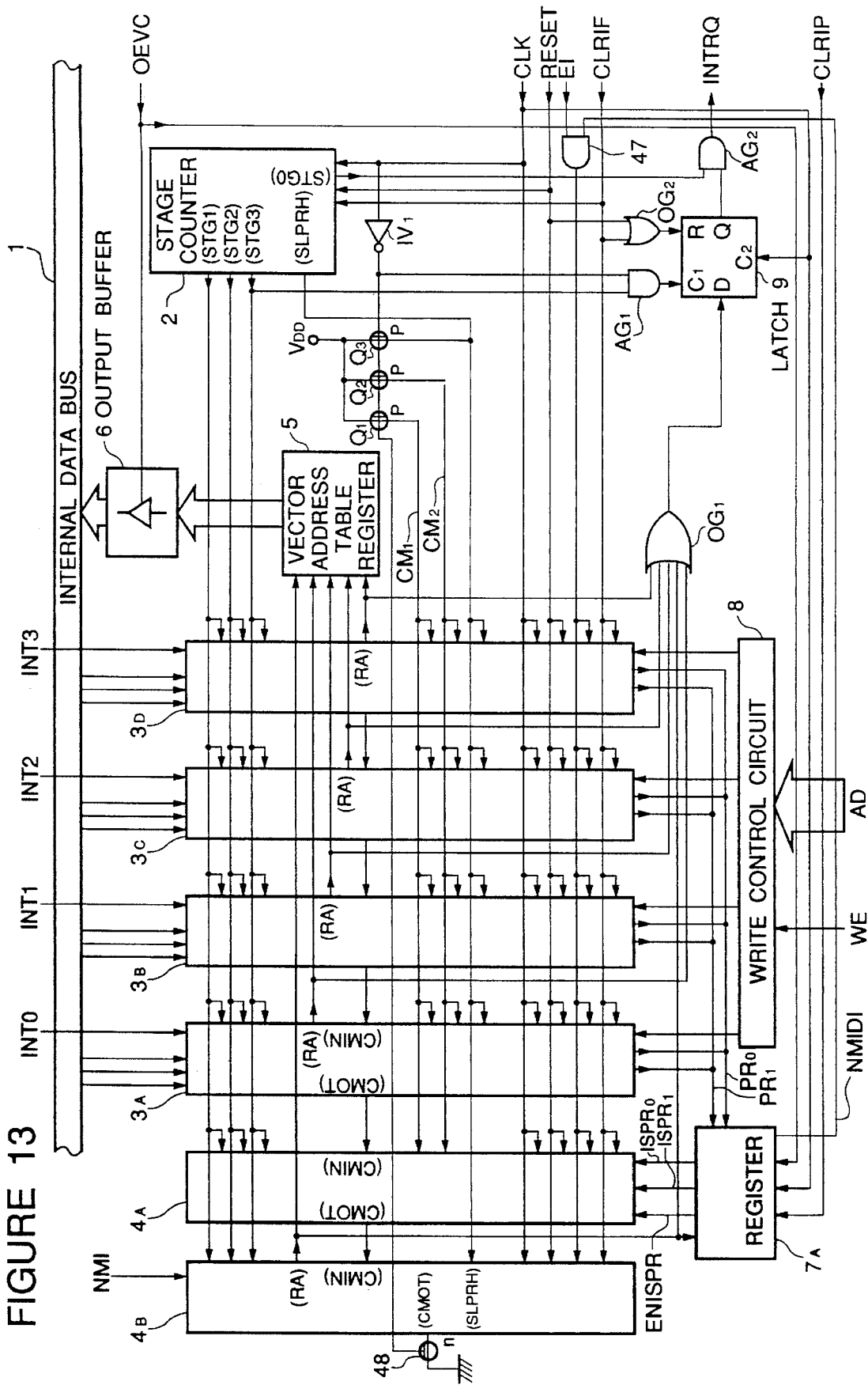
FIG. 13 is a block diagram of a third embodiment of the interrupt controller in accordance with the present invention.

Referring to FIG. 13, there is shown a block diagram of a third embodiment of the interrupt controller in accordance with the present invention. Elements similar to those shown in FIG. 4 are given the same Reference Numerals, and explanation thereof will be omitted.

As seen from comparison between FIGS. 4 and 13, the third embodiment is characterized in that an disable inhibition interrupt request signal controller 4B is provided, differently from the first embodiment.

The priority-level-under-execution register 7 reads the RA signal from the disable inhibition interrupt request signal controller 4B when the OEVC signal becomes "1". The RA signal is a signal for preparing a vector table.

In addition, when no interrupt request signal INT0 to INT3 is acknowledged, or when the RA signal is outputted from the disable inhibition interrupt request signal controller 4B and latched in the priority-level-under-execution register 7, the priority-level-under-execution register 7 brings an ENISPR signal into "0". Accordingly, the ENISPR signal is indicative of presence/absence of a memory in the priority-level-under-execution register 7, and is maintained at "0" when no priority level is stored in the priority-level-under-execution register 7, and brought to "1" when a priority level is stored in the priority-level-under-execution register 7. On the other hand, when a priority level is stored in the priority-level-under-execution register 7 and the RA signal outputted from the disable inhibition interrupt request signal controller 4B is not latched in the priority-level-under-execution register 7, the ENISPR signal is brought into "1".

In addition, in response to the CLRIP signal (the highest level clear signal), the priority-level-under-execution register 7 operates to clear the highest priority level of the priority levels being currently stored in the priority-level-under-execution register 7, and outputs a highest priority level next to the cleared highest priority level.

Furthermore, when the RA signal outputted from the disable inhibition interrupt request signal controller 4B is being latched in the priority-level-under-execution register 7, the priority-level-under-execution register 7 brings an NMIDI signal 46 to "0", which is supplied to an AND gate 47 receiving the EI signal. The NMIDI signal 46 is an else-interrupt inhibition signal for inhibiting (when NMIDI signal 46 is "0") all other interrupts during a period in which an NMI interrupt processing is executed.

The output signal CMOT of the acknowledged interrupt request controller 4 is connected to an input signal CMIN of the disable inhibition interrupt request signal controller 4B, and the output signal CMOT of the disable inhibition interrupt request signal controller 4B is grounded through an N-channel MOS transistor 48, which is turned off when the timing clock is "1", so that the levels of the output signal CMOT and the input signal CMIN (which are default priority level discrimination signals) are maintained as they are.

Figure 14:
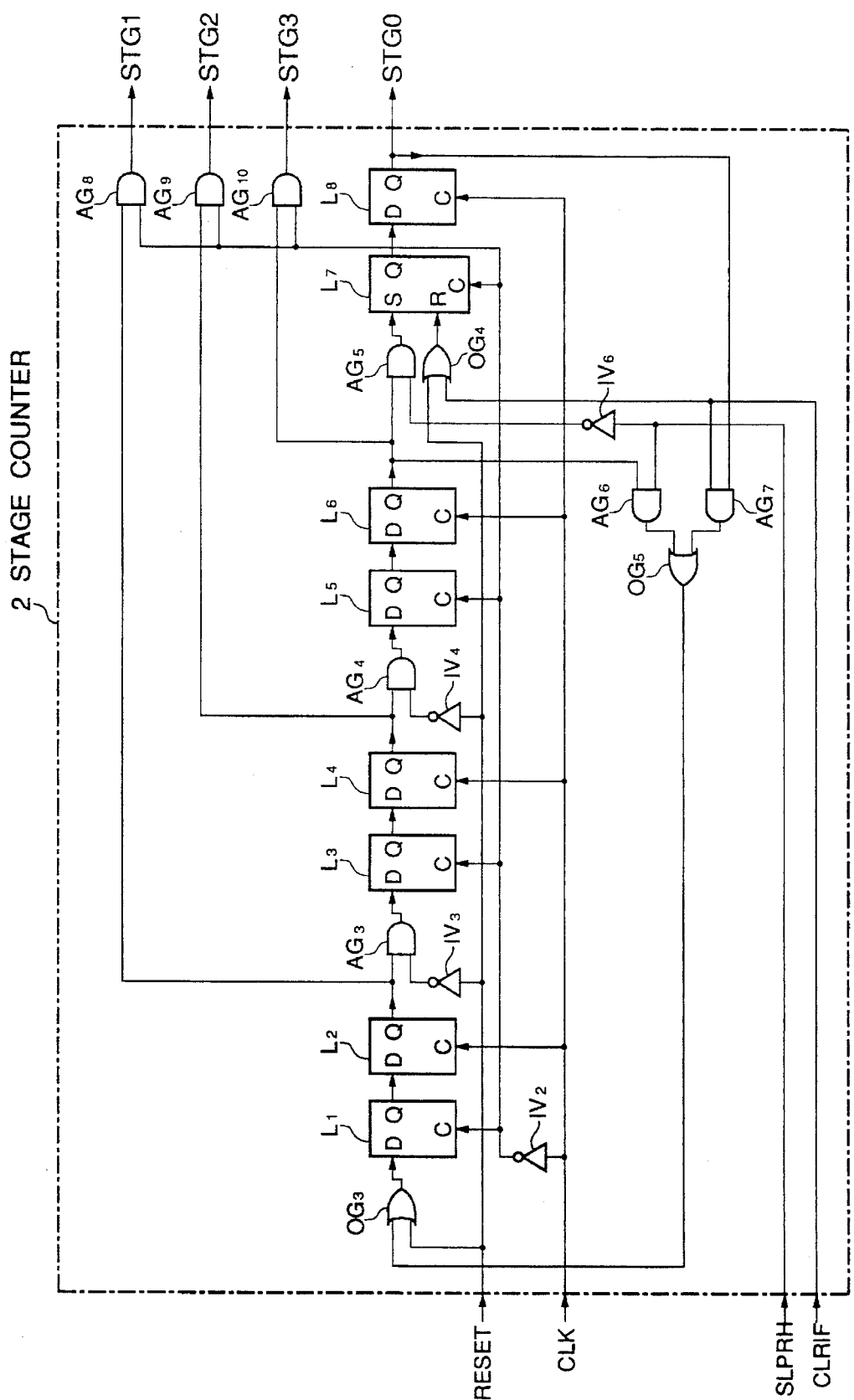
FIG. 14 is a logic circuit diagram of the stage counter used in the interrupt controller shown in FIG. 13.

Referring to FIG. 14, there is shown a logic circuit diagram of the stage counter 2 used in the interrupt controller shown in FIG. 13. The stage counter 2 shown in FIG. 14 is different from the stage counter 2 shown in FIG. 5, in which the inverter IV5 is omitted and the SLPRH signal is supplied to the AND gate AG6 through only the inverter IV6.

Therefore, when the SLPRH signal is "1", the latch circuit L7 is in no way brought to "1", and "1" and "0" are sequentially and cyclicly transferred through the latch circuits L1 and L2, the latch circuits L3 and L4 and the latch circuits L5 and L6, so that the timing signals STG1, STG2 and STG3 are sequentially generated.

On the other hand, when the SLPRH signal is "0", the output of the inverter IV6 is brought to "1". Therefore, if the output of the latch circuit L6 is "1" the latch circuit L7 is set to "1" when the timing clock CLK is "0".

Then, when the timing clock CLK becomes "1", a latch circuit L8 is brought into "1", so that the timing signal STG0 is outputted.

When the SLPRH signal is "1" again, since the output of the AND circuit AG6 becomes "0", the output of the OR gate OG5 is brought into "0". Therefore, the timing signal STG1 is not generated until the CLRIF signal is brought to "1".

In the other points, the stage counter 2 shown in FIG. 14 operates similarly to the stage counter 2 shown in FIG. 5.

The interrupt request signal controllers 3A to 3D are the same in construction as that shown in FIG. 6, and the acknowledged interrupt request signal controller 4 is the same in construction as that shown in FIG. 7. Therefore, detailed description of these elements will be omitted.

Figure 15:
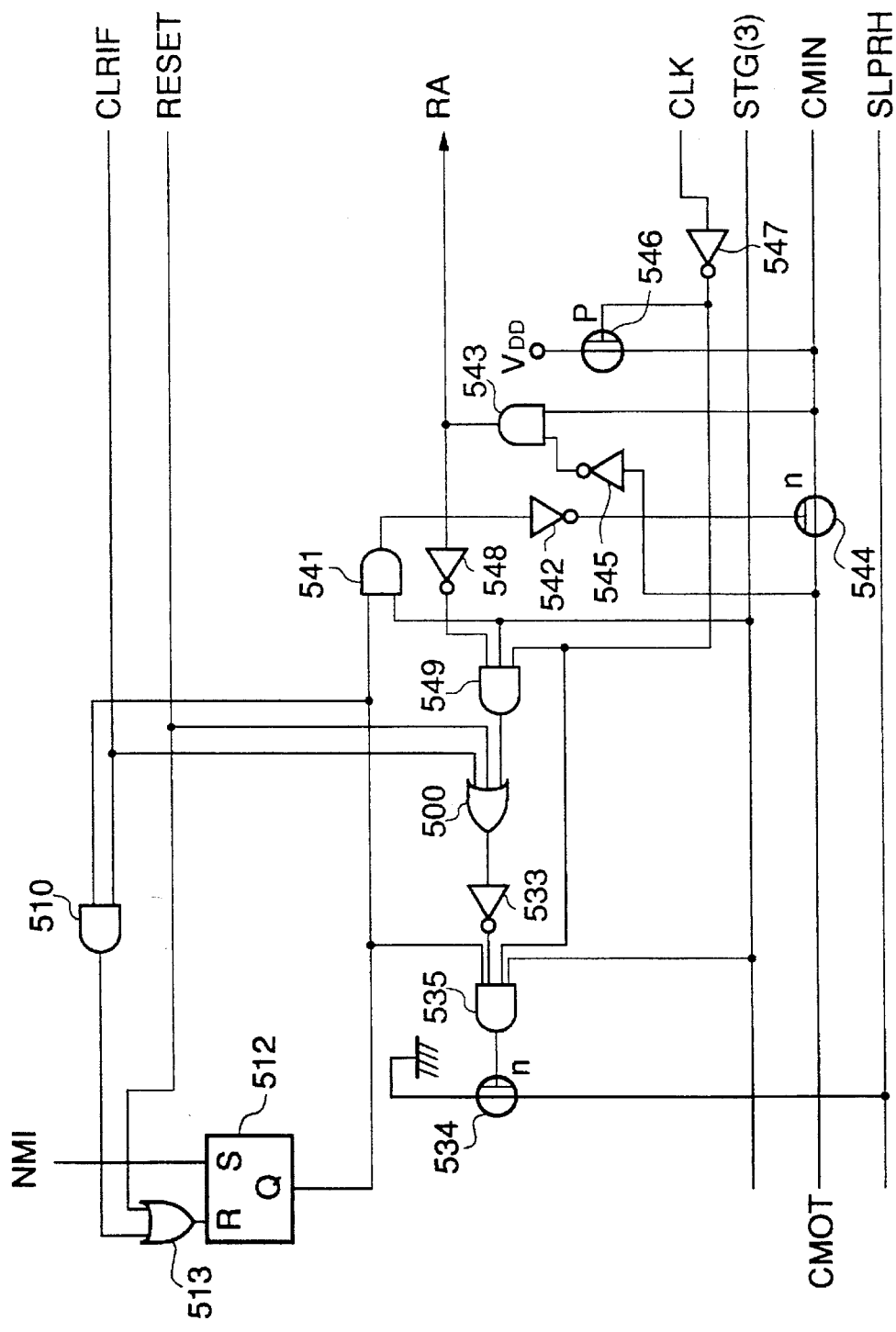
FIG. 15 is a logic circuit diagram of the disable inhibition interrupt request signal controller used in the interrupt controller shown in FIG. 13.

Referring to FIG. 15, there is shown a logic circuit diagram of the disable inhibition interrupt request signal controller 4B used in the interrupt controller shown in FIG. 13.

A RS latch 512 is set to "1" when the NM1 signal is "1", and is reset when the reset signal RESET of "1" is supplied, or when an output of an AND gate 510 becomes "1" by the CLRIF signal of "1" and a Q output of "1" of the RS latch circuit 512.

When the Q output of the RS latch circuit 512 is "1", an output of an AND gate 541 is brought to "1" at the timing of the timing signal STG3, so that an N-channel MOS transistor 544 is turned off through an inverter 542. Since the CMOT signal is directly grounded and therefore is "0", the CMIN signal is precharged to "1" when the timing clock is "1". Therefore, the RA signal outputted from an AND gate 543 is brought to "1". When this RA signal is "0", an output of an AND gate 549 is brought to "1" at the timing signal STG3 of "1" when the timing clock CLK becomes "0".

An OR gate 500 brings its output to "1" when one of the CLRIF signal, the RESET signal and the output of the AND gate 549 is "1". An output of an AND gate 535 is brought to "1" when the Q output of the RS latch circuit 512 is "1", an output of an inverter 533 is "1" (namely, the output of the OR gate 500 is "0"), the timing signal STG3 is "1" and the timing clock CLK is "0". At this time, an N-channel MOS transistor 534 is turned on, and therefore, the SLPRH signal is brought to "0".

Furthermore, since the disable inhibition interrupt request signal controller 4B has neither a priority bit nor a mask bit for masking the interrupt request, and is not influenced by the EI signal, the NMI signal supplied to the disable inhibition interrupt request signal controller 4B constitutes an interrupt request signal which is not possible to disable the acknowledgment of the interrupt request signal.

Figure 16:
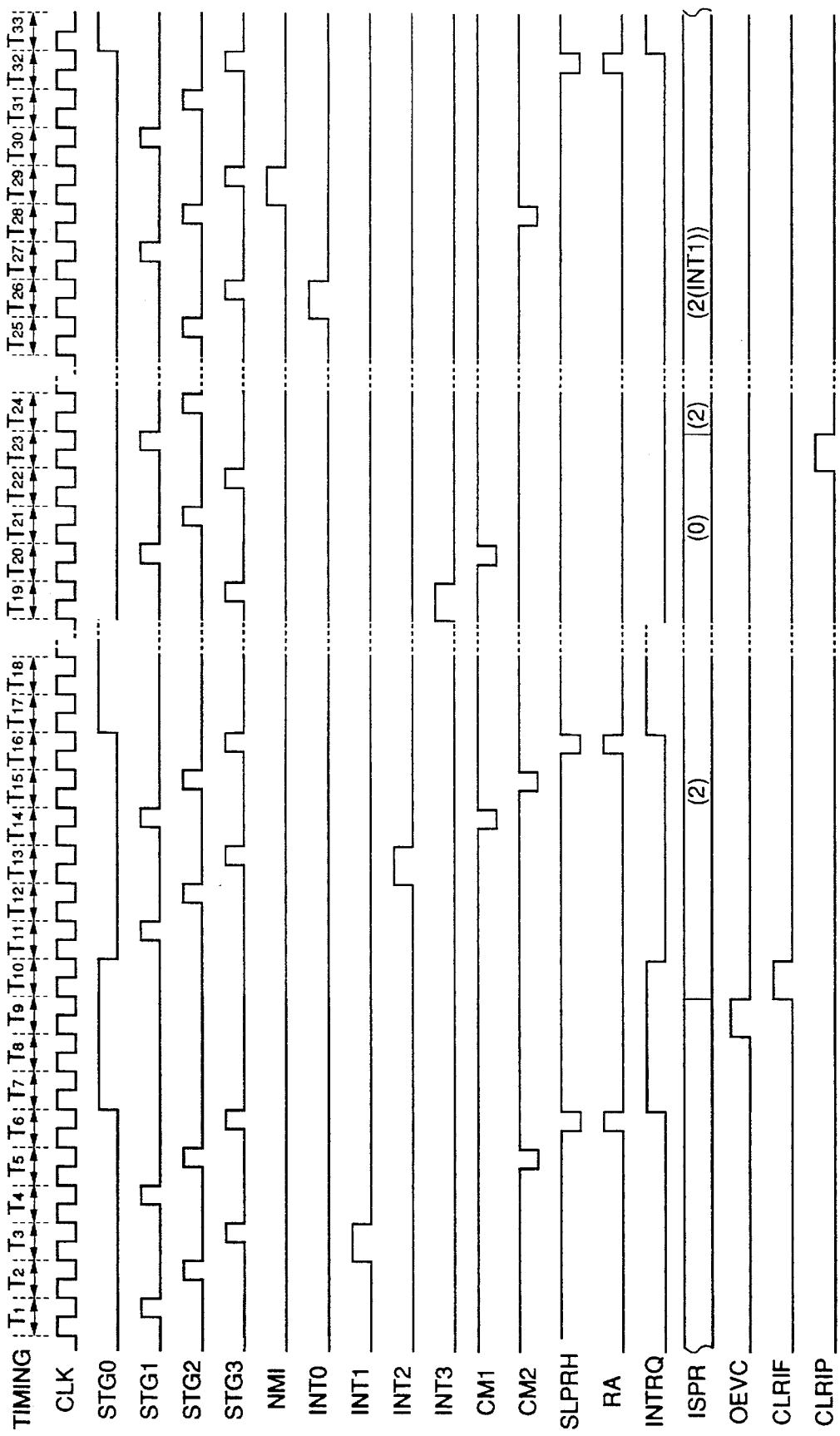
FIG. 16 is a timing chart for illustrating the operation of the interrupt controller shown in FIG. 13.

Now, operation of the third embodiment of the interrupt controller will be explained with reference to FIG. 16 showing the timing chart for illustrating the operation of the interrupt controller.

The third embodiment operates under the same condition as that of the first embodiment. In this case, the operation before the timing T26 is the same as the corresponding operation of the first embodiment, and therefore, only operation from the timing T26 will be explained.

At the timing T26, if the interrupt request signal INT0 is generated, since the output signals ISPR1 and ISPR0 of the priority-level-under-execution register 7 are "1" and "0" at the timing T27, respectively, the output of the AND gate AG21 becomes "0" and the CM1 signal becomes "1". The output of the AND gate AG22 becomes "1" so that the RS latch circuit 41 is set. When the timing clock CLK becomes "1", the output of the latch circuit 42 is brought to "1". Since the ISPR0 is "0", the output of the inverter IV18 becomes "1" and the output of the AND AG23 becomes "1". At the timing T28, if the itming signal STG2 is outputted, the CM2 signal becomes "0". However, since the ISPR0 is "0", the output of the AND gate 24 is maintained at "0", and therefore, the output of the OR gate OG10 is also maintained at "0". Accordingly, the RS latch circuit 41 is not reset.

Since the priority level (level 2) of the interrupt request signal INT0 is the same as that of the preceding one, the content of the priority bit registers 33A and 33B is also the same, and the interrupt request signal controller 3A operates similarly, so that the output of the latch circuit 35 becomes "1".

At the timing of "1" of the timing signal STG3, the output of the AND gate AG25 of the acknowledged interrupt request controller 4 and the output of the AND gate AG17 of the interrupt request signal controller 3A are brought into "1", and therefore, outputs of the inverters IV21 and IV14 are brought into "0", so that the MOS transistors Q12 and Q8 are turned off.

Accordingly, only the grounded output signal CMOT of the acknowledged interrupt request controller 4 is "0", and the input signal CMIN of the acknowledged interrupt request controller 4 and the input signal CMIN and the output signal CMOT of the interrupt request signal controller 3A are maintained "1", since the signal CMIN has been precharged when the timing clock CLK was "1".

Therefore, the output of the inverter IV22 of the acknowledged interrupt request controller 4 becomes "1", and the output of the AND gate AG27 is brought into "1", so that the output of the inverter IV23 is brought into "0" and the output of the AND gate AG26 is also brought to "0". Accordingly, the output of the OR gate OG10 is also brought to "0".

In the interrupt request signal controller 3A, on the other hand, the output of the inverter IV15 becomes "0", and the output of the AND gate AG18 also becomes "0", so that the RA signal is maintained at "0". Simultaneously, the output of the inverter IV13 brought into "1", and the output of the AND gate AG16 is brought into "1", so that the output of the OR gate OG8 is brought into "1", and the RS latch circuit 34 is reset. Namely, the interupt request signal INT0 is not acknowledged, and therefore, the interrupt processing request signal INTRQ is not outputted.

At the timing T29, the NMI signal is generated. Since as mentioned hereinbefore the disable inhibition interrupt request controller 4B is not influenced by the priority bit control, the mask bit, and the EI signal, the output of the AND gate 541 is unconditionally brought to "1" at the timing T30 when the timing signal STG1 is "1". Therefore, the N-channel MOS transistor is turned off through the inverter 543. At the timing T32, since the Q output of the RS latch circuit 512 becomes "1" when the timing signal STG3 is "1" and the timing clock CLK is "0", the output of the AND gate 535 is brought to "1", so that the N-channel transistor 534 is turned on, and therefore, the SLPRH signal is brought to "0".

In addition at the timing T32, the CMIN signal is maintained at "1", since the CMIN signal has been precharged to "1" when a just preceding time clock CLK is "1". On the other hand, since the CMOT signal of the disable inhibition interrupt request controller 4B is directly grounded, the CMOT signal is "0". Therefore, the RA signal outputted from the AND gate 543 becomes "1", and therefore, the interrupt processing request signal INTRQ is omitted to the CPU 100 at the timing T33 when the timing signal STG0 is "1".

Now, consider the following situations although not shown in the timing chart: When no interrupt request has not been acknowledged, if the interrupt request signals having the priority level "0" and the contents "0" and "0" of the priority bit registers 33A and 33B are generated, namely, when two interrupt requests having the same priority level are generated, the output of the AND gate AG17 of the interrupt request signal controllers 3A and 3B is brought into "1" at the timing of "1" of the timing signal STG3, and therefore, the output of the inverter IV14 is brought into "0", so that the MOS transistor Q8 is turned off in both of the interrupt request signal controllers 3A and 3B.

As mentioned above, since no interrupt request is not acknowledged at this timing, the output of the latch 42 of the acknowledged interrupt request controller 4 is "0", and therefore, the output of the AND gate AG25 is "0" and the output of the inverter IV21 is also "0". Accordingly, the the N-channel MOS transistor Q21 is in a turned-on condition. Similarly, the N-Channel MOS transistor 544 of the disable inhibition interrupt request controller 4B is also in in a turned-on condition. Thus, the output signal CMOT of the interrupt request signal controller 3A is grounded and therefore is brought into "0". On the other hand, the input signal CMIN of the interrupt request signal controller 3A and the output CMOT and the input signal CMIN of the interrupt request signal controller 3A are "1". Therefore, only the output of the inverter IV15 of the interrupt request signal controller 3A is brought into "1", and accordingly, the output of the AND gate AG18, namely, the RA signal corresponding to the interrupt request signal INT0 is brought into "1". However, the output of the inverter IV15 of the interrupt request signal controller 3B is brought into "0", and the accordingly, the output of the AND gate AG18, namely, the RA signal corresponding to the interrupt request signal INT1 is brought into "0". Thus, when the interrupt request signals INT0 and INT1 having the same priority level are generated, the interrupt request signals INT0 has priority over the interrupt request signal INT1.

In addition, when no interrupt request has not been acknowledged, if an interrupt request signal INT0 having the priority level "0" and the contents "0" and "0" of the priority bit registers 33A and 33B and the NMI interrupt request signal are concurrently generated, the output of the AND gate AG17 of the interrupt request signal controller 3A is brought into "1" at the timing of "1" of the timing signal STG3, and the output of the AND gate 542 of the disable inhibition interrupt request controller 4B is also brought to "1". As a result, the MOS transistor Q8 is turned off in the interrupt request signal controller 3A, and therefore, the CMIN signal is "1" because it has been precharged when the clock CLK was "1". On the other hand, the MOS transistor 544 is turned off in the disable inhibition interrupt request controller 4B, and therefore, the CMIN signal is "1" because it has been precharged when the clock CLK was "1". However, since the CMOT signal of the interrupt request signal controller 3A is connected to the CMIN signal of the disable inhibition interrupt request controller 4B, the CMOT signal of the interrupt request signal controller 3A is maintained at "1". Accordingly, the RA signal outputted from the AND gate AG18 in the interrupt request signal controller 3A is maintained at "0", and therefore, the interrupt request signal INT0 is not acknowledged. On the other hand, since the CMOT signal of the disable inhibition interrupt request controller 4B is directly grounded and therefore at "0", the RA signal outputted from the AND circuit 543 in the disable inhibition interrupt request controller 4B is brought to "1", and therefore, the NMI signal has a preference.

Furthermore, when an interrupt request having the priority level 0 has been already acknowledged, if the NMI signal is generated, the output of the AND gate AG27 of the acknowledged interrupt request controller 4 does not become "1", and on the other hand, the output of the AND gate 543 of the disable inhibition interrupt request controller 4B is brought to "1" at the timing signal STG3, so that the interrupt processing request signal INTRQ is outputted to the CPU 100 in synchronism with the timing signal STG0. Namely, the NMI signal can interrupt the processing of the interrupt processing having the priority level "0".

If the RA signal of "1" is outputted from the disable inhibition interrupt request controller 4B, the priority-level-under-execution register 7 brings the ENISPR signal to "0", the AND gates AG22 and AG21 are fixed to "0", and therefore, the RS latch circuit 41 is not set. In addition, the priority-level-under-execution register 7 brings the NMIDI signal 46 to "0", so that the output of the AND gate 47 is brought to "0". Therefore, the output of the AND gate AG11 in the interrupt request signal controllers 3A to 3D is fixed to "0", and therefore, the interrupt request signals INT0, INT1, INT2 and INT3 are no longer acknowledged. Namely, the NMI signal has the high priority level.

As mentioned above, when an interrupt processing having a high priority level is requested in the course of the execution of an interrupt processing having a low priority level, the priority level is scanned from a high priority bit to a low priority bit in the order of weight. Therefore, the interrupt controller can respond to the interrupt request at a speed higher than that of the conventional interrupt controller. In addition, when an interrupt request having the same priority level as that of the interrupt processing being currently executed is generated, and when two or more interrupt requests having the same priority level are simultaneously generated, an interrupt request having a high default (high in the order of preference set by a circuit) is acknowledged, but an interrupt request having a low default is not acknowledged. Namely, the interrupt request is acknowledged in the order of NMI, INT0, INT1, INT2, and INT3.

In addition, since the disable inhibition interrupt request controller 4B is provided, even if the NMI interrupt request competes with the interrupt request having the priority level "0", the NMI interrupt request has preference over the interrupt request having the priority level "0". The NMI interrupt request can interrupt althought the interrupt request having the priority level "0" is acknowledged. On the other hand, the disable inhibition interrupt request controller 4B can be controlled similarly to the interrupt request signal controllers 3A to 3D, without requiring any special control.

Therefore, the interrupt controller as mentioned above can flexibly comply with various interrupt requests at a high speed.

EMBODIMENT 4

Figure 17:
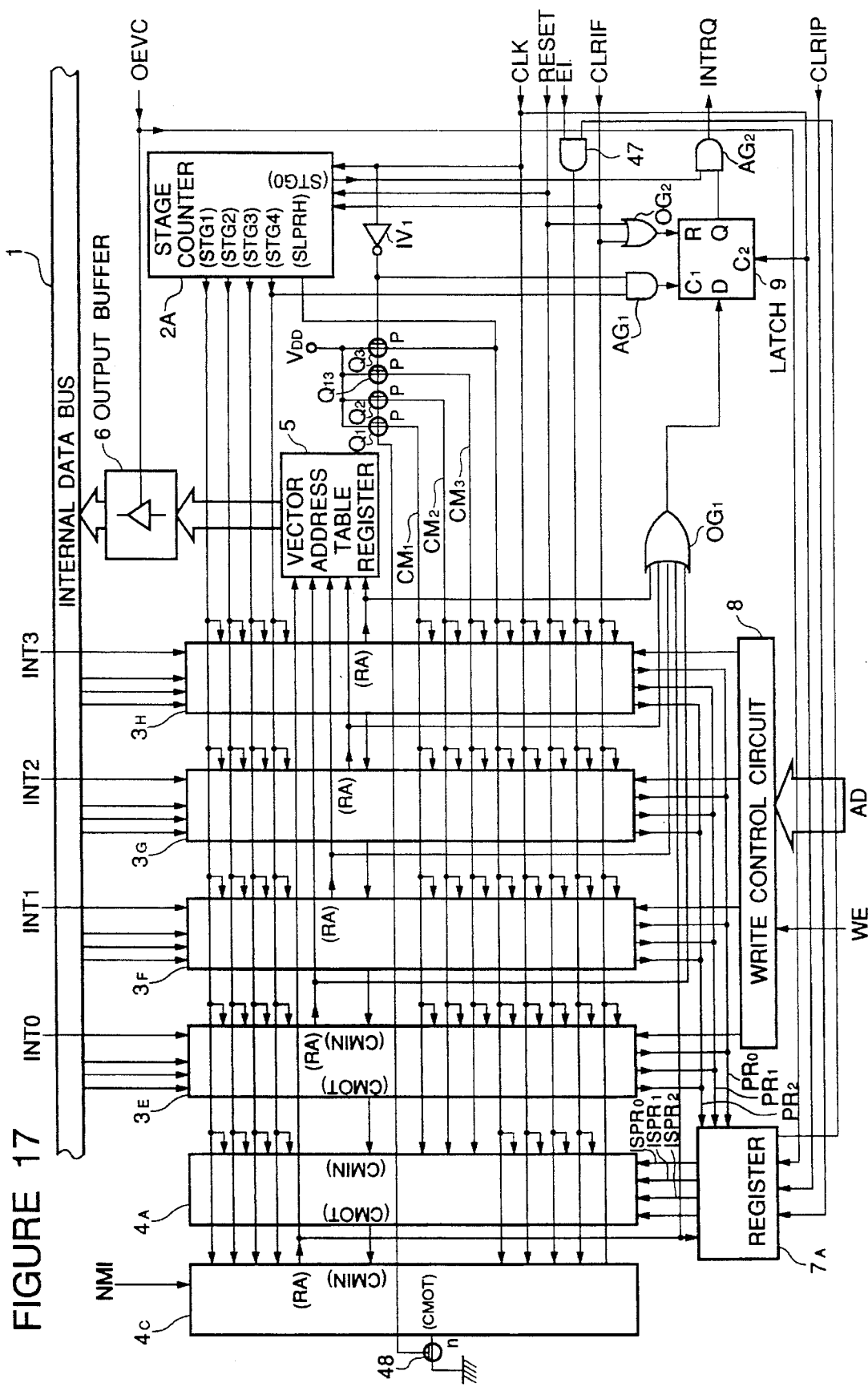
FIG. 17 is a block diagram of a fourth embodiment of the interrupt controller in accordance with the present invention.

Referring to FIG. 17, there is shown a block diagram of a fourth embodiment of the interrupt controller in accordance with the present invention.

Figure 18:
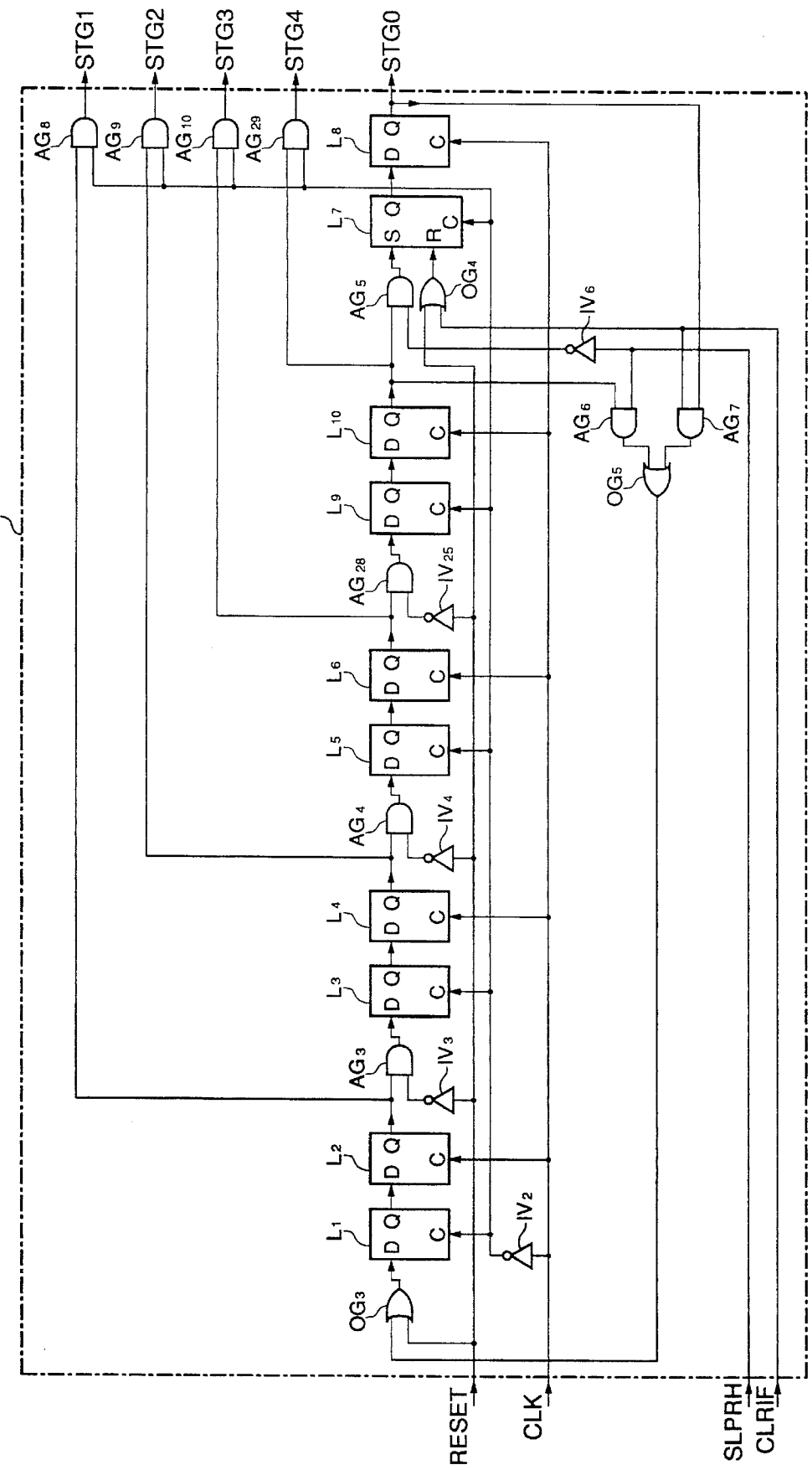
FIG. 18 is a logic circuit diagram of the stage counter used in the interrupt controller shown in FIG. 17.
Figure 19:
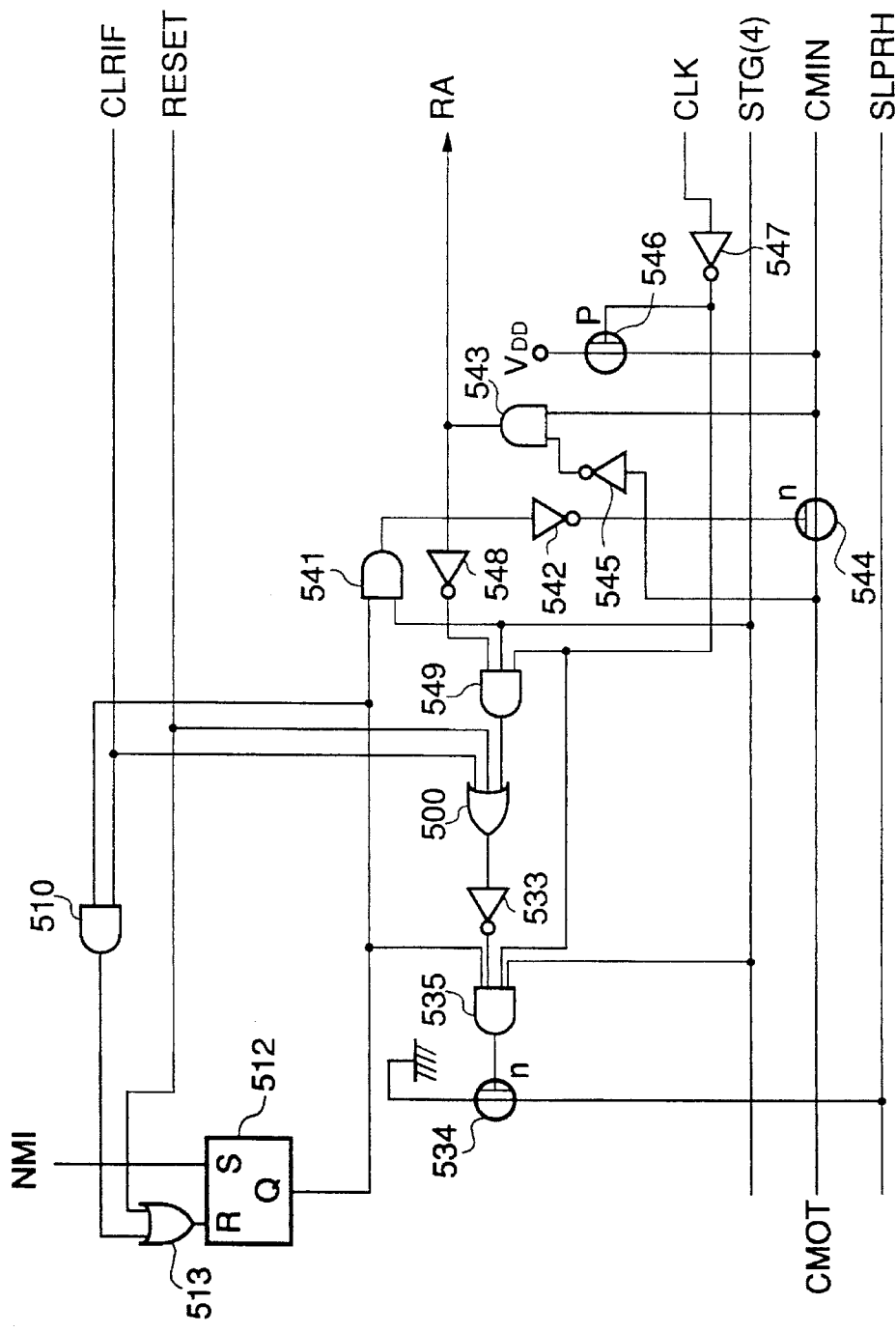
FIG. 19 is a logic circuit diagram of the disable inhibition interrupt request signal controller used in the interrupt controller shown in FIG. 17.

The fourth embodiment is different from the third embodiment in that the priority level is divided into 8 levels. Because of this modification, the second embodiment includes a stage counter 2A modified as shown in FIG. 18, and interrupt request signal controllers 3E to 3J modified as shown in FIG. 11, and an acknowledged interrupt request controller 4A modified as shown in FIG. 12, and a disable inhibition interrupt controller 4C modified as shown in FIG. 19. Therefore, explanation of the interrupt request signal controllers 3E to 3J and the acknowledged interrupt request controller 4A will be omitted.

In addition, the modification of the circuit shown in FIG. 14 to the circuit shown in FIG. 18 is made in the same manner as the modification of the circuit shown in FIG. 5 to the circuit shown in FIG. 10. Therefore, explanation of the circuit shown in FIG. 18 will be omitted. Furthermore, the modification of the circuit shown in FIG. 15 to the circuit shown in FIG. 19 is only that the timing signal STG4 is inputted in place of the timing signal STG3.

Therefore, the fourth embodiment is such that the eight priority levels are controlled with the three timings in the order of the weight "4"→ the weight "2"→ the weight "1". In this controlling operation, the output signal CMOT of the disable inhibition interrupt request controller 4C is grounded at the timing of the timing signal STG4, similarly to the third embodiment, and the output signal CMOT and the input signal CMIN of the interrupt request signal controllers 3E to 3H and the disable inhibition interrupt request controller 4C are connected in the manner mentioned hereinbefore. With this connection, when two or more interrupt requests having the same priority level are generated, the priority level control based on the default values can be realized with one timing.

EMBODIMENT 5

Figure 20:
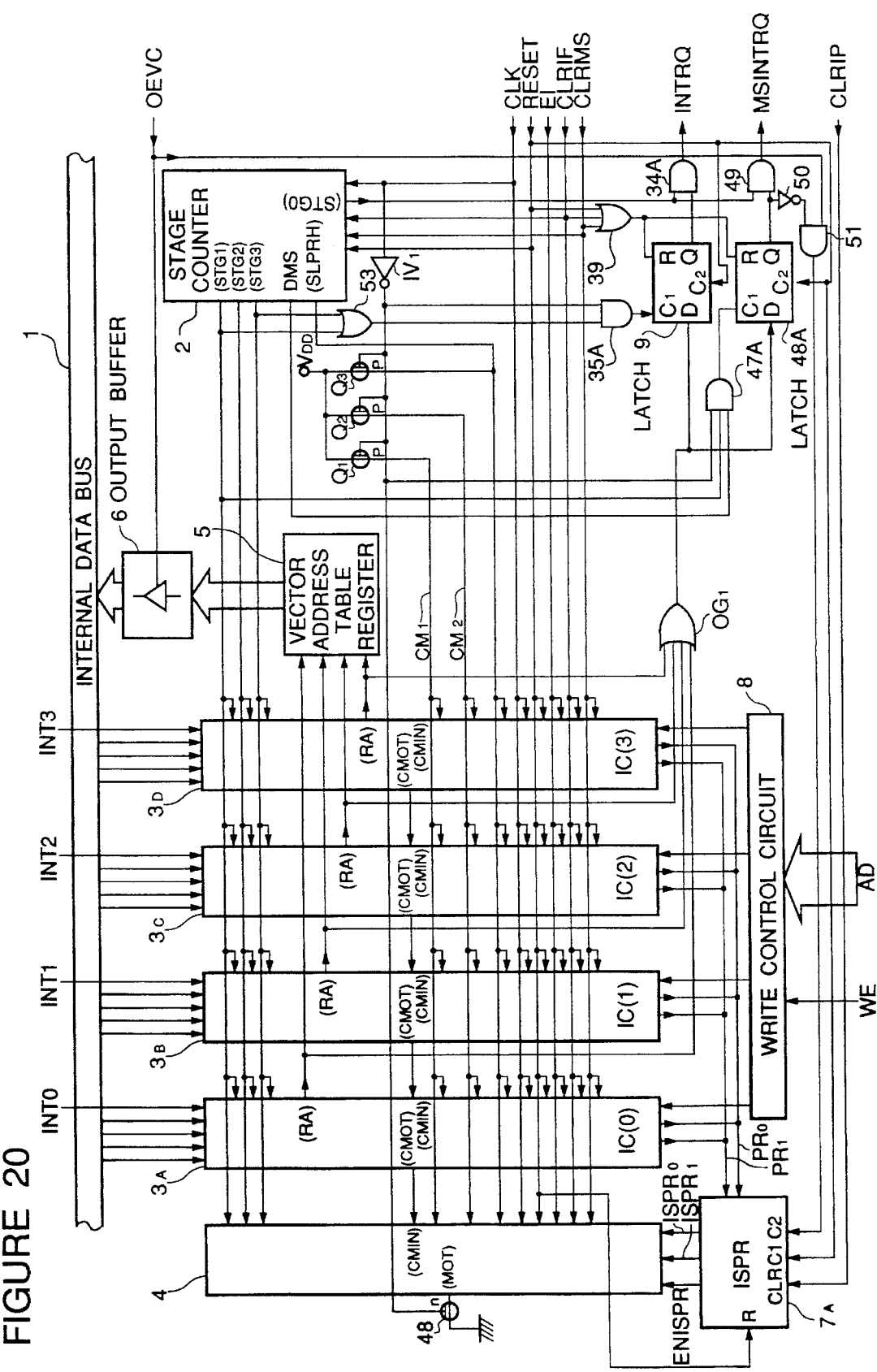
FIG. 20 is a block diagram of a fifth embodiment of the interrupt controller in accordance with the present invention.

Referring to FIG. 20, there is shown a block diagram of a fifth embodiment of the interrupt controller in accordance with the present invention. In FIG. 20, elements similiar to those shown in FIGS. 1 to 19 are given the same Reference Numerals, and explanation thereof will be omitted. Namely, only portions different from the interrupt controller shown in FIGS. 1 to 19 will be explained.

The fifth embodiment is different from the first embodiment, in that a latch 48A is provided as a means for designating either the vector interrupt processing or a macro-service processing. In this connection, the interrupt request signal controllers 3A to 3D are configured to detect the interrupt request with "n" timings at maximum in accordance with the priority level designated for each of the interrupt request signal controllers 3A to 3D and in accordance with the processing designated by the latch 48A.

A priority-level-under-execution register 7 reads the priority level outputted from interrupt request signal controller 3A to 3D, at a timing of "1" of the OEVC signal, when the output of the latch circuit 48A is "0", and outputs a pair of output signals ISPR1 and ISPR0 in synchronism with a timing clock CLK appearing next to the OEVC signal. The output of the latch circuit 48A becomes "1" when the macro-service is executed. The pair of output signals ISPR1 and ISPR0 are obtained by encoding the highest priority level of priority levels stored in the priority-level-under-execution register 7. In addition, when no interrupt request signal is acknowledged, the priority-level-under-execution register 7 brings an ENISPR signal into "0". On the other hand, a priority level is stored in the priority-level-under-execution register 7, the ENISPR signal is brought into "1". In addition, the priority-level-under-execution register 7 operates to respond to a CLRIP signal so as to clear a current priority level and to output a priority level just before the current priority level. The CLRIP signal is a signal for clearing the latch circuit 48A designating the macro-service. Here, the ISPR1 signal has a weight of "2", and the ISPR0 signal has a weight of "1".

A latch circuit 9 latches the output of the OR gate OG1 when the timing signal STG3 or the timing signal STG1 is "1" and the timing clock CLK is "0", and becomes to output the latched data in response to the next timing clock, so that the output of the latch circuit 9 is outputted through an AND gate AG2 as the interrupt processing request signal INTRQ at the timing of "1" of the timing signal STG0. The latch circuit 9 is reset to "0" by a reset signal RESET and a CLRIF signal (an interrupt request flag clear signal), and a CLRMS signal (a macro-service request bit latch clear signal).

The latch circuit 48A latches the output of the OR gate OG1 at the timing signal STG1 when the timing clock CLK is "0", and to output the latched data in response to the next timing clock. In addition, the latch circuit 48A outputs an MSINTRQ signal through an AND gate 49 at the timing signal STG0. This MSINTRQ signal is a macro-service interrupt processing request signal to the CPU 100. The latch circuit 48A is reset to "0" by the reset signal RESET, the CLRIF signal and the CLRMS signal. The CLRMS signal is generated in the execution of the macro-services, for clearing a processing designation bit latch 160 (MSINT bit) designating the interrupt by the macro-service.

The CMOT signal of the acknowledged interrupt request controller 4 is grounded through the N-channel MOS transistor 48 which is turned on when the output of the inverter IV1 (an inverted signal of the clock CLK) is "1". On the other hand, the CMIN signal of the interrupt request signal controller is connected to a DMS signal of the stage counter 2. This DMS signal is a macro-service processing designating signal which is inputted in synchronism with the timing signal STG1 when the macro-service is designated.

Figure 21:
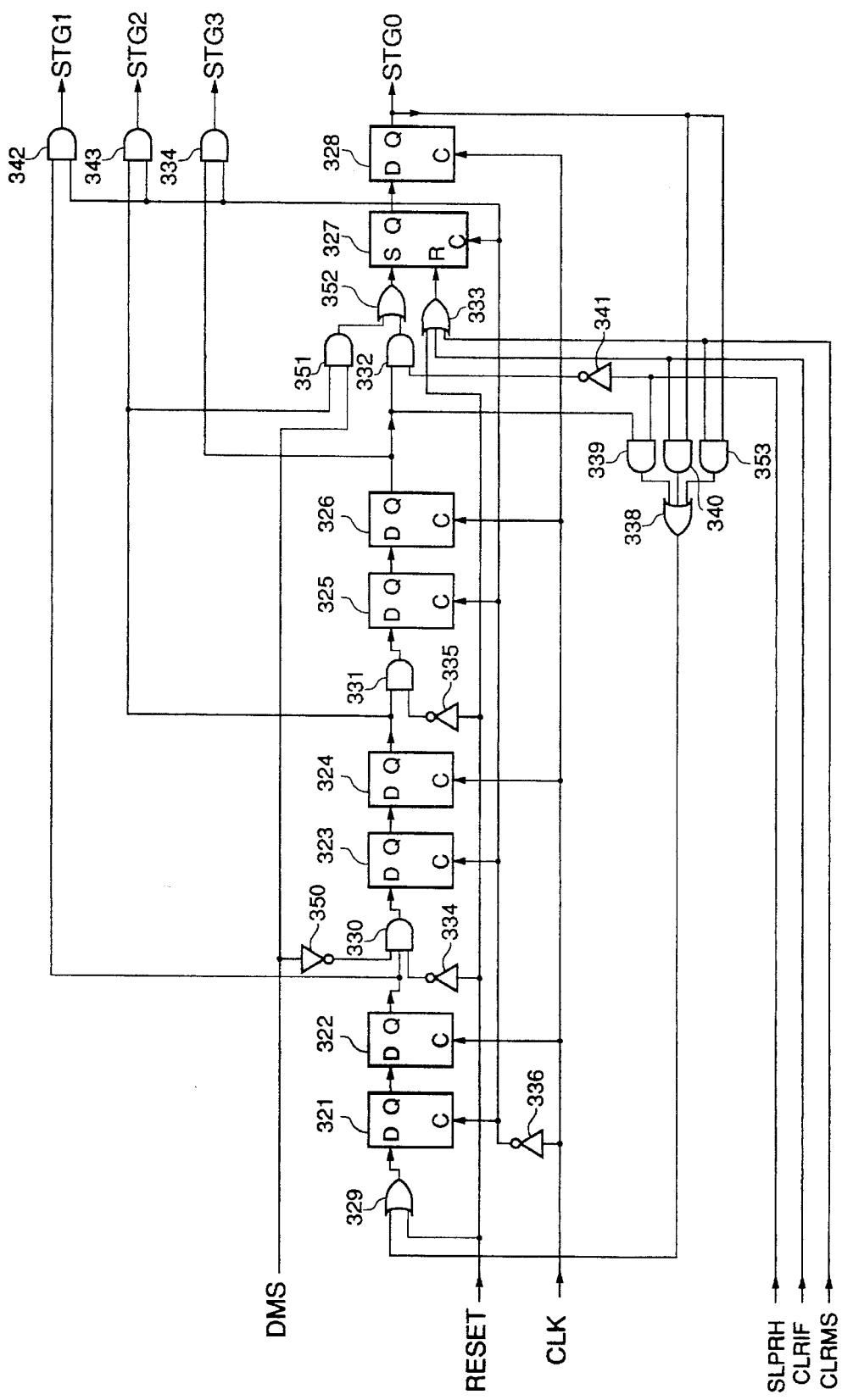
FIG. 21 is a logic circuit diagram of the stage counter used in the interrupt controller shown in FIG. 20.

Referring to FIG. 21, there is shown a logic circuit diagram of the stage counter 2 shown in FIG. 20.

In an initial condition, if the reset signal RESET is brought into "1", a latch circuit 321 is initialized to "1" at the timing of "0" of the timing clock CLK, and similarly, latch circuits 323 and 325 are initialized to "0" and a RS type latch 327 is initialized to "0". Accordingly, at the timing of "1" of a next timing clock CLK, a latch circuit 322 is brought to "1", and latch circuits 324 and 326 are brought to "0".

If the next timing clock CLK becomes "0", the timing signal STG1 is outputted from an AND gate 342. If the reset signal RESET is brought into "0", the output "1" of the latch circuit 322 is latched into the latch circuit 323 through an AND gate 343 when the timing clock CLK is "0".

Similarly, when the timing clock CLK is "0", the output of the latch circuit 323 is latched into the latch circuit 324, so that the latch circuit 324 is brought to "1", which is latched into the latch circuit 325 through an AND gate 331 when the timing clock CLK is "0".

Here, assuming that the CLRIF signal and the CLRMS signal are "0", and that the SLPRH signal is "1" and the DMS signal is "0", an output of an inverter 341 is "0" and the output of the AND gate 332 is "0", so that the latch circuit 327 is maintained at "0". Therefore, the outputs of the AND gates 339 and 340 are "0", and the output of the OR gate 338 is "0", so that when the timing clock CLK becomes "0", the output "0" of the OR gate 338 is latched into the latch circuit 321 through the OR gate 329.

Next, if the timing clock CLK is brought to "1", the latch circuit 322 is brought to "0", and the latch circuit 324 is brought to "1". When the timing clock CLK becomes "0", the timing signal STG2 is brought into "1".

Then, when a next timing clock CLK is "0", the latch circuit 325 is brought to "1", and if the timing clock CLK is next brought to "1", the latch circuit 325 is brought to "0", and the latch circuit 326 is brought to "1". When the timing clock CLK becomes "0", the timing signal STG3 is brought into "1".

When the SLPRH signal is "1", "1" and "0" are sequentially and cyclicly transferred through the latch circuits 321 and 322, the latch circuits 323 and 324 and the latch circuits 325 and 326, so that the timing signals STG1, STG2 and STG3 are gequentially generated.

On the other hand, when the SLPRH signal is "0", the output of the inverter 341 is brought to "1". Therefore, if the output of the latch circuit 326 is "1" the latch circuit 327 is set to "1" when the timing clock CLK is "0".

Then, when the timing clock CLK becomes "1", a latch circuit 328 is brought into "1", so that the timing signal STG0 is outputted.

When the SLPRH signal is "0", since the output of the AND circuit 339 becomes "0", the output of the OR gate 338 is brought into "0". Therefore, the timing signal STG1 is not generated until the CLRIF signal or the CLRMS signal is brought to "1".

Thereafter, when the CLRIF signal is brought to "1", the output of the AND gate 340 becomes "1". Accordingly, when the timing clock CLK becomes "0", the latch circuit 321 is brought to "0". On the other hand, if the CLRIF signal is brought to "1", since the output of the OR gate 333 is brought into "1", the latch circuit 327 is reset. Accordingly, the timing signal STG1 is generated following the timing signal STG0.

When the DMS signal is "1", the output of the inverter 350 becomes "0", and the output of the AND gate 330 is brought to "0", so that the generation of the timing signals STG2 and STG3 are prevented. When the timing signal STG1 becomes "1", the output of the AND gate 351 is brought to "1", which acts to bring the RS latch 327 and the latch 328 to "1" through the OR gate 352, so that the timing signal STG0 is generated. Since the timing signal STG3 is not generated, the timing signal STG1 is not generated until the CLRIF signal or the CLRMS signal is brought to "1".

When the CLRMS signal becomes "1", the output of the AND gate 353 becomes "1", and therefore, when the clock CLK becomes "0", the latch 321 is brought to "1". Since the output of the OR gate 333 becomes by the CLRMS signal, the RS latch 327 is reset to "0". Therefore, the timing signal STG1 is generated following the timing signal STG0.

Figure 22:
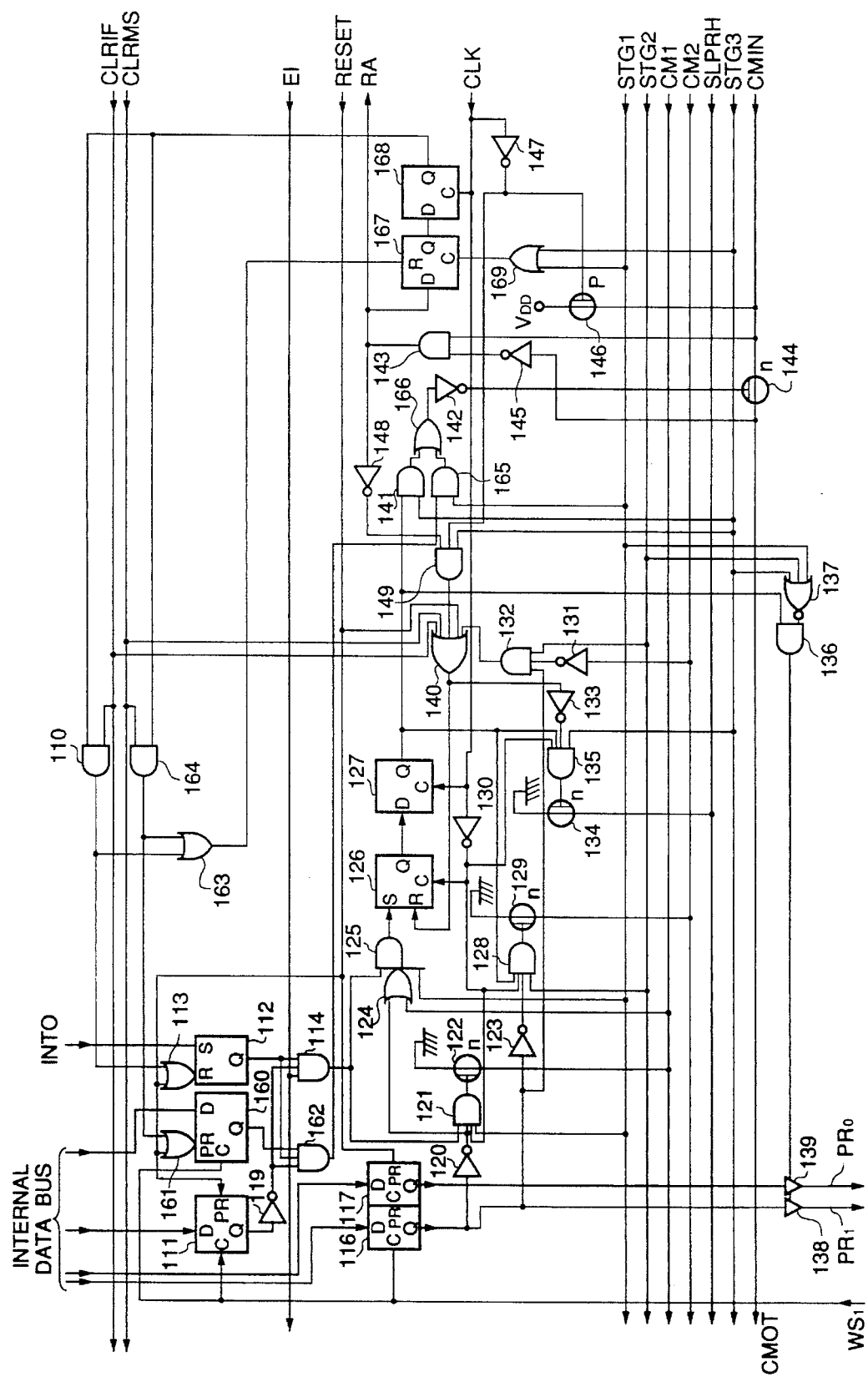
FIG. 22 is a logic circuit diagram of the interrupt request signal controller used in the interrupt controller shown in FIG. 20.

Referring to FIG. 22, there is shown a logic circuit diagram of the interrupt request signal controller 3A shown in FIG. 20. Since the interrupt request signal controllers 3A to 3D have the same construction, only the interrupt request signal controller 3A is shown.

When the interrupt request signal INT0 is inputted, if the content of the mask bit register 111 is "0" and the interrupt request flag 112 is "1" and if the interrupt enable signal EI is "1" and a MSINT bit 160 is "0", the output of the AND gate 114 is brought into "1". The MSINT bit 160 designates the macro-service processing when it is "1" and a vector interrupt when it is "0". The MSINT bit 160 can be rewritten by the COU 100, and is reset to "0" by the reset signal RESET and the CLRMS signal. The priority bit register 116 has a weight of "2", and the priority bit register 117 has a weight of "1".

When the priority bit register 116 is "0", the output of the inverter 120 is "1". When the timing signal STG1 is brought into "1", the output of the AND gate 121 is brought into "1" at the timing of "0" of the timing clock CLK, so that an N-channel transistor 122 is turned on so as to bring the CM1 signal into "0".

As mentioned above, the CM1 signal has been brought into "1" by the precharging when the timing clock CLK is "1". However, when the output of the AND gate 121 becomes "1", the CM1 signal is brought into "1". Simultaneously, a RS type latch 126 is set to "1" through an OR gate 124 and an AND gate 125.

Next, when the timing clock CLK is brought into "1", a latch circuit 127 is brought into "1". When the timing signal STG3 is brought into "1", an output of an AND gate 141 is brought into "1". As a result, an output of an inverter 142 is brought into "0" through an OR gate 166, and therefore, a N-channel MOS transistor 144 is not rendered conductive. Therefore, the input signal CMIN, which has been precharged by a P-channel MOS transistor 146 turned on when a preceding timing clock CLK was "0", is "1". On the other hand, when the output signal CMOT grounded through the acknowledged interrupt request controller 4 is "0", an output of an inverter IN15 is brought into "1". Accordingly, an output of an AND gate 143 is brought into "1", and therefore, the RA signal is outputted for preparing the vector address table 5.

If the timing signal STG2 becomes "1", when the priority bit register 117 is "0" and the latch circuit 127 is "1", an output of an AND gate 128 is brought into "1" at the timing of "0" of the timing clock CLK. Therefore, an N-channel MOS transistor 129 is turned on, so as to bring the CM2 signal into "0". As mentioned above, the CM2 signal has been brought into "1" by the precharging when the timing clock CLK is "1". However, when the output of the AND gate 128 becomes "1", the CM2 signal is brought into "0".

An output of an AND gate 132 is brought into "1" when the priority bit register 117 is "1", the CM2 signal is "0" and the timing signal STG2 is "1". An output of an AND gate 149 is brought into "1" at the timing of "0" of the timing clock CLK when the RA signal is "0" and the timing signal STG3 is "1". When the output of the AND gate 132 is "1", or when the reset signal RESET is "1", or when the CLRIF signal is "1", or when the CLRMS signal is "1", or when the output of an AND gate 149 is "1", an output of an OR gate 140 is brought into "1". Thereafter, when a next timing clock CLK becomes "0", the RS latch circuit 126 is reset to "0".

When the output of the OR gate 140 is "0", an output of an inverter 133 is brought into "1". When the output of the latch circuit 127 is "1" and the timing signal STG3 is "1", an output of an AND circuit 135 is outputted into "1", so that an N-channel MOS transistor 134 is turned on. Therefore, the SLPRH signal is brought to "0".

When the output of the latch circuit 127 is "1" and when the timing signals STG1, STG2 and STG3 are "0", namely when the timing signal STG0 is "1", the output of the AND gate 136 is brought into "1", so that the outputs of the priority bit registers 116 and 117 are read out through output buffers 138 and 139 as the signals PR1 and PR0.

Next, when the MSINT bit 150 is "1" and the mask bit 111 is "0", an output of an AND gate 162 is brought to "1" if the interrupt request signal INT0 is generated. When the timing signal STG1 becomes "1", the output of the AND gate 165 is brought to "1", which brings the output of the inverter 142 to "0" through the OR gate 166. Therefore, the N-channel MOS transistor 144 is not rendered conductive. The CMIN signal which has been precharged to "1" by the P-channel MOS transistor 146 when the preceding clock CLK was "0" is applied to the AND gate 143. In addition, the CMOT signal which is grounded through the N-channel transistor 48 in the acknowledged interrupt request controller 4 is supplied through an inverter 145 to the AND gate 143. Therefore, the output of the AND gate 143 is brought to "1", and the RA signal is generated.

A Latch 167 latches the RA signal in response to the timing signals STG1 or STG3, and the content of the latch 167 is transferred to another latch 168 in response to the clock CLK. When the latch 168 is "1", if the CLRIF signal is inputted, the interrupt request flag 112 is cleared, and if the CLRMS signal is inputted, the MSINT bit 160 is cleared. In any case, the latch 167 is simultaneously cleared. When the CLRMS signal is inputted, since the interrupt request flag 112 is not cleared, the interrupt priority level discrimination of the vector interrupt is immediately started.

Figure 23:
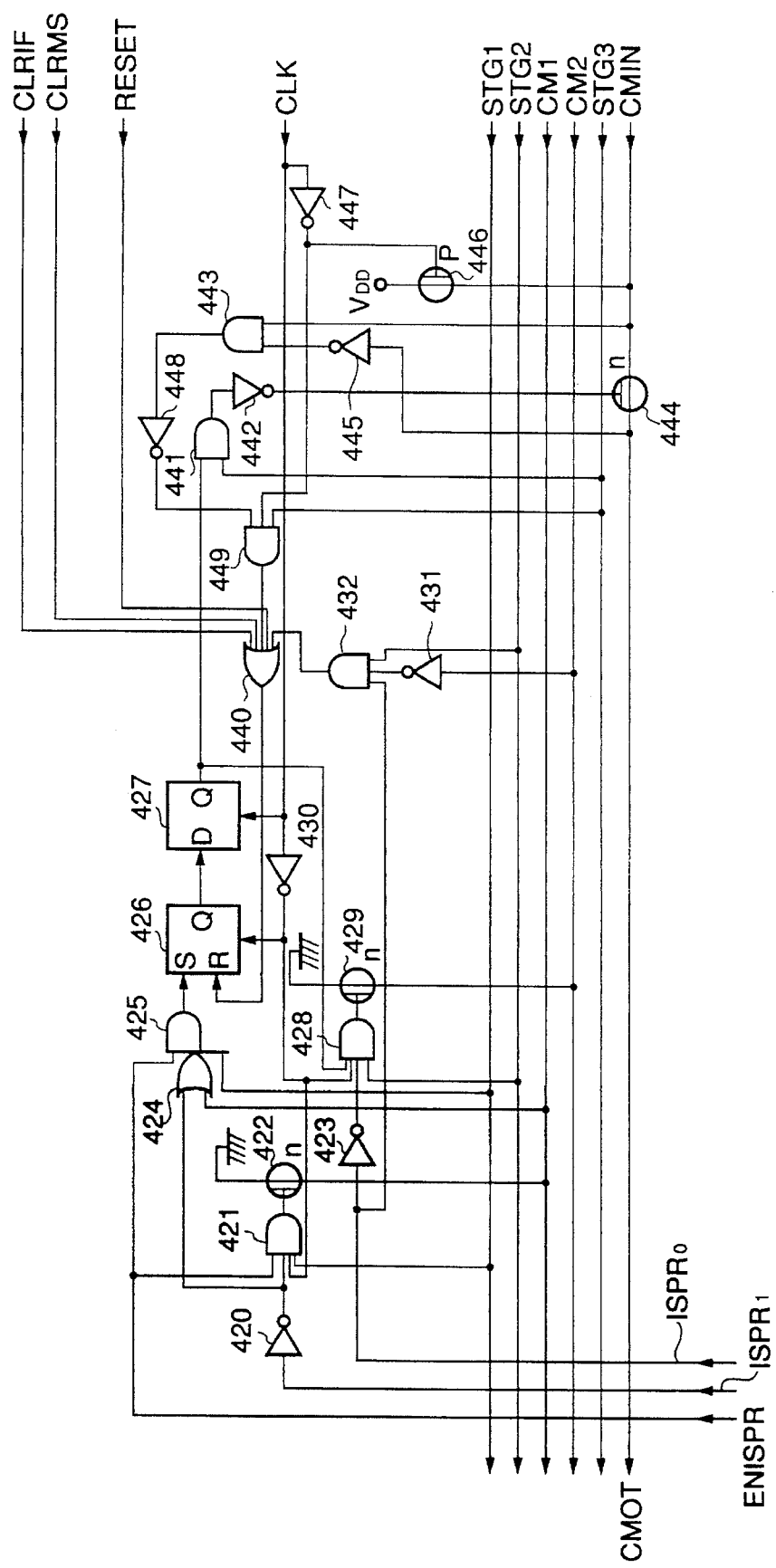
FIG. 23 is a logic circuit diagram of the acknowledged interrupt request signal controller used in the interrupt controller shown in FIG. 20.

Referring to FIG. 23, there is shown a logic circuit diagram of the acknowledged interrupt request signal controller 4 shown in FIG. 20. In FIG. 23, elements corresponding to those shown in FIG. 22 operate in a similar manner, and therefore, explanation will be omitted.

The circuit shown in FIG. 23 is different from the circuit shown in FIG. 22 in the following points: The output of the AND circuit 114 shown in FIG. 22 is the ENISPR signal, and the outputs of the priority bit registers 116 and 117 are replaced by the INRR1 and ISPR0 signals. In addition, the AND circuits 110, 114, 135, 136, 162, and 164, the N-channel MOS transistors 134, the inverters 119 and 133, the NOR gate 137, the OR gates 113, 161, 163, 166 and 169, the mask bit 111, the interrupt request flag 112, the latches 160, 167 and 168 are omitted. The RA signal and the SLPRH signals are omitted. Therefore, in the other points the circuit shown in FIG. 23 is the same as the circuit shown in FIG. 22. Accordingly, a RS latch 41 and a latch 42 correspond to the RS latch 126 and the latch 45, respectively. AND gates 423, 425, 429, 432, 441, 449 and 443 correspond to the AND gates 121, 125, 128, 132, 141, 149 and 143. An OR gate 440 corresponds to the OR gate 140, and inverters 420, 423, 430, 431, 442, 445, 448, and 447 correspond to the inverters 120, 123, 130, 131, 142, 145, 148 and 147, respectively. N-channel MOS transistors 442, 429 and 444 and a P-channel transistors 446 correspond to the N-channel MOS transistors 122, 129 an 144 and the P-channel transistors 146, respectively.

Figure 24:
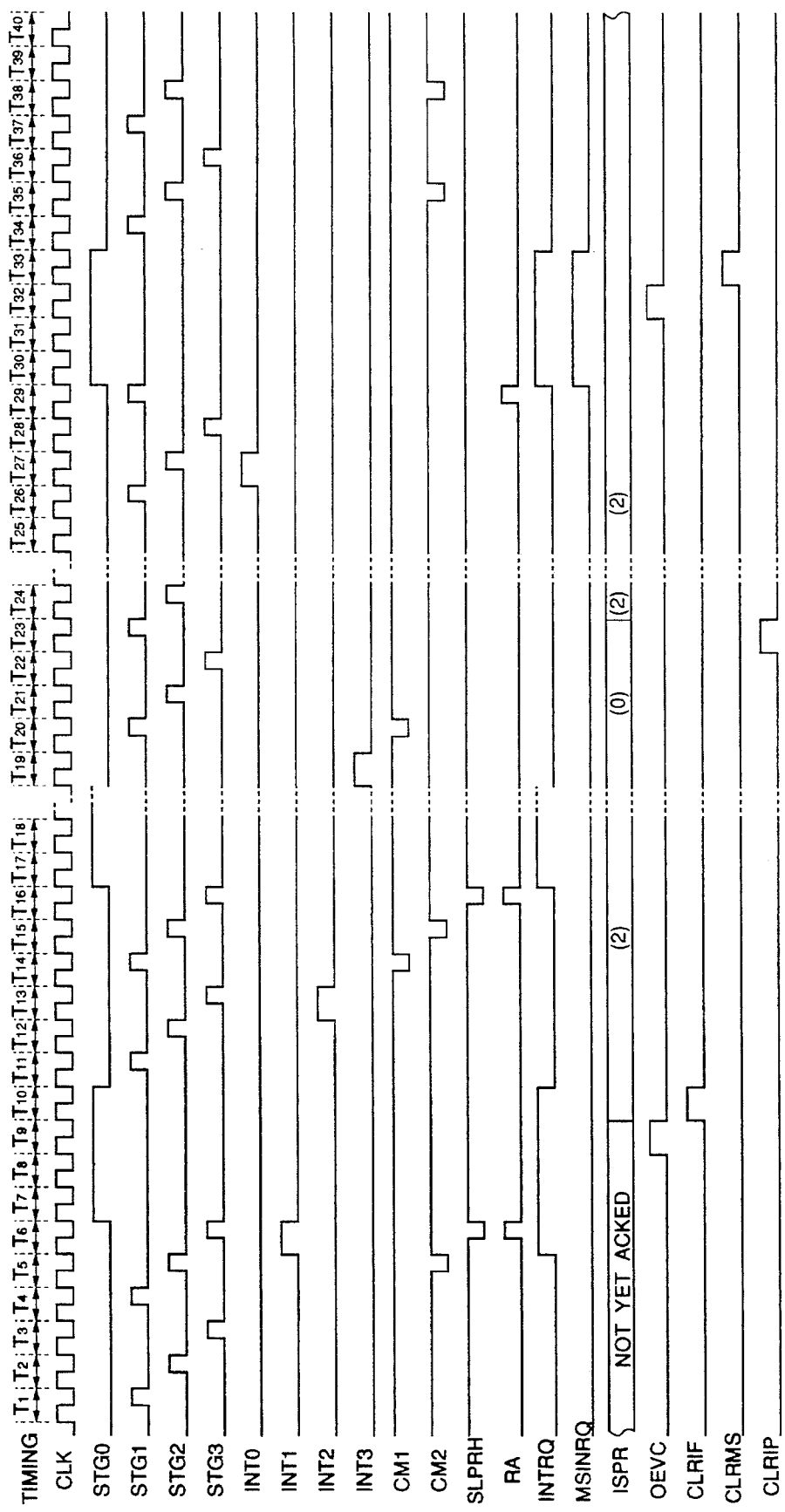
FIG. 24 is a timing chart for illustrating the operation of the interrupt controller shown in FIG. 20.

Now, operation of the fifth embodiment of the interrupt controller will be explained with reference to FIG. 24 showing the timing chart for illustrating the operation of the interrupt controller.

Here, assume that the mask bit register 111 of the four interrupt request signal controllers 3A, 3B 3C and 3D (corresponding to the interrupt request signals INT0, INT1, INT2 and INT3, respectively) are set to "0", "0", "0" and "0", respectively, and that the MSINT bits 160 of the four interrupt request signal controllers 3A, 3B 3C and 3D are set to "1", "0", "0" and "0", respectively, and also assume that the priority bit registers 33A and 33B of the four interrupt request signal controllers 3A, 3B 3C and 3D are set to "1, 0" (priority level "2"), "1, 0 " (priority level "2"), "0, 0" (priority level "0"), and "0, 1" (priority level "1"), respectively. In addition, the EI signal is "1". Therefore, the condition is the same as the operation of the conventional example except for the the MSINT bits 160.

In this case, the operation before the timing T26 is the same as the corresponding operation of the first embodiment, and therefore, only operation until the timing T24 will be explained.

At the timing T27, if the interrupt request signal INT0 is generated, the timing signal STG1 is generated at the timing T29, and the output of the AND gate 165 is brought to "1", so that the RA signal is generated similarly to the interrupt request signal INT1. At the timing T30, the interrupt processing request signal INTRQ and the MSINTRQ signal are generated.

The CPU 100 brings the OEVC signal to "1", an address of the vector address table 5 is outputted to the internal data bus 1. At this time, since the latch circuit 48A is "1", the output of the AND gate 51 is not brought to "1", and therefore, the value of the priority-level-under-execution register 7 does not change. Thereafter, the CLRMS signal is outputted, the MSINT bit 160 is cleared, and the timing signal STG1 is simultaneously outputted from the stage counter 2. Since the interrupt request flag 112 in the interrupt request signal controller 3A is maintained at "1", the interrupt priority level discrimination is started again.

At the timing T35, since the output signals ISPR1 and ISPR0 of the priority-level-under-execution register 7 are "1" and "0" at the timing T27, respectively, the output of the AND gate 421 becomes "0" and the CM1 signal becomes "1". The output of the AND gate 425 becomes "1" so that the RS latch circuit 426 is set. When the timing clock CLK becomes "1", the output of the latch circuit 427 is brought to "1". Since the ISPR0 is "0", the output of the AND 428 becomes "1", and the CM2 signal is maintained at "1". Accordingly, the output of the AND gate 432 is maintained at "0", and therefore, the output of the OR gate 440 is also maintained at "0". Accordingly, the RS latch circuit 426 is not reset.

Since the priority level (level 2) of the interrupt request signal INT0 is the same as that of the preceding one, the content of the priority bit registers 116 and 117 is also the same, and the interrupt request signal controller 3A operates similarly, so that the output of the latch circuit 127 becomes "1".

At the timing of "1" of the timing signal STG3, the output of the AND gate 441 of the acknowledged interrupt request controller 4 and the output of the AND gate 141 of the interrupt request signal controller 3A are brought into "1", respectively, and therefore, outputs of the inverters 442 and 142 are brought into "0", so that the MOS transistors 444 and 144 are turned off.

Accordingly, only the grounded output signal CMOT of the acknowledged interrupt request controller 4 is "0", and the input signal CMIN of the acknowledged interrupt request controller 4 and the input signal CMIN and the output signal CMOT of the interrupt request signal controller 3A are maintained "1", since the signal CMIN has been precharged when the timing clock CLK was "1".

Therefore, the output of the inverter 445 of the acknowledged interrupt request controller 4 becomes "1", and the output of the AND gate 443 is brought into "1", so that the output of the inverter 448 is brought into "0" and the output of the AND gate 449 is also brought to "0". Accordingly, the output of the OR gate 440 is also brought to "0".

In the interrupt request signal controller 3A, on the other hand, the output of the inverter 145 becomes "0", and the output of the AND gate 143 also becomes "0", so that the RA signal is maintained at "0". Simultaneously, the output of the inverter 148 is brought into "1", and the output of the AND gate 149 is brought into "1", so that the output of the OR gate 140 is brought into "1", and the RS latch circuit 126 is reset. Namely, the interrupt request signal INT0 is not acknowledged, and therefore, the interrupt processing request signal INTRQ is not outputted. In other words, the interrupt request having the same priority level as that of the interrupt processing being executed is not acknowledged.

Although not shown in the timing chart, when no interrupt request has been acknowledged, if the interrupt request signals having the priority level "0" and the contents "0" and "0" of the priority bit registers 33A and 33B are generated, namely, when two interrupt requests having the same priority level are generated, the fifth embodiment operates similarly to the first and third embodiments. Namely, also in the fifth embodiment, when the interrupt request signals INT0 and INT1 having the same priority level are generated, the interrupt request signals INT0 has priority over the interrupt request signal INT1.

As mentioned above, when an interrupt processing having a high priority level is requested in the course of the execution of an interrupt processing having a low priority level, the priority level is scanned from a high priority bit to a low priority bit in the order of weight. Therefore, the interrupt controller can respond to the interrupt request at a speed higher than that of the conventional interrupt controller. In addition, when an interrupt request having the same priority level as that of the interrupt processing being currently executed is generated, and when two or more interrupt requests having the same priority level are simultaneously generated, an interrupt request having a high default (high in the order of preference set by a circuit) is acknowledged, but an interrupt request having a low default is not acknowledged. In addition, the fifth embodiment can comply with the macro-service processing. Therefore, the interrupt controller as mentioned above can flexibly comply with various interrupt requests at a high speed.

EMBODIMENT 6

Figure 25:
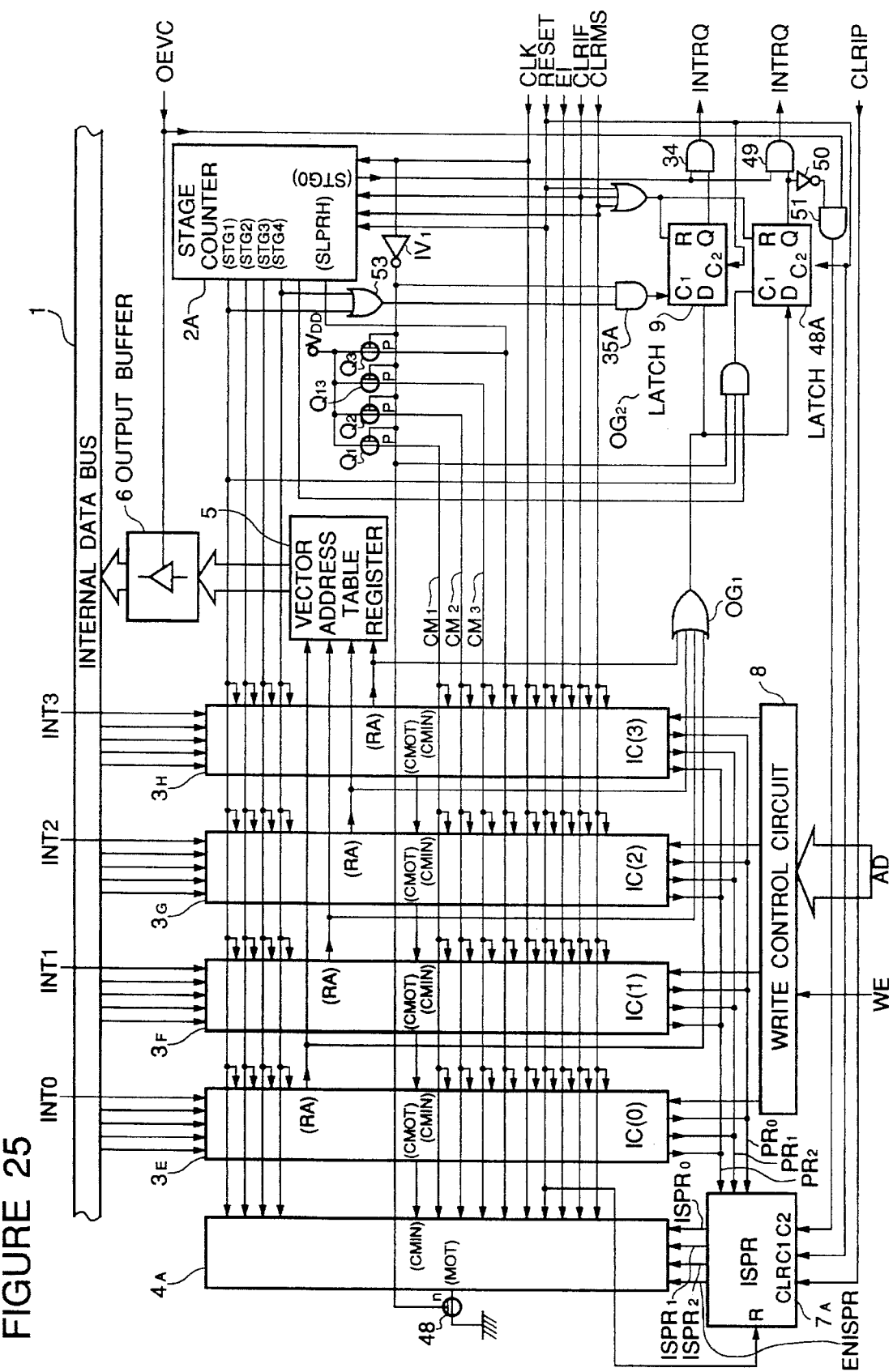
FIG. 25 is a block diagram of a sixth embodiment of the interrupt controller in accordance with the present invention.

Referring to FIG. 25, there is shown a block diagram of a sixth embodiment of the interrupt controller in accordance with the present invention.

Figure 27:
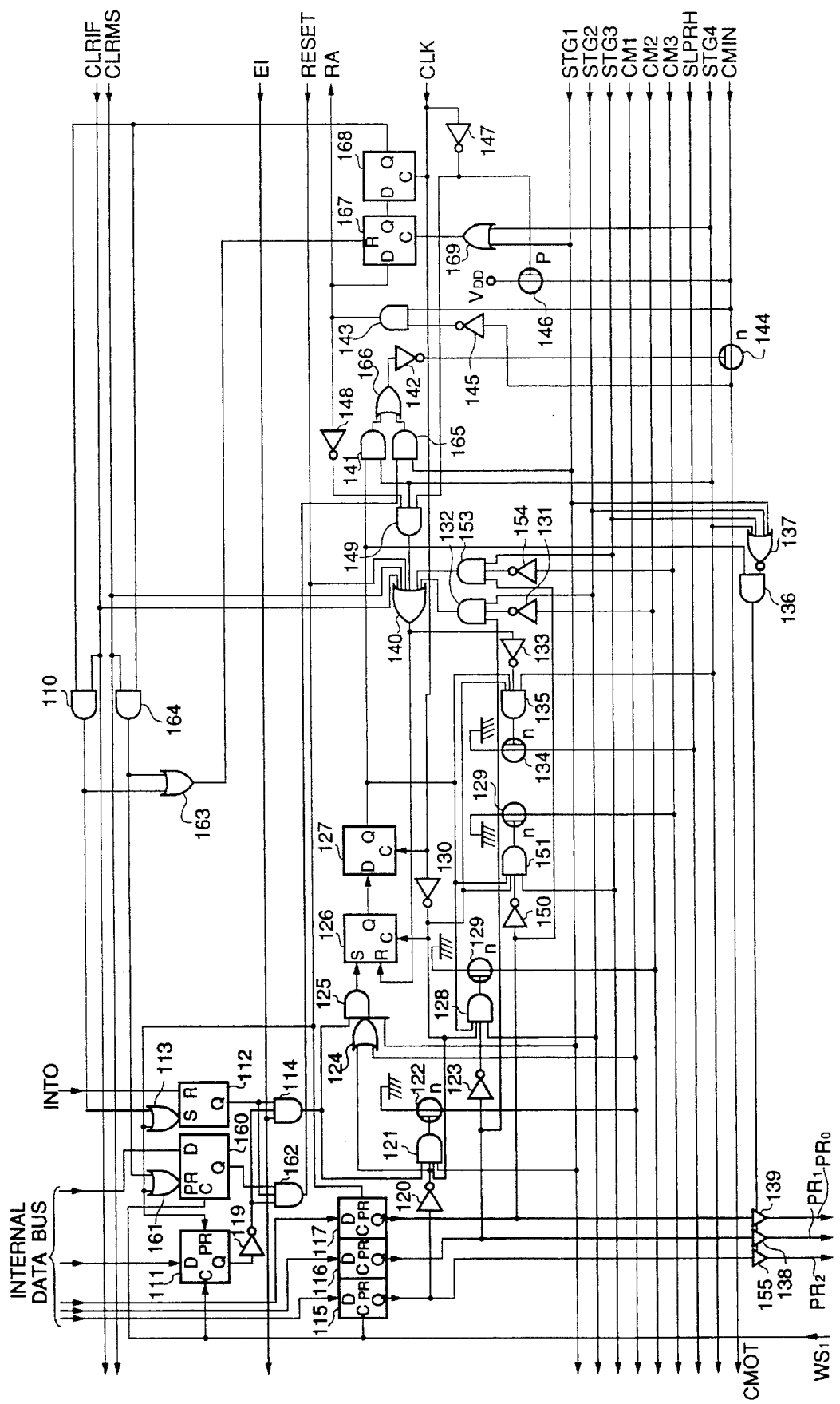
FIG. 27 is a logic circuit diagram of the interrupt request signal controller used in the interrupt controller shown in FIG. 25.
Figure 28:
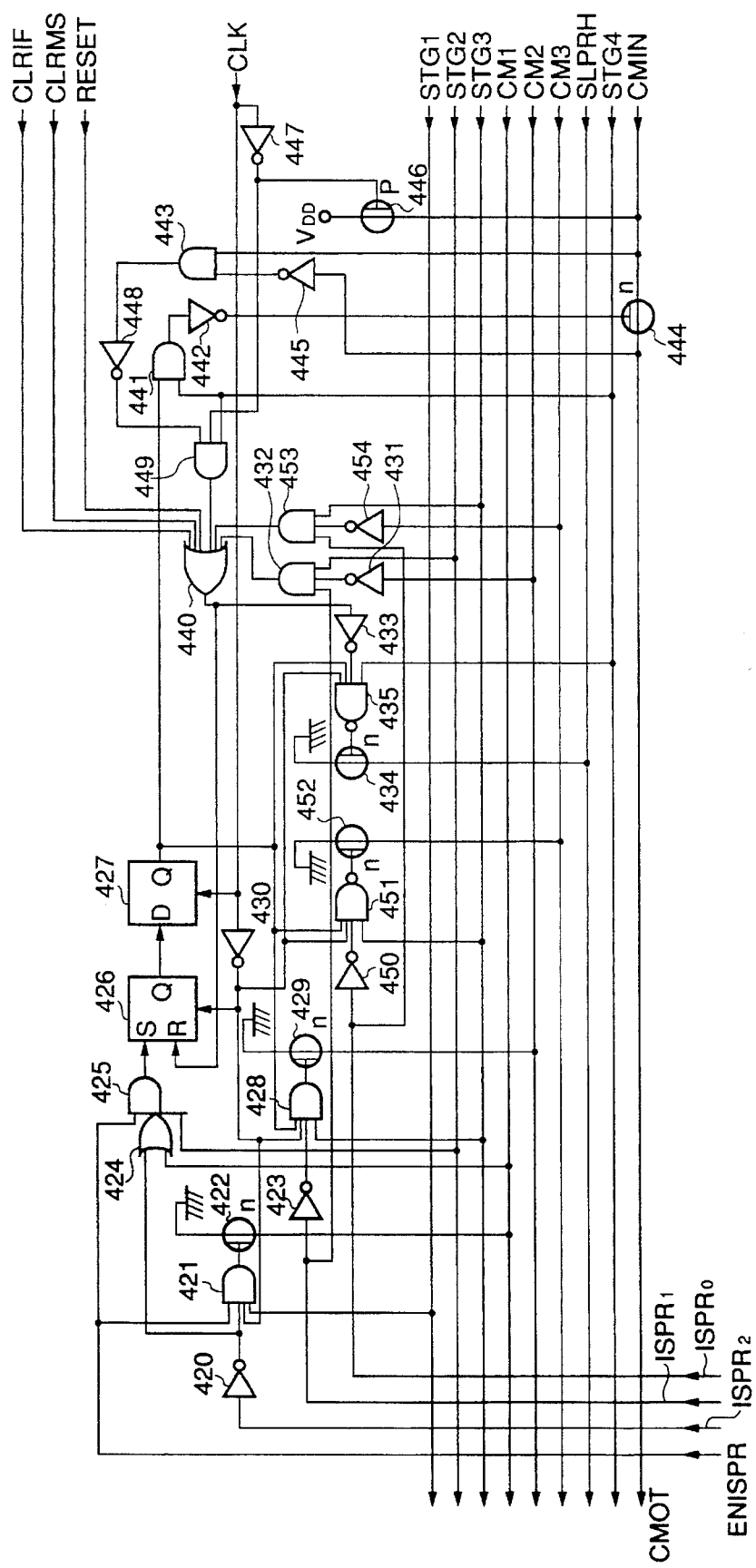
FIG. 28 is a logic circuit diagram of the acknowledged interrupt request signal controller used in the interrupt controller shown in FIG. 25.

The sixth embodiment is different from the fifth embodiment in that the priority level is divided into 8 levels. Because of this modification, the second embodiment includes a stage counter 2A modified as shown in FIG. 26, and interrupt request signal controllers 3E to 3J modified as shown in FIG. 27, and an acknowledged interrupt request controller 4A modified as shown in FIG. 28.

Figure 26:
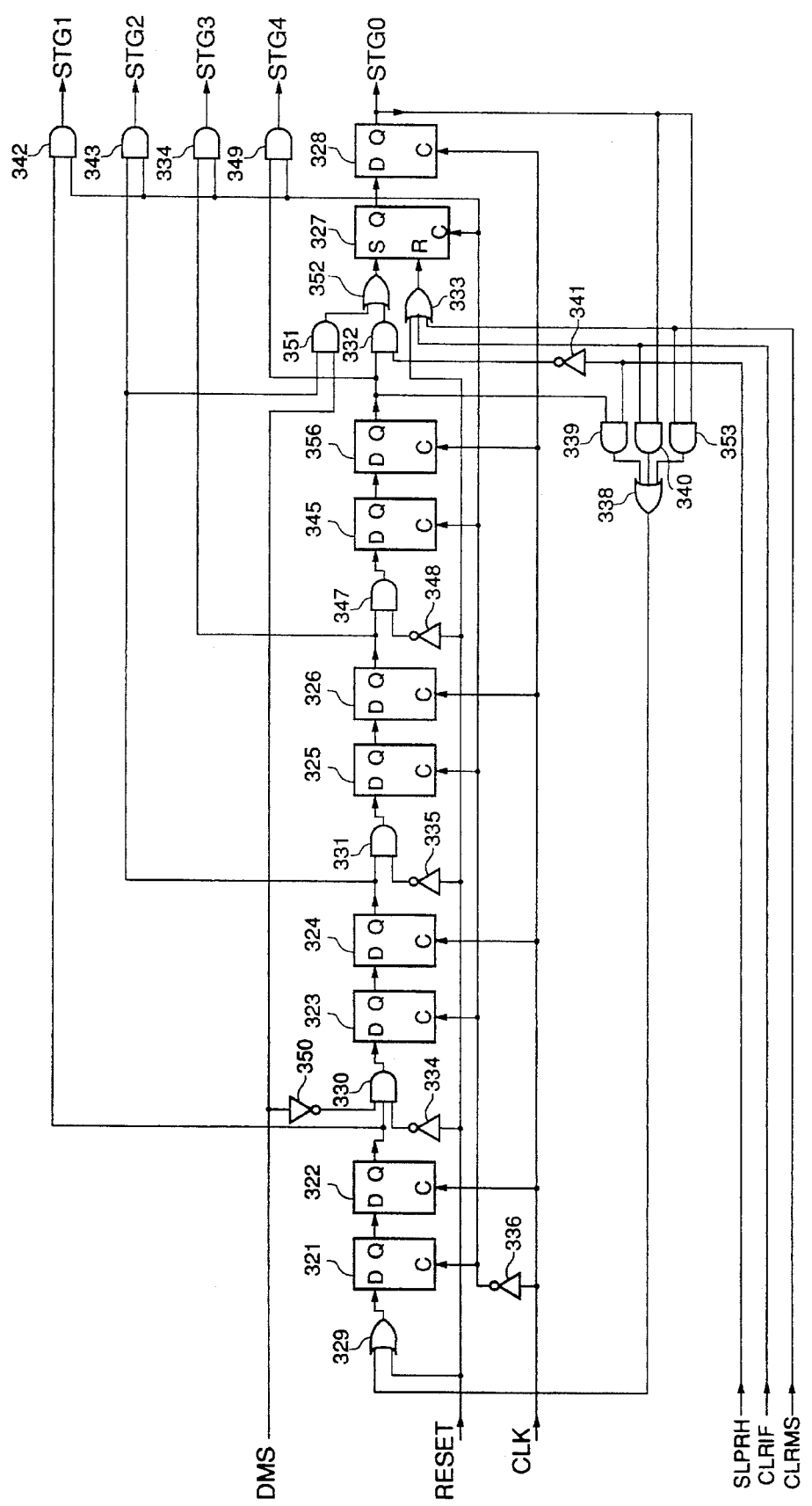
FIG. 26 is a logic circuit diagram of the stage counter used in the interrupt controller shown in FIG. 25.

In addition, the modification of the circuit shown in FIG. 21 to the circuit shown in FIG. 26 is made in the same manner as the modification of the circuit shown in FIG. 5 to the circuit shown in FIG. 10. The modification of the circuit shown in FIG. 22 to the circuit shown in FIG. 27 is made in the same manner as the modification of the circuit shown in FIG. 6 to the circuit shown in FIg. 11. The modification of the circuit shown in FIG. 23 to the circuit shown in FIG. 27 is made in the same manner as the modification of the circuit shown in FIG. 7 to the circuit shown in FIG. 12. Therefore, explanation of the stage counter 2A, the interrupt request signal controllers 3E to 3J and the acknowledged interrup request controller 4A will be omitted.

Therefore, the sixth embodiment is such that the eight priority levels are controlled with the three timings in the order of the weight "4"→ the weight "2"→ the weight "1". In this controlling operation, the output signal CMOT of the disable inhibition interrupt request controller 4C is grounded at the timing of the timing signal STG4, similarly to the third embodiment, and the output signal CMOT and the input signal CMIN of the interrupt request signal controllers 3E to 3H are connected in the manner mentioned hereinbefore. With this connection, when two or more interrupt requests having the same priority level are generated, the priority level control based on the default values can be realized with one timing.

EMBODIMENT 7

Figure 29:
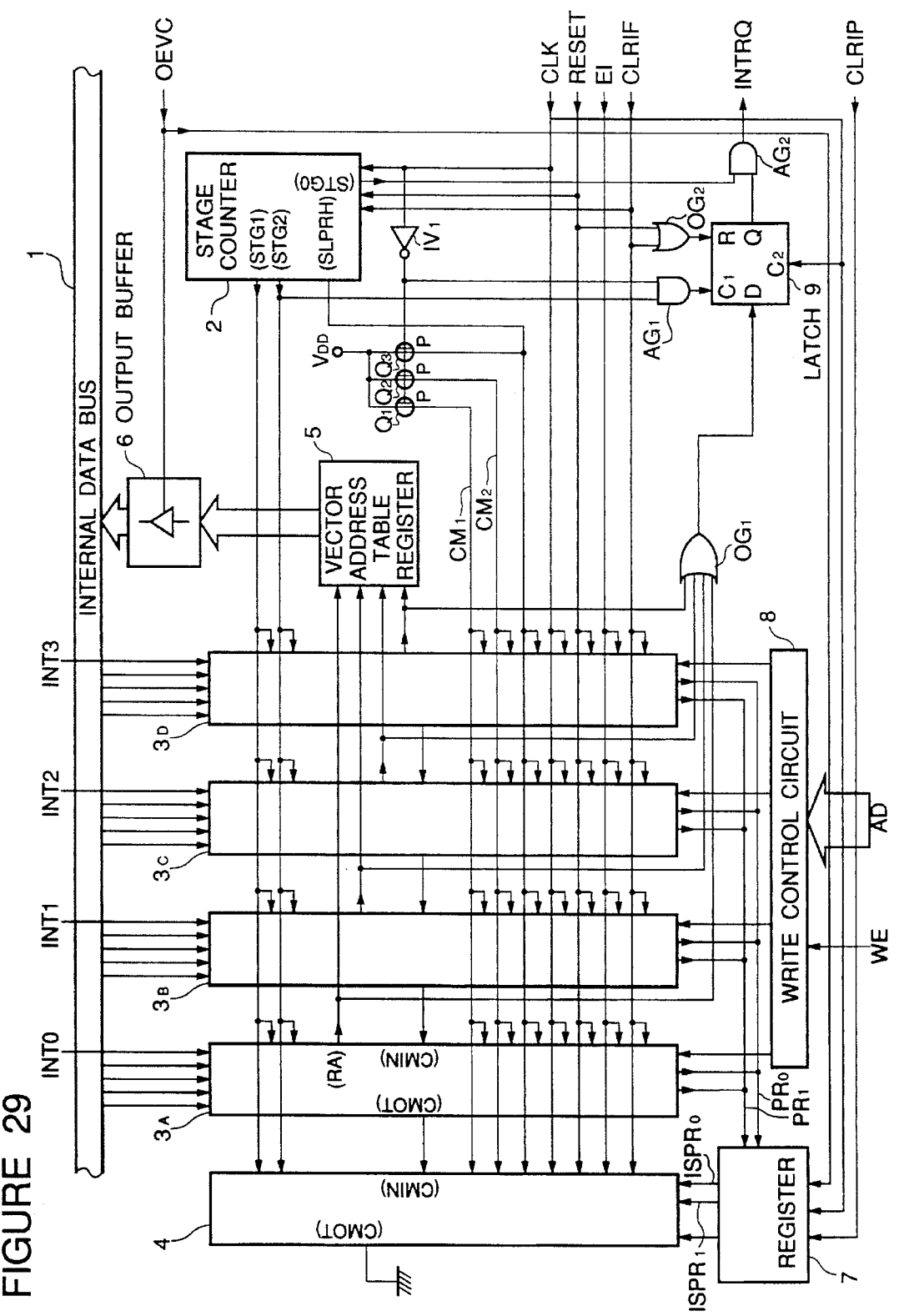
FIG. 29 is a block diagram of a seventh embodiment of the interrupt controller in accordance with the present invention.

Referring to FIG. 29, there is shown a block diagram of a seven embodiment of the interrupt controller in accordance with the present invention. The seventh embodiment is a simplified one of the first embodiment, so that only the timing signals STG1, STG2, and STG0 are generated. In FIG. 29, elements similar or corresponding to those shown in FIG. 4 are given the same Reference Numerals. Since the seventh embodiment is the same as the first embodiment excluding that the timing signal STG3 is not generated, the explanation of the construction and the operation will be omitted.

Figure 30:
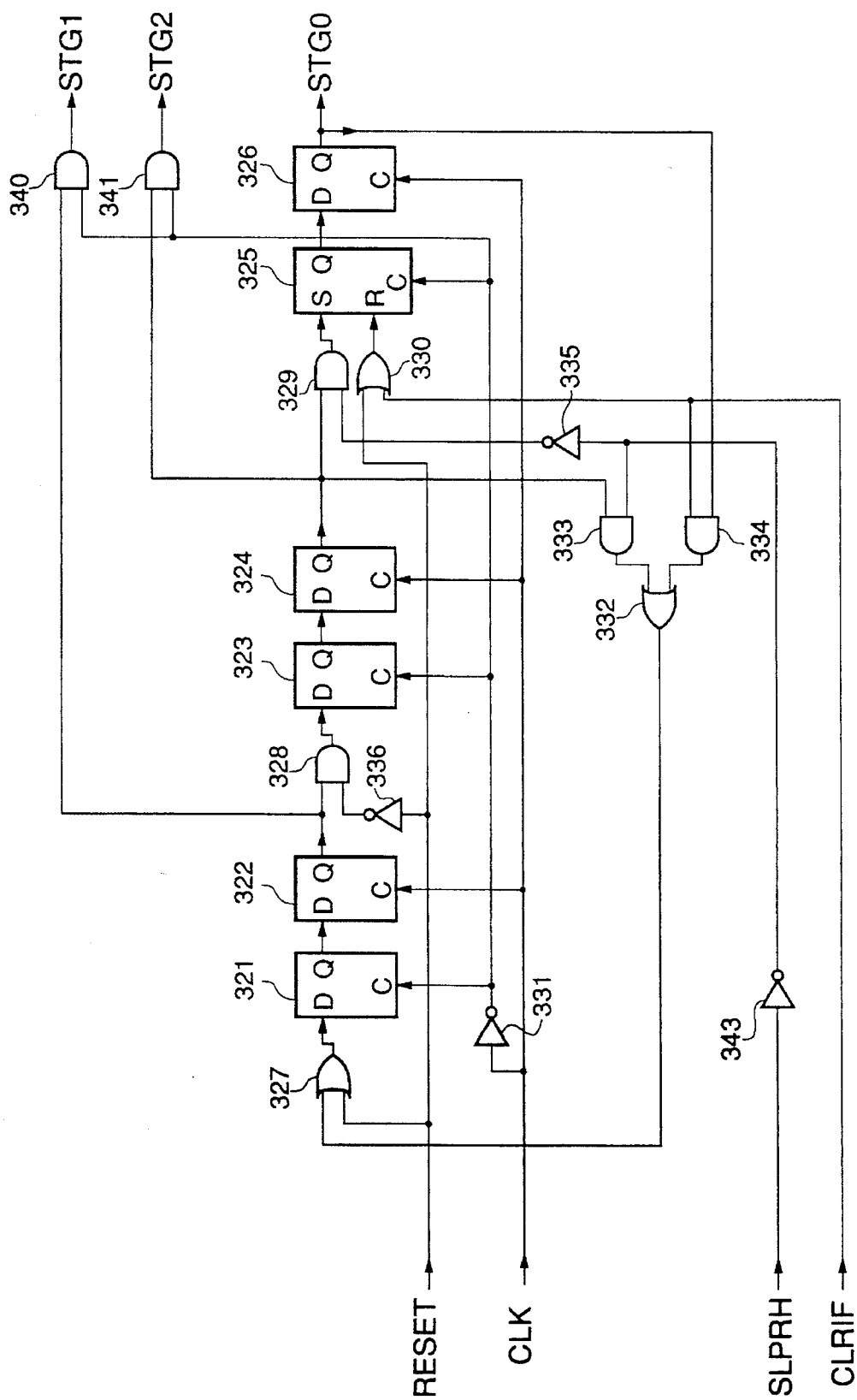
FIG. 30 is a logic circuit diagram of the stage counter used in the interrupt controller shown in FIG. 29.

Referring to FIG. 30, there is shown a logic circuit diagram of the stage counter 2 used in the interupt controller shown in FIG. 29. Although in FIG. 30 there are given Reference Numerals different from those given in FIG. 5, since elements corresponding in circuit function to those shown in FIG. 5 will operate in the same manner, the operation of the circuit of FIG. 30 will be omitted.

Figure 31:
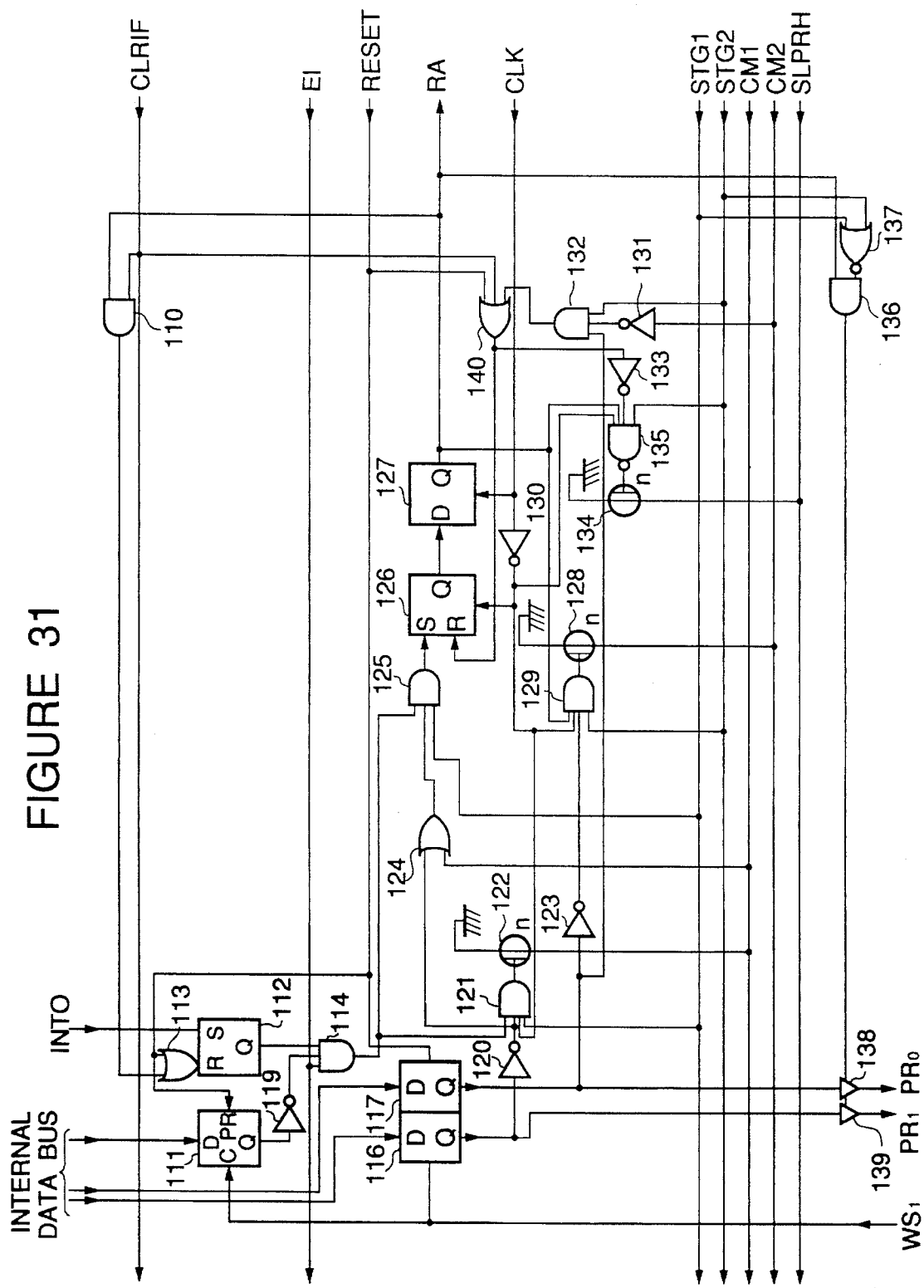
FIG. 31 is a logic circuit diagram of the interrupt request signal controller used in the interrupt controller shown in FIG. 29.

Turning to FIG. 31, there is shown a logic circuit diagram of the interrupt request signal controller used in the interrupt controller shown in FIG. 29. Similarly to FIG. 30, although in FIG. 31 there are given Reference Numerals different from those given in FIG. 6, since elements corresponding in circuit function to those shown in FIG. 6 will operates in the same manner, the operation of the circuit of FIG. 31 will be omitted.

Figure 32:
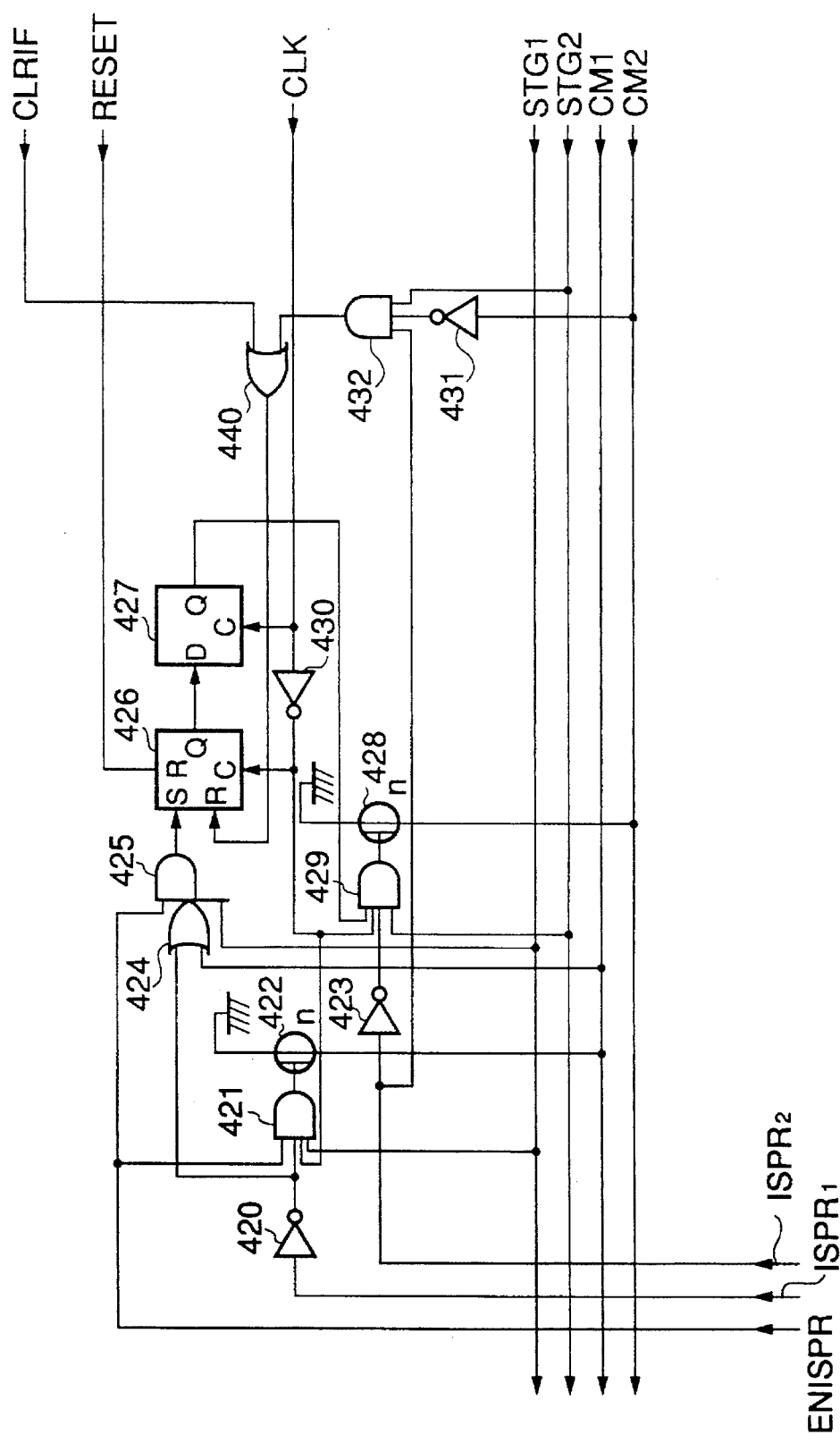
FIG. 32 is a logic circuit diagram of the acknowledged interrupt request signal controller used in the interrupt controller shown in FIG. 29.

Referring to FIG. 32, there is shown a logic circuit diagram of the acknowledged interrupt request signal controller used in the interrupt controller shown in FIG. 29. Similarly to FIG. 30, although in FIG. 32 there are given Reference Numerals different from those given in FIG. 7, since elements corresponding in circuit function to those shown in FIG. 7 will operate in the same manner, the operation of the circuit of FIG. 32 will be omitted.

Figure 33:
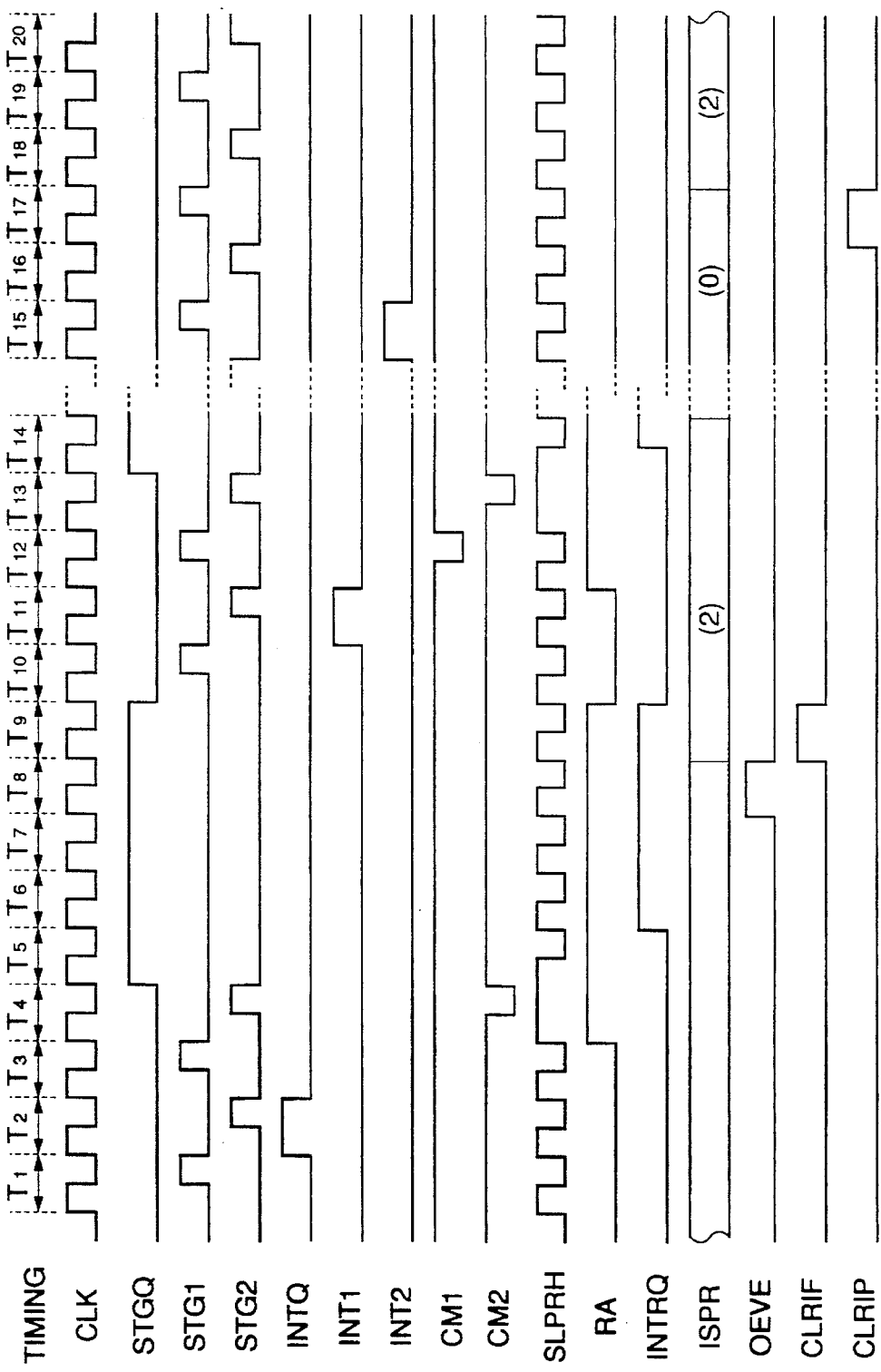
FIG. 33 is a timing chart for illustrating the operation of the interrupt controller shown in FIG. 29.

FIG. 33 is a timing chart for illustrating the operation of the interrupt controller shown in FIG. 29. The seventh embodiment operates similarly to the first embodiment, excluding the fact that the timing signal STG3 is not generated, the explanation of the operation will be omitted.

EMBODIMENT 8

Figure 34:
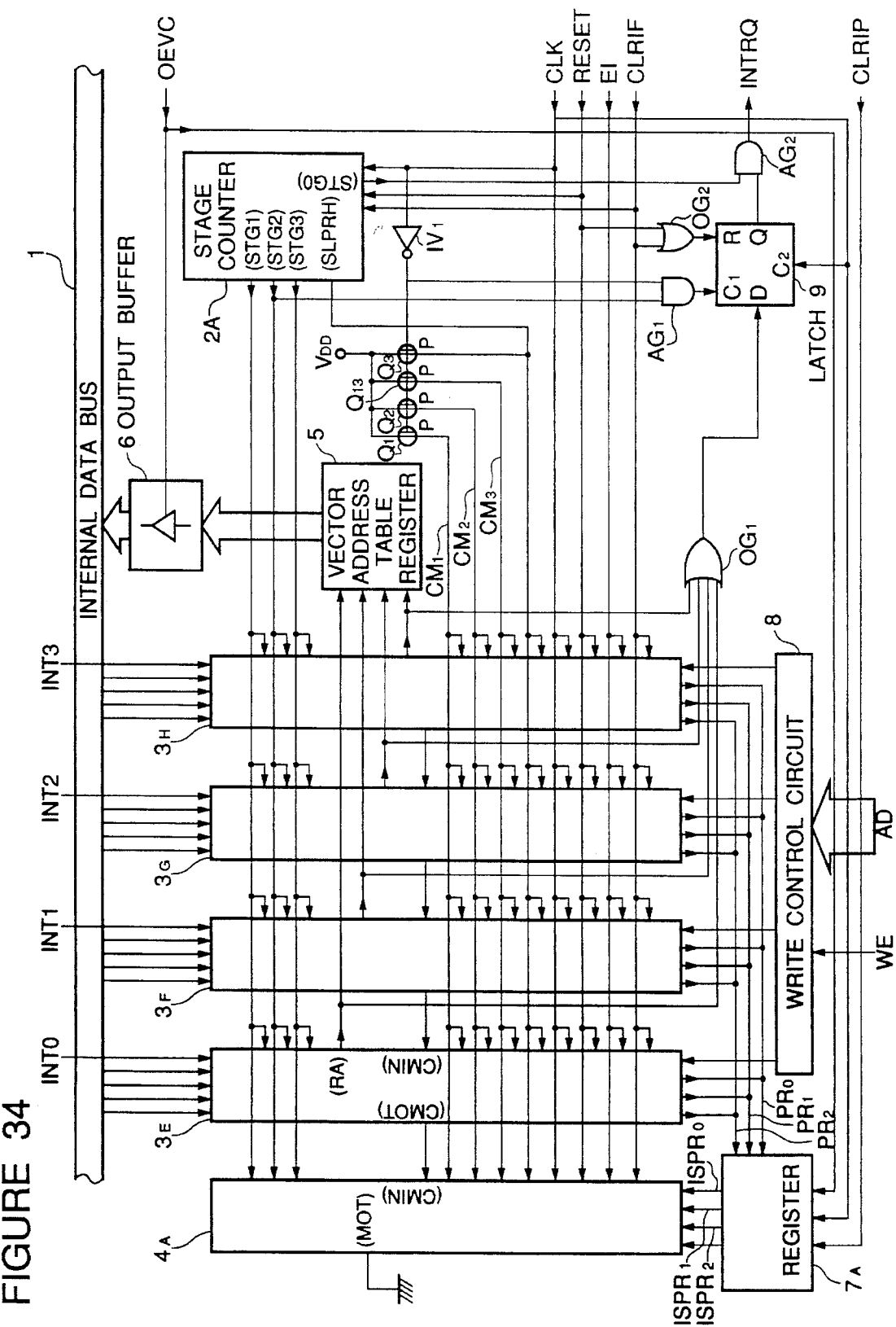
FIG. 34 is a block diagram of an eight embodiment of the interrupt controller in accordance with the present invention.

Referring to FIG. 34, there is shown a block diagram of an eighth embodiment of the interrupt controller in accordance with the present invention.

The eighth embodiment is differenct from the seventh embodiment in that the priority level is divided into 8 levels. Because of this modification, the second embodiment includes a stage counter 2A modified as shown in FIG. 35, and interrupt request signal controllers 3E to 3J modified as shown in FIG. 36, and an acknowledged interrupt request controller 4A modified as shown in FIG. 37.

Figure 35:
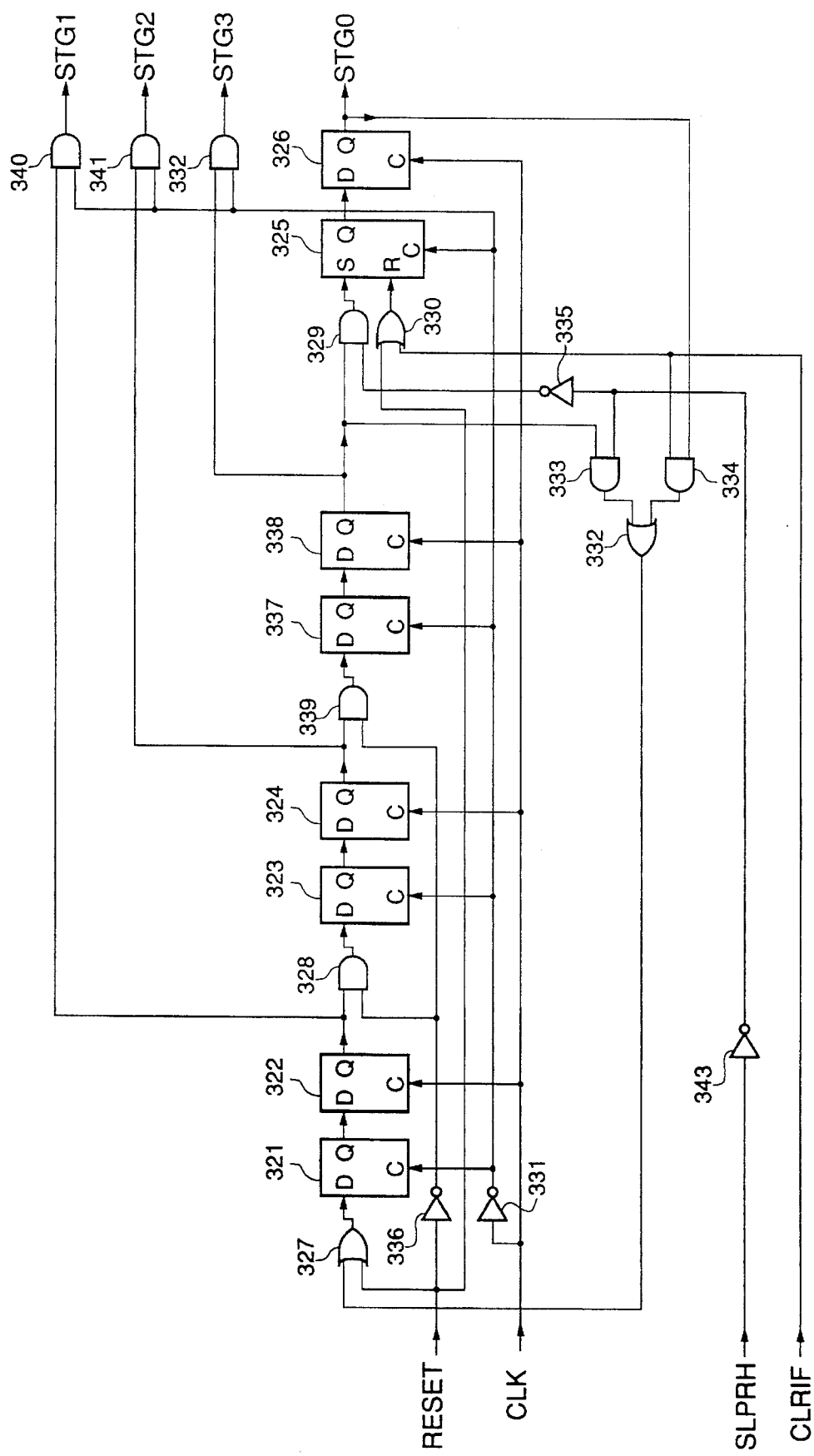
FIG. 35 is a logic circuit diagram of the stage counter used in the interrupt controller shown in FIG. 34.

In FIG. 35 although there are given Reference Numerals different from those given in FIG. 6, since elements corresponding in circuit function to those shown in FIG. 6 will operate in the same manner, the operation of the circuit of FIG. 35 will be omitted.

Figure 36:
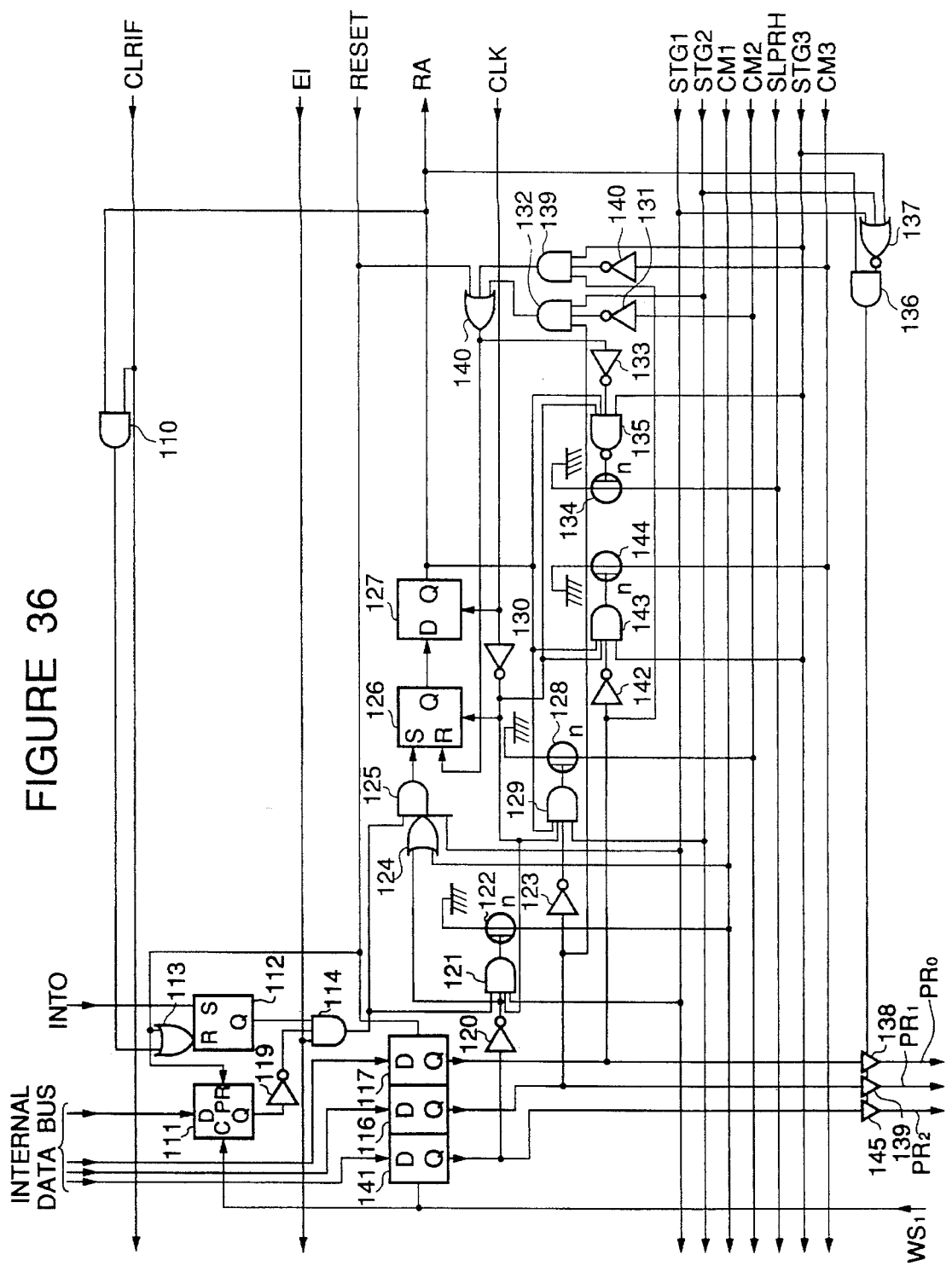
FIG. 36 is a logic circuit diagram of the interrupt request signal controller used in the interrupt controller shown in FIG. 34.

Similarly to FIG. 35, in FIG. 36 although there are given Reference Numerals different from those given in FIG. 11, since elements corresponding in circuit function to those shown in FIG. 11 will operate in the same manner, the operation of the circuit of FIG. 36 will be omitted.

Figure 37:
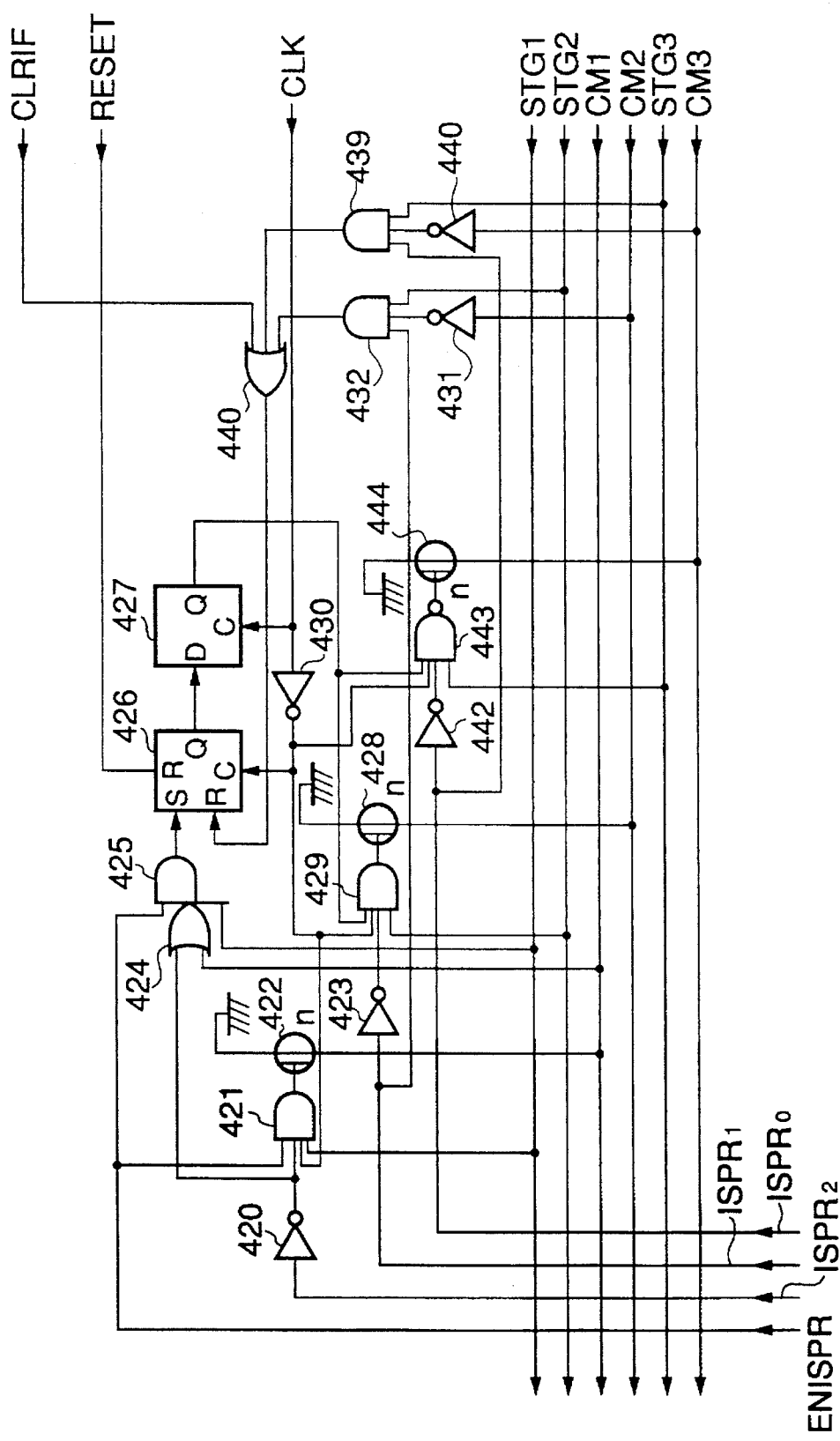
FIG. 37 is a logic circuit diagram of the acknowledged interrupt request signal controller used in the interrupt controller shown in FIG. 34.

Also similarly to FIG. 35, in FIG. 37 although there are given Reference Numerals difference from those given in FIG. 12, since elements corresponding in circuit function to those shown in FIG. 12 will operate in the same manner, the operation of the circuit of FIG. 37 will be omitted.

As will be apparent from the embodiments explained with reference to the accompanying drawings, the interrupt controller in accordance with the present invention is characterized in that if the priority levels is $2^n$ or less, the priority levels are scanned in the order of $2^n \rightarrow 2^{n-1} \rightarrow \ldots 2^0$, and the priority levels based on the default values is scanned at only one timing. Therefore, even if interrupt requests having the same priority levels compete with each other, an interrupt request signal having the highest priority level can be detected from the competing interrupt request with only (n+1) timings.

The invention has thus been shown and described with reference to the specific embodiments. However, it should be noted that the present invention is in no way limited to the details of the illustrated structures but changes and modifications may be made within the scope of the appended claims.

We claim:

1. An interrupt controller comprising:

a pluarlity of n-bit priority registers for designating $2^n$ priority levels to a plurality of interrupt request signals, where n is an integer not less than 2, stage counter means for sequentially and repeatedly generating timing signals for scanning the priority levels of the interrupt request signals designated by said n-bit priority registers, priority-level-under-execution register means for storing the content of the priority register designating the priority level of the interrupt request signal corresponding to an interrupt processing currently under execution, interrupt request signal controlling means for comparing the content of the priority-level-under-execution register with contents of said n-bit priority registers designating the priority levels of the interrupt request signals being generated including the priority register designating the priority level of the interrupt request signal corresponding to the interrupt processing currently under execution, said interrupt request signal controlling means operating in synchronism with the first n of said n+1 timing signals in an order of a highest place bit to a lowest place bit of said n-bit priority registers, said interrupt request signal controlling means further operating to detect an interrupt request signal having a highest priority bit from the interrupt request signals being generated, the interrupt request signal controlling means also operating in such a manner that when a plurality of interrupt request signals having the highest priority bit are detected, the interrupt request signal controlling means selects one interrupt request signal, in accordance with a predetermined order of interrupt request signals, in synchronism with a timing signal following said first n of said n+1 timing signals generated by said stage counter means, and output means for generating an interrupt processing request signal to a central processing unit when the interrupt request signal controlling means detects an interrupt request signal having a highest priority level.

2. An interrupt controller as claimed in claim 1 wherein each of said priority registers includes a plurality of stages, respective stages of each of the priority registers being set to have a weight of $2^{(N-1)}$.

3. An interrupt controller as claimed in claim 2 wherein the contents of the priority registers are detected by said interrupt request signal controlling means in an order from a weight bit, where n is an integer not less than 2, to a weight bit.

4. An interrupt controller as claimed in claim 1 further including disable inhibition interrupt request signal controller means for detecting in one timing an inputted interrupt disable inhibition interrupt request signal in the predetermined order.

5. An interrupt controller as claimed in claim 1 wherein said output means further includes processing designating means for designating a selected one of a vector interrupt processing and a macro-service processing to said central processing unit, said processing designating means being operatively coupled to said central processing unit and said interrupt request signal controlling means.

6. An interrupt controller as claimed in claim 1, wherein said interrupt request signal controlling means includes means for comparing the priority order at a same priority order levels of $2^N$ bits so as to perform an interrupt control.

* * * * *